US008935510B2

(12) United States Patent
Inoue et al.

(10) Patent No.: US 8,935,510 B2
(45) Date of Patent: Jan. 13, 2015

(54) SYSTEM STRUCTURING METHOD IN MULTIPROCESSOR SYSTEM AND SWITCHING EXECUTION ENVIRONMENT BY SEPARATING FROM OR REJOINING THE PRIMARY EXECUTION ENVIRONMENT

(75) Inventors: Hiroaki Inoue, Tokyo (JP); Junji Sakai, Tokyo (JP); Tsuyoshi Abe, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 509 days.

(21) Appl. No.: 12/447,513

(22) PCT Filed: Nov. 1, 2007

(86) PCT No.: PCT/JP2007/071323
§ 371 (c)(1),
(2), (4) Date: Apr. 28, 2009

(87) PCT Pub. No.: WO2008/062647
PCT Pub. Date: May 29, 2008

(65) Prior Publication Data
US 2010/0100706 A1    Apr. 22, 2010

(30) Foreign Application Priority Data

Nov. 2, 2006  (JP) .................................. 2006-299019
Sep. 25, 2007 (JP) .................................. 2007-247491

(51) Int. Cl.
*G06F 15/80* (2006.01)
*G06F 9/50* (2006.01)
(Continued)

(52) U.S. Cl.
CPC ........ *G06F 9/5077* (2013.01); *H04L 29/08144* (2013.01); *G06F 9/4405* (2013.01); *H04L 67/34* (2013.01)
USPC .................. 712/30; 718/1; 718/102; 718/104; 718/105; 718/108; 712/10; 712/15; 712/16; 712/E9.001; 709/222; 709/224; 709/226

(58) Field of Classification Search
CPC ... G06F 9/4553; G06F 9/45537; G06F 9/445; G06F 9/44505; G06F 9/45558; G06F 9/5077; G06F 2009/45583; G06F 2009/4557; G06F 8/60; G06F 8/61; H04L 29/08144; H04L 67/34; H04L 41/0816
USPC ................ 718/102, 104, 105, 108, 1; 712/30, 712/E9.001, 10, 15, 16; 709/222, 224, 226
See application file for complete search history.

(56) References Cited

U.S. PATENT DOCUMENTS
6,247,109 B1 *  6/2001  Kleinsorge et al. ............. 712/13
(Continued)

FOREIGN PATENT DOCUMENTS

| JP | 11-316747 A | 11/1999 |
|----|-------------|---------|
| JP | 11316747 A *| 11/1999 |
| JP | 2002278778 A| 9/2002  |

OTHER PUBLICATIONS
Fu et al., Service Migration in Distributed Virtual Machines for Adaptive Grid Computing, 2005, IEEE, pp. 1-8.*
(Continued)

*Primary Examiner* — Meng An
*Assistant Examiner* — Abu Ghaffari
(74) *Attorney, Agent, or Firm* — Sughrue Mion, PLLC

(57) ABSTRACT

For flexibly setting up an execution environment according to contents of processing to be executed while taking stability or a security level into consideration, the multiple processor system includes the execution environment main control unit 10 which determines CPU assignment at the time of deciding CPU assignment, the execution environment sub control unit 20 which controls starting, stopping and switching of an execution environment according to an instruction from the execution environment main control unit 10 to synchronize with the execution environment main control unit 10, and the execution environment management unit 30 which receives input of management information or reference refusal information of shared resources for each CPU 4 or each execution environment 100 to separate the execution environment main control unit 10 from the execution environment sub control units 20a through 20n, or the execution environment sub control units 20a through 20n from each other.

4 Claims, 86 Drawing Sheets

(51) Int. Cl.
*H04L 29/08* (2006.01)
*G06F 9/44* (2006.01)

(56) References Cited

U.S. PATENT DOCUMENTS

| | | | | |
|---|---|---|---|---|
| 6,874,014 | B2* | 3/2005 | Richardson et al. | 709/213 |
| 6,931,640 | B2* | 8/2005 | Asano et al. | 718/104 |
| 6,996,828 | B1* | 2/2006 | Kimura et al. | 719/319 |
| 7,325,233 | B2* | 1/2008 | Kuck et al. | 718/103 |
| 7,444,635 | B2* | 10/2008 | Lehtinen | 718/104 |
| 7,567,359 | B2* | 7/2009 | Tameshige et al. | 358/1.15 |
| 7,734,782 | B2* | 6/2010 | Ishida | 709/226 |
| 2002/0016892 | A1* | 2/2002 | Zalewski et al. | 711/153 |
| 2003/0037089 | A1* | 2/2003 | Cota-Robles et al. | 709/1 |
| 2003/0115573 | A1* | 6/2003 | Syme et al. | 717/111 |
| 2003/0126202 | A1* | 7/2003 | Watt | 709/203 |
| 2003/0217131 | A1* | 11/2003 | Hodge et al. | 709/223 |
| 2004/0128670 | A1* | 7/2004 | Robinson et al. | 718/1 |
| 2004/0163008 | A1* | 8/2004 | Kim | 714/4 |
| 2006/0143617 | A1* | 6/2006 | Knauerhase et al. | 718/104 |

OTHER PUBLICATIONS

Keahey et al., From Sandbox to Playground: Dynamic Virtual Environments in the Grid, 2004, IEEE, pp. 1-9.*
Rose et al., The Virtual Clsuter: a Dynamic Environment for Exploitation of Idel Network Resources, 2002, IEEE, pp. 1-8.*
Japanese Office Action for JP2008-545349 issued Aug. 30, 2011.
H. Inoue et al., "Virtus: A New Processor Virtualization Architecture for Security-Oriented Next-Generation Mobile Terminals", Proceedings of the 43rd annual Design Automation Conference (DAC 2006), Jul. 24-28, 2006, pp. 484-489.
Junji Sakai et al., "Parallel Processing Using Multicore Processors for Embedded Systems", The Institute of Electronics, Information and Communication Engineers, IEICE Technical Report, vol. 105, No. 570, (Jan. 20, 2006), pp. 23-28.
Chinese Office Action for CN200780041004.2 issued Sep. 27, 2011.
Masato Edahiro et al., "Multi-core Muke Software Platform o Kaihatsu shi Keitai Denwaki ni Tekiyo; Hitaisho Multi-core no Kasoka ya Kenrosei Kakuho no Shikumi o Donyu", Nikkei Electronics, Nikkei Business Publications, Inc., vol. 896, Mar. 28, 2005, pp. 125-136.
International Search Report of PCT Application No. PCT/JP2007/071323 mailed Feb. 26, 2008.

* cited by examiner

321  CPU MANAGEMENT DATA

| CPU | START POINT | END POINT | ALLOWANCE BIT |
|---|---|---|---|
| CPU4-0 | 0x30000000 | 0x30FFFFFF | R・W |
| | 0x00000000 | 0x007FFFFF | R |
| CPU4-1 | 0x30000000 | 0x30FFFFFF | R・W |
| | 0x00000000 | 0x007FFFFF | R |
| CPU4-2 | 0x31000000 | 0x31FFFFFF | R・W |
| | 0x00800000 | 0x00FFFFFF | R |
| CPU4-3 | 0x33000000 | 0x33FFFFFF | R・W |
| | 0x01800000 | 0x01FFFFFF | R |
| CPU4-4 | 0x32000000 | 0x32FFFFFF | R・W |
| | 0x01000000 | 0x017FFFFF | R |

FIG. 17

362 EXECUTION ENVIRONMENT CORRESPONDENCE INFORMATION

| CPU | EXECUTION ENVIRONMENT NUMBER |
|---|---|
| CPU4-0 | EXECUTION ENVIRONMENT 100-0 |
| CPU4-1 | EXECUTION ENVIRONMENT 100-0 |
| CPU4-2 | EXECUTION ENVIRONMENT 100-1 |
| CPU4-3 | EXECUTION ENVIRONMENT 100-2 |
| CPU4-4 | EXECUTION ENVIRONMENT 100-3 |

FIG. 18

361 EXECUTION ENVIRONMENT MANAGEMENT DATA

| EXECUTION ENVIRONMENT NUMBER | START POINT | END POINT | ALLOWANCE BIT |
|---|---|---|---|
| EXECUTION ENVIRONMENT 100-0 | 0x30000000 | 0x30FFFFFF | R·W |
|  | 0x00000000 | 0x007FFFFF | R |
| EXECUTION ENVIRONMENT 100-1 | 0x31000000 | 0x31FFFFFF | R·W |
|  | 0x00800000 | 0x00FFFFFF | R |
| EXECUTION ENVIRONMENT 100-2 | 0x33000000 | 0x33FFFFFF | R·W |
|  | 0x01800000 | 0x01FFFFFF | R |
| EXECUTION ENVIRONMENT 100-3 | 0x32000000 | 0x32FFFFFF | R·W |
|  | 0x01000000 | 0x017FFFFF | R |

※ SHARED MEMORY BASED SYNCHRONIZATION

※INTERRUPTION BASED SYNCHRONIZATION

FIG. 61

341 AUTOMATIC CPU SWITCHING DATA

| CPU | TRIGGER CONDITION | NEXT START POINT | NEXT END POINT | NEXT ALLOWANCE BIT |
|---|---|---|---|---|
| CPU4-0 | — | 0x30000000 | 0x30FFFFFF | R・W |
|  | — | 0x00000000 | 0x007FFFFF | R |
| CPU4-1 | — | 0x33000000 | 0x30FFFFFF | R・W |
|  | — | 0x00000000 | 0x007FFFFF | R |
| CPU4-2 | 0x34002000 | 0x33000000 | 0x30FFFFFF | R・W |
|  | 0x34002000 | 0x00000000 | 0x007FFFFF | R |
| CPU4-3 | 0x34003000 | — | — | — |
|  | 0x34003000 | — | — | — |
| CPU4-4 | 0x34004000 | 0x33000000 | 0x33FFFFFF | R・W |
|  | 0x34004000 | 0x01800000 | 0x01FFFFFF | R |

FIG. 65

321 CPU MANAGEMENT DATA

| PHYSICAL CPU | START POINT | END POINT | ALLOWANCE BIT |
|---|---|---|---|
| CPU4-0 | 0x30000000 | 0x30FFFFFF | R · W |
| | 0x00000000 | 0x007FFFFF | R |
| CPU4-1 | 0x30000000 | 0x30FFFFFF | R · W |
| | 0x00000000 | 0x007FFFFF | R |
| CPU4-2 | 0x30000000 | 0x30FFFFFF | R·W |
| | 0x00000000 | 0x007FFFFF | R |
| CPU4-3 | — | — | — |
| | — | — | — |
| CPU4-4 | 0x33000000 | 0x33FFFFFF | R·W |
| | 0x01800000 | 0x01FFFFFF | R |

FIG. 67

AUTOMATIC EXECUTION
ENVIRONMENT SWITCHING DATA
381

| CPU | TRIGGER CONDITION | EXECUTION ENVIRONMENT NUMBER |
|---|---|---|
| CPU4-0 | — | EXECUTION ENVIRONMENT 100-0 |
| CPU4-1 | — | EXECUTION ENVIRONMENT 100-0 |
| CPU4-2 | 0  x34002000 | EXECUTION ENVIRONMENT 100-0 |
| CPU4-3 | 0  x34003000 | NONE |
| CPU4-4 | 0  x34004000 | EXECUTION ENVIRONMENT 100-2 |

※ CASE WHERE EXECUTION ENVIRONMENT SUB CONTROL UNIT HAS SCHEDULING FUNCTION

FIG. 83

| CPU | Start | End |
|---|---|---|
| CPU#3 | 0   x0e000000 | 0   x0e000000 |
| ... | ... | ... |

52

SYSTEM STRUCTURING METHOD IN MULTIPROCESSOR SYSTEM AND SWITCHING EXECUTION ENVIRONMENT BY SEPARATING FROM OR REJOINING THE PRIMARY EXECUTION ENVIRONMENT

INCORPORATION BY REFERENCE

The present application is the National Phase of PCT/JP2007/071323, filed Nov. 1, 2007, which claims priorities based on Japanese Patent Application No. 2006-299019, filed on Nov. 2, 2006 and Japanese Patent Application No. 2007-247491, filed on Sep. 25, 2007 and includes all the disclosure of the same.

TECHNICAL FIELD

The present invention relates to a multiple processor system and, more particularly, a multiple processor system, a system structuring method in a multiple processor system and a program thereof which enable an execution environment on a processing basis to be set up taking a security level into consideration.

BACKGROUND ART

In a multiple processor system which executes a symmetric multiple processor (SMP) OS (SMP OS) on the SMP, for example, as a multiple processor system which causes an OS for a multiple processor to operate on a multiple processor, a plurality of CPUs are designed to equivalently take charge of processing of an application, so that changing a structure of an execution environment formed of a combination between processing to be executed according a state of a load of a CPU under the SMP OS and a CPU realizes efficient processing.

There exists, as such a multiple processor system, a system disclosed in related Literate 1 (Japanese Patent Laying-Open No. 2002-278778).

In the multiple processor system disclosed in the related Literature 1, with respect to all the processes (processing) executed within a certain fixed time period, determine whether a process should be executed by one specific CPU or not and when the ratio of the number of processes which is determined to be executed by one specific CPU to the total number of processes exceeds a threshold value, determine that with respect to all the processes, the specific one CPU should execute all the threads, thereby eliminating management of order in thread execution, synchronization between a cache memory and a main storage contained in each CPU, and exclusive utilization management processing for the main storage and input/output which are causing overhead.

Patent Literature 1: Japanese Patent Laying Open No. 2002-278778.

The above-described related art multiple processor system has the problems set forth below.

First, the system recited in the related Literature 1 or the like is designed to have a plurality of CPUs equivalently take charge of a plurality of processings of an application and only to change a structure of execution environments (a combination between a CPU and processing) with a CPU load state as a condition, so that it is impossible to set up an execution environment whose stability or security level is changed with each processing.

When executing fundamental processing (basic processing) of an application and incidental processing (additional processing) which is to be executed in line with the basic processing and arbitrarily added or deleted, for example, it is impossible to set up an execution environment for executing the basic processing and an execution environment for executing the additional processing while taking stability or a security level into consideration (with stability and a security level of a basic processing execution environment increased).

More specifically, in a case of simultaneously executing a plurality of processings whose required stability differs from each other, the problem occurs that such environment set-up is impossible as for executing processing which requires high stability and the other processing under different execution environments.

Other systems than a multiple processor mounted with SMP OS also have the same problem as that described above.

An object of the present invention, aiming at solving the above-described problems, is to provide a multiple processor system, a system structuring method in a multiple processor system and a program thereof which enable an execution environment to be flexibly set up according to contents of processing to be executed while taking stability and a security level into consideration.

Another object of the present invention is to provide a multiple processor system, a system structuring method in a multiple processor system and a program thereof which enable execution environment switching (structure change) to be realized at a high speed according to each processing content.

SUMMARY

In order to solve the above-described problem, the present invention includes a plurality of CPUs and a plurality of OSs to be executed on the CPUs and forms at least one execution environment combining the CPU and the OS according to processing to be executed on a system.

The present invention attains the effect of setting up an execution environment whose stability or security level is changed with each processing to be executed on the system. The reason is that by forming at least one execution environment which is mounted with a plurality of CPUs and a plurality of OSs to be executed on the CPUs and has a combination between the CPU and the OS according to processing to be executed on the system, various kinds of execution environments can be formed according to the processing.

BRIEF DESCRIPTION OF THE DRAWINGS

FIG. 17 is a diagram for use in explaining execution environment correspondence information of an execution environment management data storage device according to the first mode of implementation;

FIG. 18 is a diagram for use in explaining a structure of execution environment management data according to the first mode of implementation;

FIG. 61 is a diagram for use in explaining a structure of automatic CPU switching data according to the second mode of implementation;

FIG. 65 is a diagram for use in explaining a structure of CPU management data as of after switching according to the second mode of implementation;

FIG. 67 is a diagram for use in explaining a structure of automatic execution environment switching data according to the second mode of implementation;

FIG. 83 is a diagram showing a structure of an execution order check storage unit according to the exemplary embodiment 1 of the present invention;

EXEMPLARY EMBODIMENT

Figure 1:
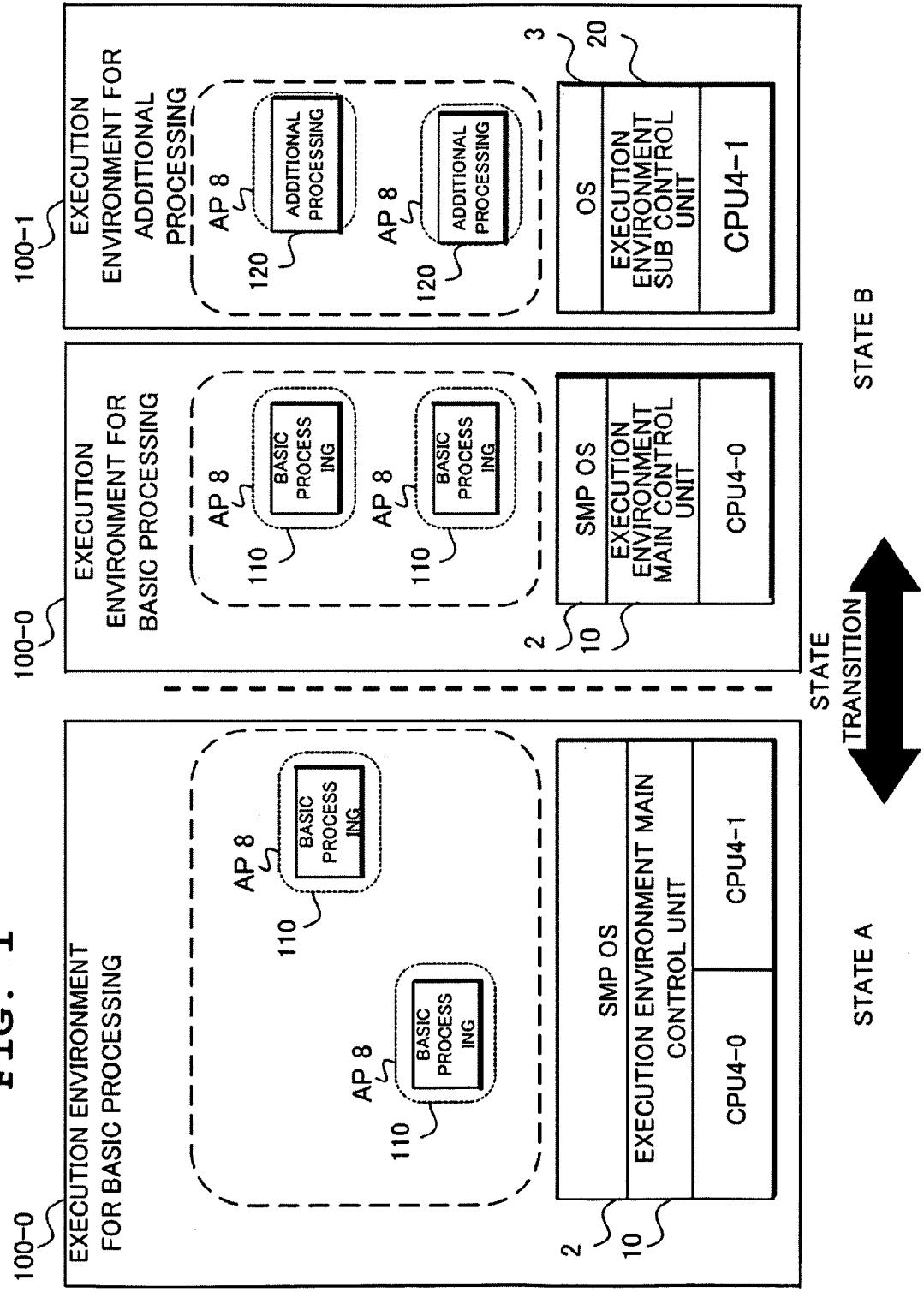
FIG. 1 is a transition diagram schematically showing a multiple processor system according to the present invention.

First, shown in FIG. 1 is a mechanism of execution environment switching (state transition) by a multiple processor system according to the present invention.

With reference to FIG. 1, the multiple processor system of the present invention enables a structure state transition according to a load of each CPU, processing stability or security level between a state (structure) having only a basic processing execution environment 100-0 in which an SMP OS 2 comprising an execution environment main control unit 10 causes execution of basic processing 110 as basic processing in an application (AP) 8 on a CPU 4-0 and a CPU 4-1 and a state (structure) formed of the basic processing execution environment 100-0 in which the SMP OS 2 comprising the execution environment main control unit 10 causes execution of the basic processing 110 on the CPU 4-0 and an additional processing execution environment 100-1 in which an OS 3 comprising an execution environment sub control unit 20 causes execution of additional processing 120 in a new application 8 on the CPU 4-1.

In the present mode of implementation, each basic processing 110 is processing fundamentally (mandatorily) provided in the application 8, whose reliability (security level) is the highest. Each additional processing 120 is processing to be added or deleted incidentally or solely to the basic processing 110 in the application 8, whose reliability (security level) is lower than that of the basic processing. Thus, each additional processing is distinguished from the basic processing 110 by a difference in processing contents or a difference in stability or a security level. Security level (reliability) represents a level assigned to each stage according to a certain security policy on a processing basis.

In other words, FIG. 1 shows a state transition between a structure state (state A) in which the basic processing execution environment 100-0 for executing only the basic processing is set up and a structure state (state B) in which a plurality of execution environments, the basic processing execution environment 100-0 for executing the basic processing and the additional processing execution environment 100-1 for executing the additional processing are set up.

It is clearly understood that the state transition shown in FIG. 1 is one example only of a state transition in the multiple processor system according to the present invention and is not limited to those illustrated.

(First Mode of Implementation)

First mode of implementation of the present invention will be detailed with reference to the drawings.

(Structure of the First Mode of Implementation)

Figure 2:
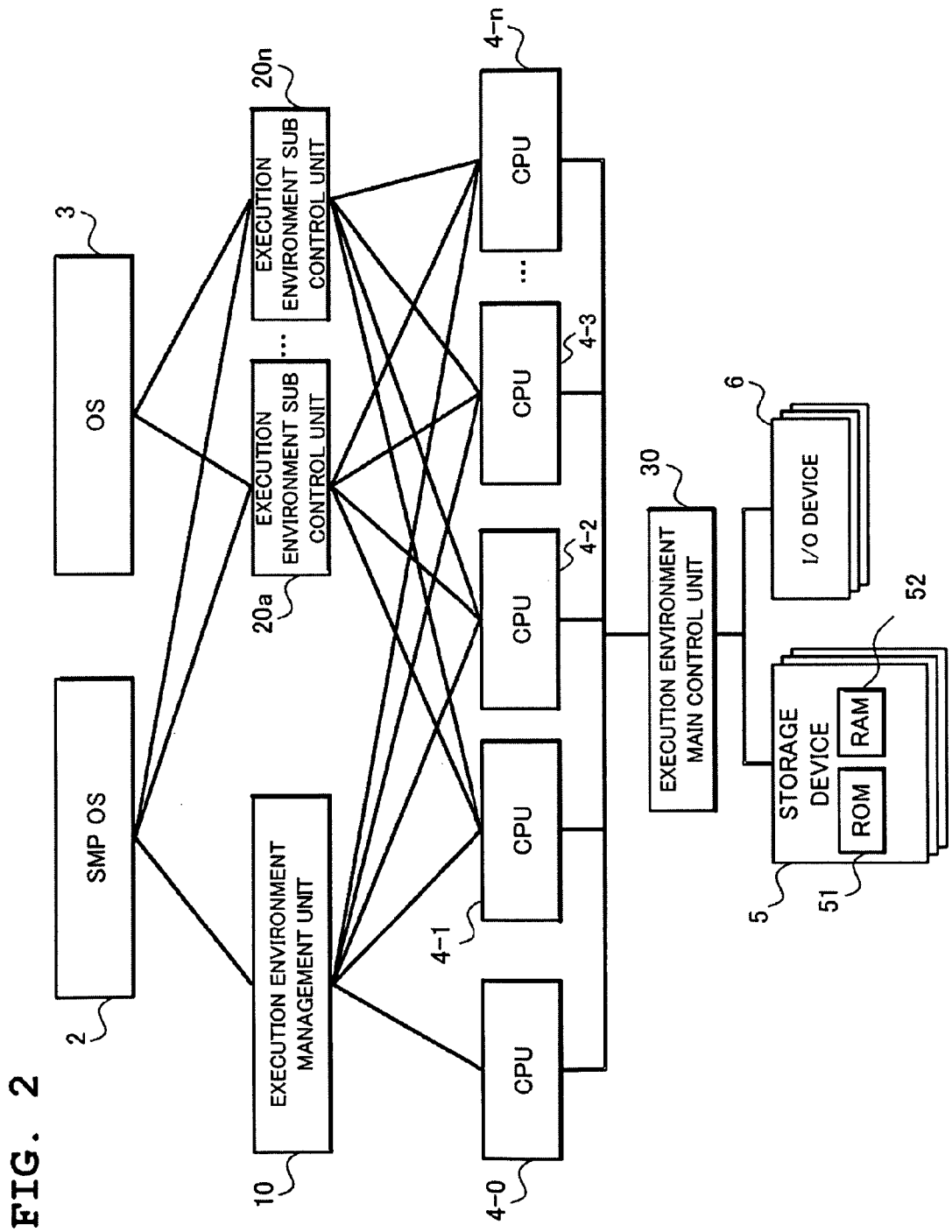
FIG. 2 is a block diagram showing a structure of a multiple processor system according to a first mode of implementation of the present invention.

FIG. 2 is a block diagram showing a structure of the multiple processor system according to the first mode of implementation of the present invention.

With reference to FIG. 2, the multiple processor system according to the present mode of implementation comprises the SMP OS 2, the OS 3, the execution environment main control unit 10, execution environment sub control units 20a~20n, the CPUs 4-0~4-n, an execution environment management unit 30, a storage device 5 and an I/O (In/Out) device 6. The SMP OS 2 is connected to the execution environment main control unit 10 and the execution environment sub control units 20a~20n, the OS 3 is connected to the execution environment sub control units 20a~20n, the execution environment main control unit 10 is connected to the CPUs 4-0~4-n, the execution environment sub control units 20a~20n are connected to the CPUs 4-1~4-n, and the CPU 4-0~4-n, and the storage device 5 and the I/O device 6 as shared resources are connected to the execution environment management unit 30.

More specifically, in the multiple processor system according to the present mode of implementation, the execution environment main control unit 10 directly controls each of the CPUs 4-0~4-n.

Figure 3:
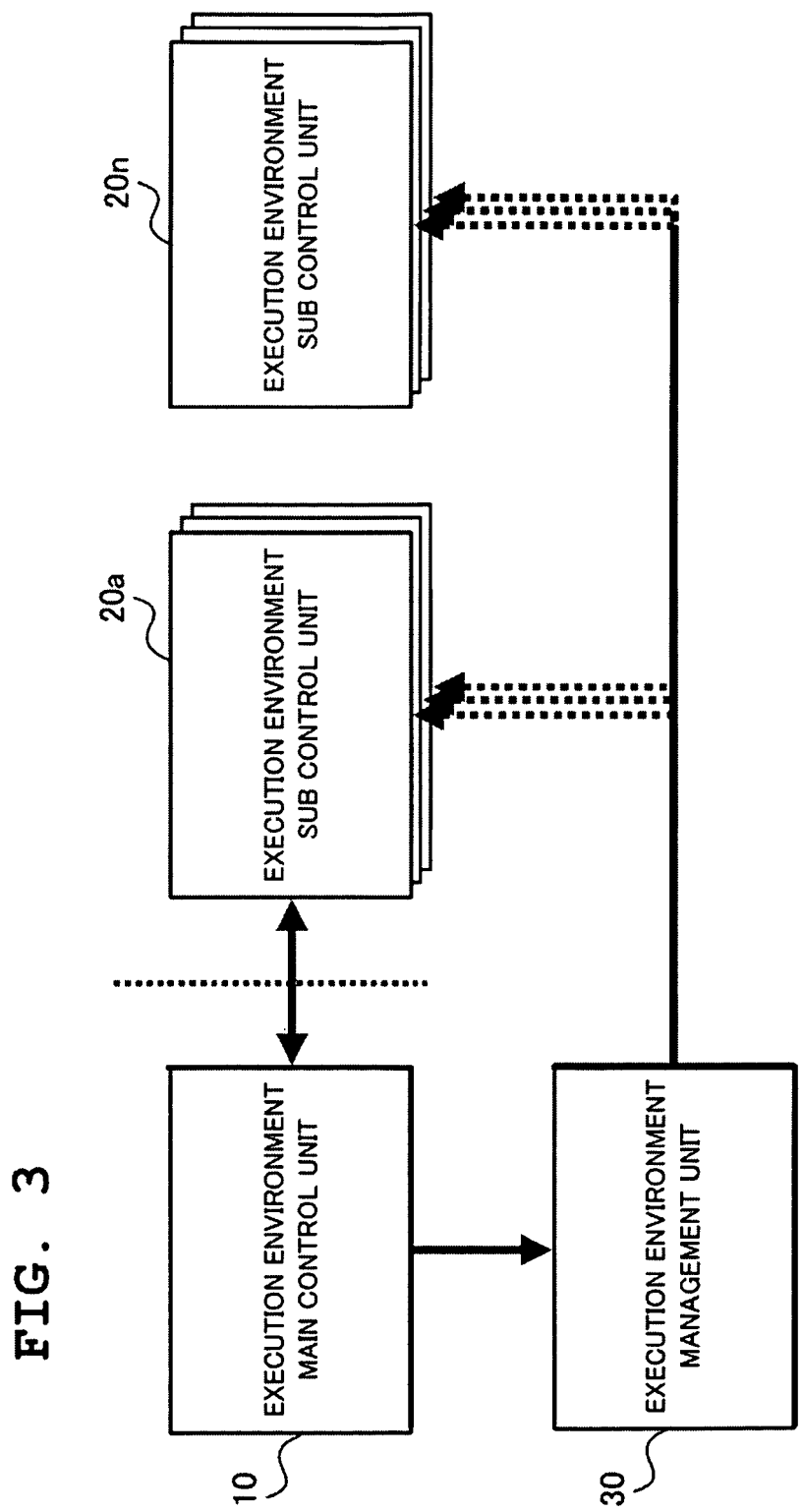
FIG. 3 is a diagram schematically showing a relationship among an execution environment main control unit, an execution environment sub control unit and an execution environment management unit which are characteristic components of the present invention.

FIG. 3 is a diagram schematically showing a correlation among the execution environment main control unit 10, the execution environment sub control units 20a~20n and the execution environment management unit 30 which are characteristic components of the present invention.

The execution environment main control unit 10 has a function of executing the basic processing execution environment, a function of controlling the additional processing execution environment, a function of setting management information of the CPU 4 and execution environments at the execution environment management unit 30, a function of transmitting and receiving execution environment management information or context information (context 90) to/from the execution environment sub control unit 20, and a function of preventing the execution environment management unit 30 from causing interference between execution environments.

More specifically, the execution environment main control unit 10 receives input, as input information, of a start/switching notification from the application or the OS 3, an event notification such as a timer or an interruption, or a switching notification from the execution environment sub control unit 20 to operate together with the SMP OS 2 for the basic processing 110 or the OS 3, or determine CPU assignment of an execution environment, or control start/stop/switching of an execution environment, or guarantee right control in cooperation with the execution environment sub control unit 20 and the execution environment management unit 30 and depending on a case, output execution environment control information and context information (context 90) to the execution environment sub control unit 20 as output information.

For example, at the time of determination of CPU assignment, the execution environment main control unit 10 determines CPU assignment based on a difference in a reliability (a security level) of the additional processing, a reliability (a security level) of a CPU, in performance, correlation or adaptability between the basic processing and the additional processing or the like.

More specifically, when accepting a request for starting the execution environment 100-1, for example, as a start/switching notification from the AP 8 or the OS 3, the execution environment main control unit 10 starts the execution environment 100-1, when receiving a notification that an execution environment 100-3 is no more necessary, for example, stops the execution environment 100-3, and when receiving a request for communication with a certain application in an execution environment 100-2, for example, if the execution environment 100-2 is in operation, refrains from doing anything and if it is stopped, starts the execution environment 100-2. When starting, if more execution environments than the number of CPUs will operate, it is desirable to start the execution environment 100-2 by switching from an execution environment whose operation time is the longest.

Furthermore, when more execution environments than the number of CPUs are in operation at the time of receiving a timer interruption as a spontaneous request, for example, the execution environment main control unit 10 switches the execution environment in operation to an execution environment whose execution time is short (policy for selecting an execution environment whose execution time is short is arbitrary) among execution environments being stopped and when starting or stopping an execution environment 100-4 upon a predetermined external interruption, for example, starts or stops the execution environment 100-4 upon a predetermined external interruption. When starting the environment, if more execution environments than the number of CPUs are in operation, it is desirable to start the execution environment 100-4 by switching from the execution environment in question.

The execution environment sub control unit 20 has a function of controlling the additional processing execution environment upon a notification of the execution environment main control unit 10.

More specifically, the execution environment sub control unit 20 receives input of the execution environment control information and the context information (context 90) from the execution environment main control unit 10 as input information and controls start/stop/switching of the execution environment according to an instruction from the execution environment main control unit 10 to synchronize with the execution environment main control unit 10. Synchronization with the execution environment main control unit 10 enables separation of execution environments as of before and after switching. The execution environment sub control unit 20 outputs error information to the execution environment main control unit 10 as output information depending on circumstances.

The execution environment management unit 30 has a function of separating the execution environment main control unit 10 and the execution environment sub control units 20a~20n, or the execution environment sub control units 20a~20n. More specifically, the execution environment management unit 30 receives input of management information or reference refusal information of the CPU 4 or the shared resources (the storage device 5, the I/O device 6) for each execution environment as input information to refrain from doing anything or refuse the same in response to a reference from each CPU based on the input information and returns the error information.

Figure 4:
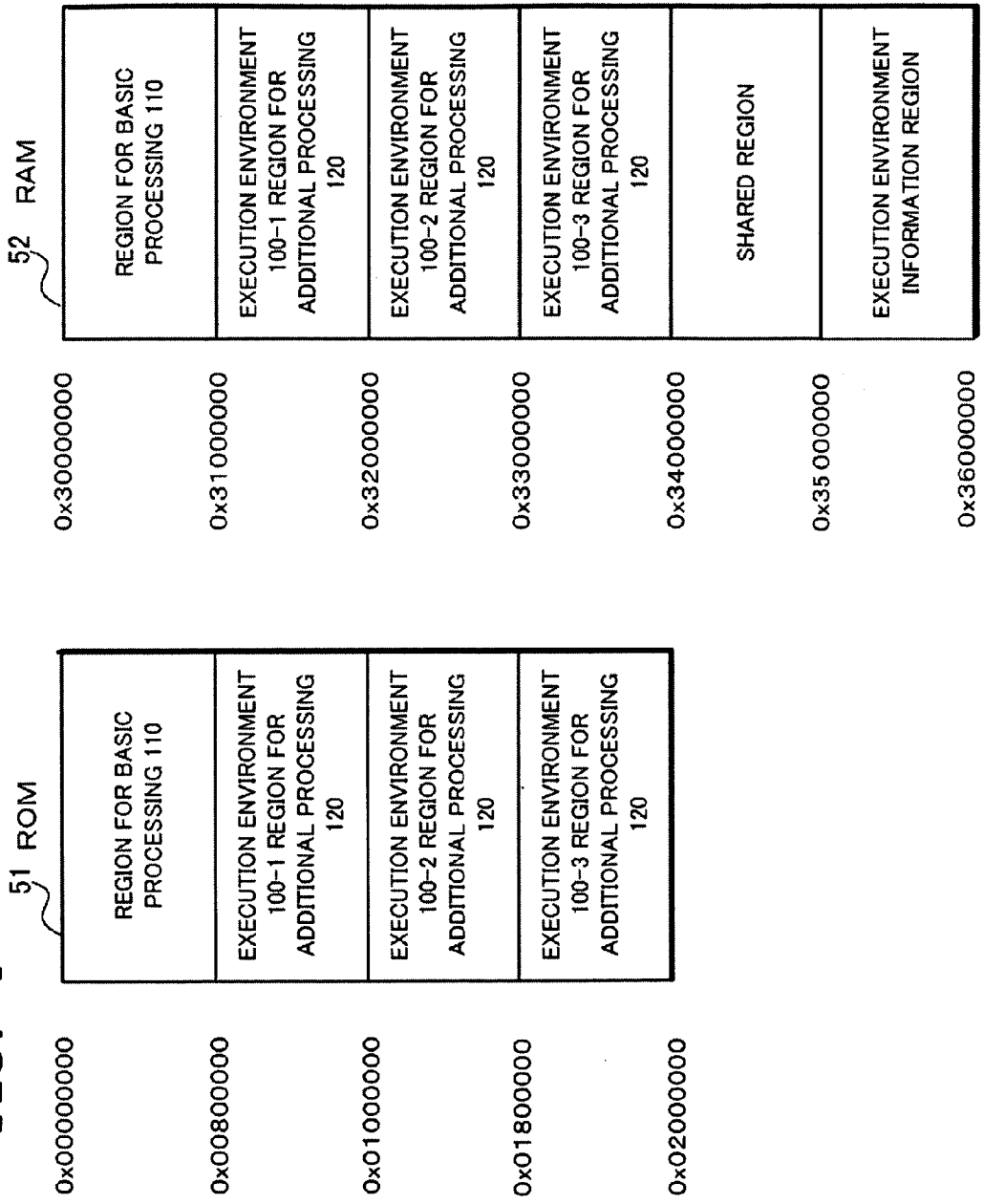
FIG. 4 is a diagram for use in explaining a logical address of a storage device according to the first mode of implementation.

The shared resources are assigned to each processing according to, for example, an address and may have an address predetermined for a region for the basic processing 110, a region for the execution environment 100 for the additional processing 120, a shared region and an execution environment information region. FIG. 4 is a diagram for use in explaining a logical address of the storage device as a shared resource.

With reference to FIG. 4, a ROM 51 of the storage device 5 has a basic processing 110 region with the address 0x000000000~0x007FFFFF, an execution environment 100-1 region for additional processing with the address 0x00800000~0x00FFFFFF, an execution environment 100-2 region for the additional processing 120 with the address 0x01000000~0x017FFFFF and an execution environment 100-3 region for the additional processing 120 with the address 0x01800000~0x02000000, while a RAM 52 of the storage device 5 has a basic processing 110 region with the address 0x30000000~0x30FFFFFF, an execution environment 100-1 region for the additional processing 120 with the address 0x31000000~0x31FFFFFF, an execution environment 100-2 region for the additional processing 120 with the address 0x32000000~0x32FFFFFF, an execution environment 100-3 region for the additional processing 120 with the address 0x33000000~0x33FFFFFF, a shared region with the address 0x34000000~0x34FFFFFF and an execution environment information region with the address 0x35000000~0x36000000.

Figure 5:
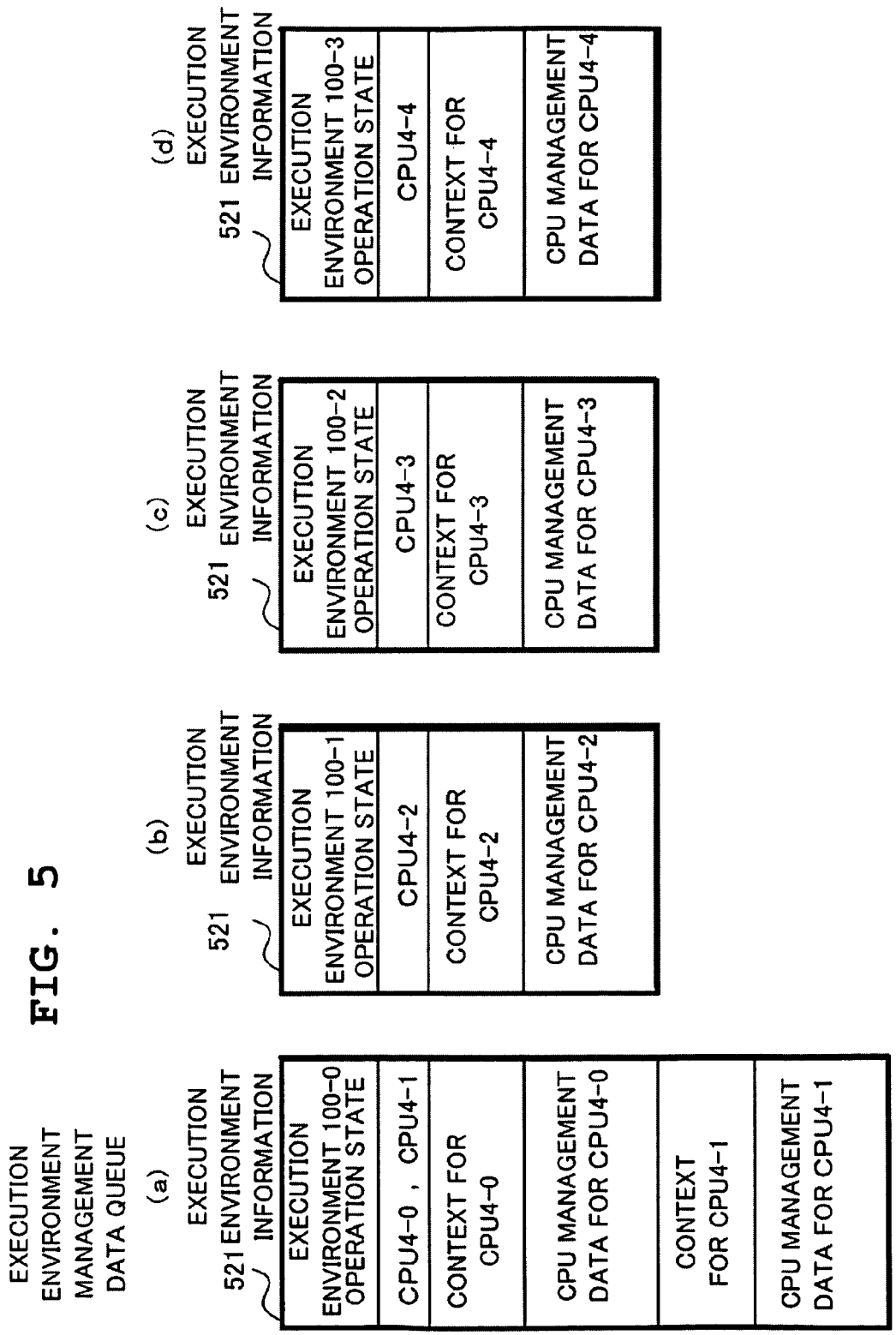
FIG. 5 is a diagram for use in explaining CPU-based execution environment information on an RAM according to the first mode of implementation.
Figure 6:
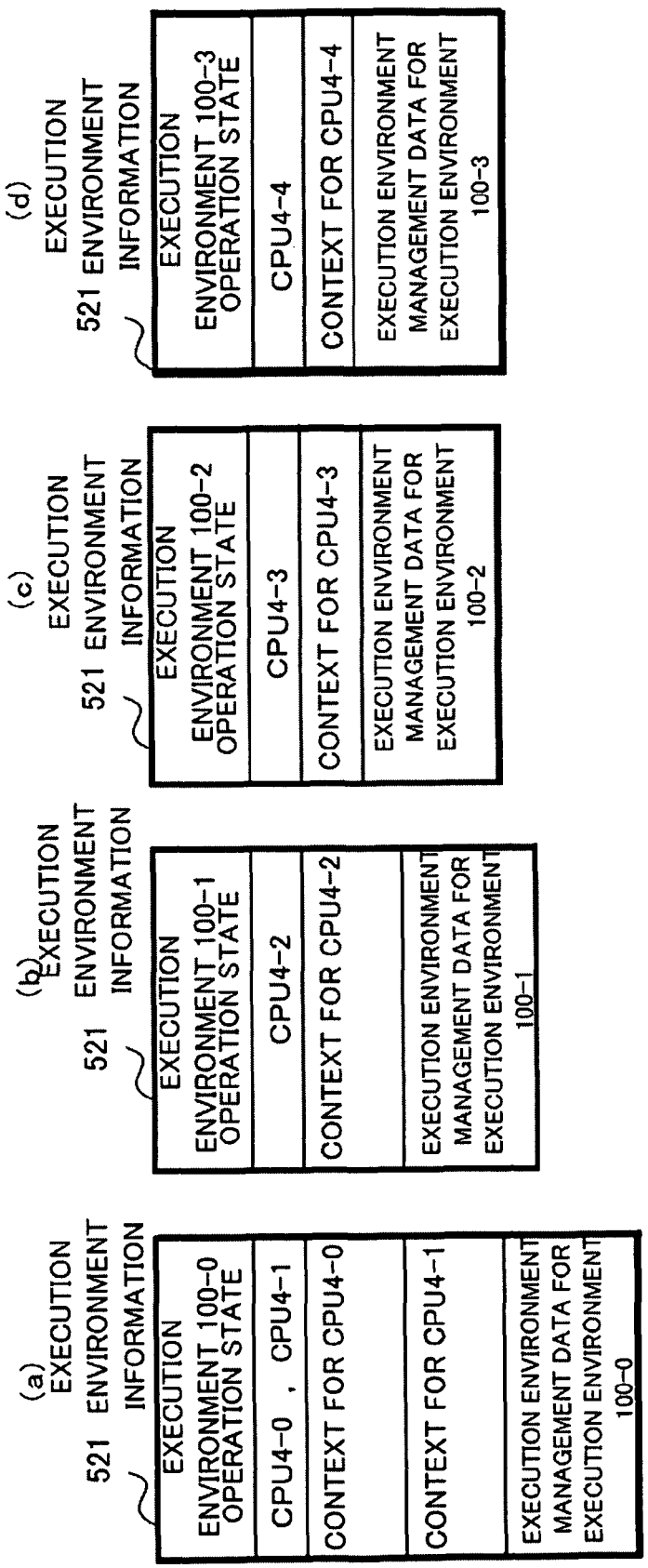
FIG. 6 is a diagram for use in explaining execution environment based execution environment information on the RAM according to the first mode of implementation.

FIG. 5 and FIG. 6 are diagrams for use in explaining execution environment information on the RAM.

FIG. 5 is a diagram for use in explaining CPU-based execution environment information on the RAM and with reference to FIG. 5(a)~FIG. 5(d), CPU-based execution environment information stores an operation state of each execution environment as a context for a CPU and CPU management data which form each of the execution environments 100-1~100-3.

FIG. 6 is a diagram for use in explaining execution environment based execution environment information on the RAM and with reference to FIG. 6(a)~FIG. 6(d), execution environment based execution environment information stores an operation state of each execution environment as a context for a CPU and execution environment information for each execution environment which form each of the execution environments 100-1~100-3.

Figure 7:
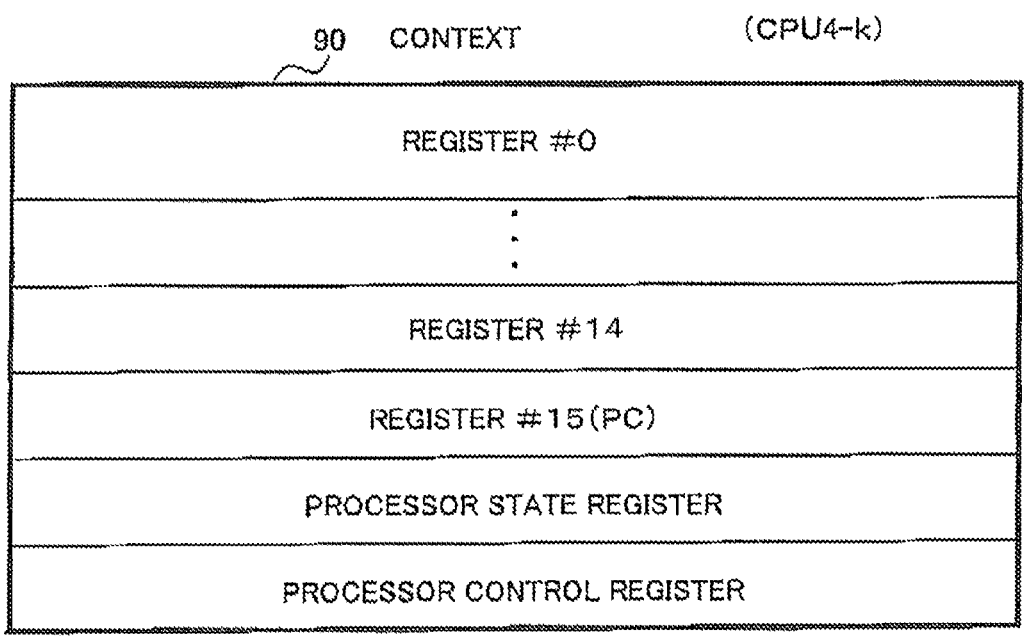
FIG. 7 is a diagram showing a structure of a context of a CPU according to the first mode of implementation.

FIG. 7 is a diagram showing a structure of a context of a CPU 4-k. With reference to FIG. 7, the context 90 of the CPU 4-k comprises registers #0~#14, a register #15 (PC), a processor state register and a processor control register, in which stored, for example, are all the storage states of the CPU 4-*k* in operation at a designated instant.

Here, further detailed description will be made of the structures of the execution environment main control unit 10 and the execution environment sub control unit 20 according to the present mode of implementation.

Figure 8:
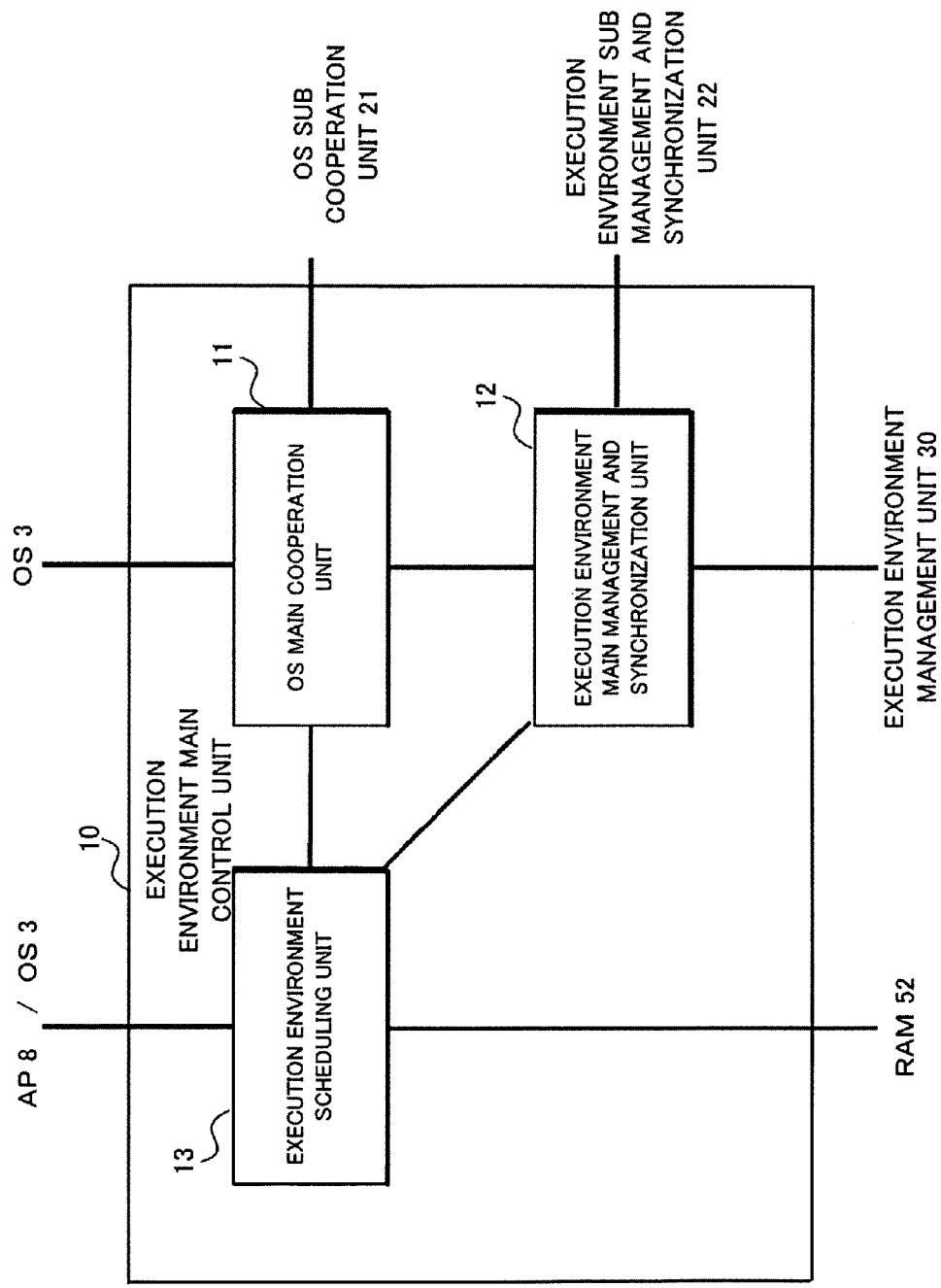
FIG. 8 is a block diagram showing a structure of the execution environment main control unit according to the first mode of implementation.

FIG. 8 is a block diagram showing the structure of the execution environment main control unit 10 according to the present mode of implementation.

With reference to FIG. 8, the execution environment main control unit 10 according to the present mode of implementation comprises an execution environment scheduling unit 13 connected to the AP 8/OS 3 and the RAM, an OS main cooperation unit 11 connected to the OS 3, an OS sub cooperation unit 21 (which will be described later) and the execution environment scheduling unit 13, and an execution environment main management and synchronization unit 12 connected to the OS sub cooperation unit 21, an execution environment sub management and synchronization unit 22, the execution environment management unit 30 and the execution environment scheduling unit 13.

The execution environment scheduling unit 13 has a function of, upon receiving some request from the AP 8/OS 3, for example, as input information, referring to execution environment information on the RAM 52 to notify the OS main cooperation unit 11 of such a control instruction as start/stop/addition/switching of an execution environment to which the execution environment scheduling unit 13 itself belongs, its CPU and its OS, or such a control instruction as start/stop/addition/switching of an execution environment to which the execution environment scheduling unit 13 itself fails to belong, its CPU and its OS based on the referred execution environment information, a function of notifying the OS main cooperation unit 11 of information about a context to be switched next or a former context, a function of notifying the execution environment main management and synchronization unit 12 of setting information of the execution environment scheduling unit 13 as of after addition of a CPU and the like by the control instruction, and a function of updating execution environment information on the RAM 52.

The OS main cooperation unit 11 has a function of executing a control instruction received from the execution environment scheduling unit 13, a function of notifying the OS sub cooperation unit 21 (which will be described later) of the relevant control instruction, a function of setting information of a former context or a context as of after switching at the OS 3, a function of obtaining a context of the OS 3 in operation and transferring the same to the execution environment scheduling unit 13, and a function of executing a control instruction received from the OS sub cooperation unit 21 (which will be described later).

The execution environment main management and synchronization unit 12 has a function of setting setting information notified to the execution environment scheduling unit 13 at the execution environment scheduling unit 13, a function of notifying the execution environment scheduling unit 13 or the OS main cooperation unit 11 that the setting is completed, and a function of synchronizing processing with the execution environment sub management and synchronization unit 22 (which will be described later).

Figure 9:
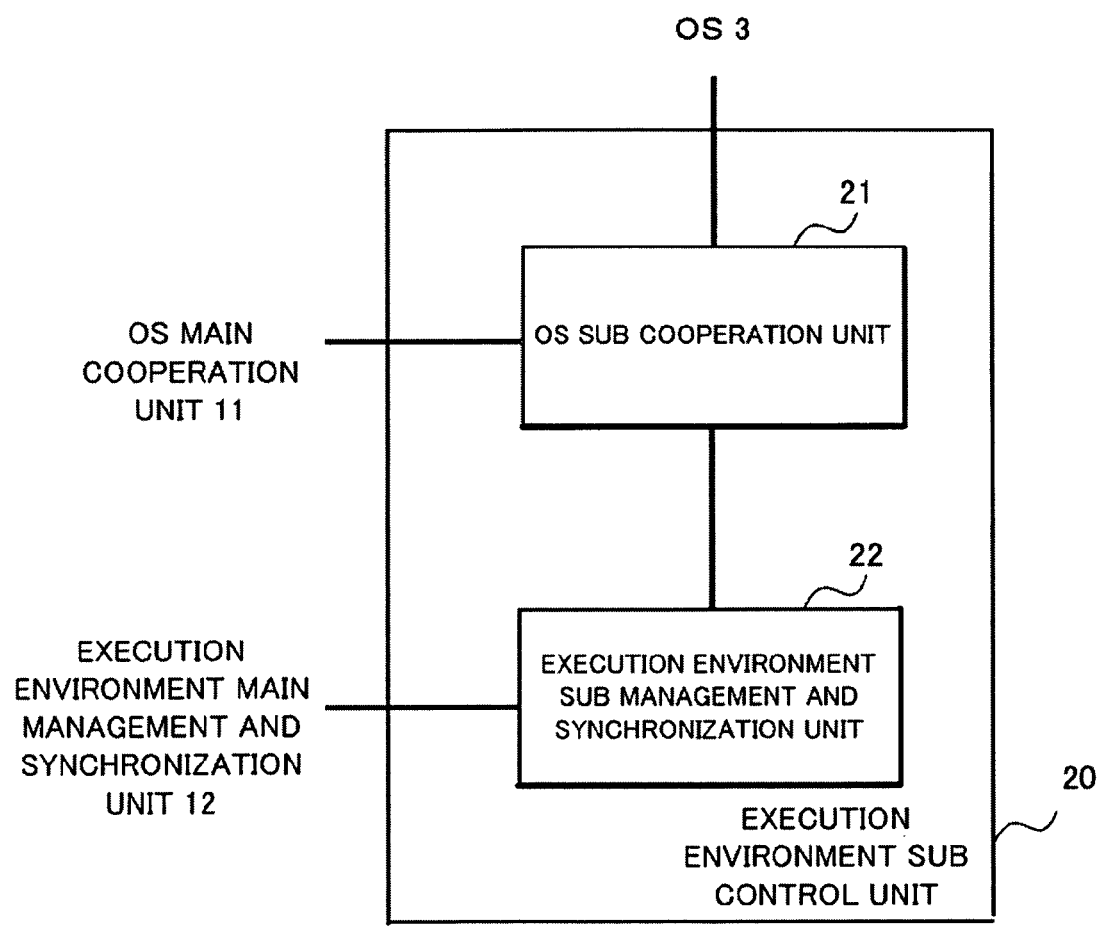
FIG. 9 is a block diagram showing a structure of the execution environment sub control unit according to the first mode of implementation.

FIG. 9 is a block diagram showing a structure of the execution environment sub control unit 20 according to the present mode of implementation.

With reference to FIG. 9, the execution environment sub control unit 20 according to the present mode of implementation comprises the OS sub cooperation unit 21 connected to the OS 3 and the OS main cooperation unit 11, and the execution environment sub management and synchronization unit 22 connected to the execution environment main management and synchronization unit 12 and the OS sub cooperation unit 21.

The OS sub cooperation unit 21 has a function of executing a control instruction received from the OS main cooperation unit 11, a function of notifying the execution environment sub management and synchronization unit 22 that an instruction has been executed, a function of obtaining information of a context of an OS in an execution environment to which the OS sub cooperation unit 21 itself belongs to send the information to the OS main cooperation unit 11, a function of setting information of a former context or a context of a switching destination which is sent from the OS main cooperation unit 11 at the OS 3 of the execution environment to which the OS sub cooperation unit 21 itself belongs, and a function of notifying the OS main cooperation unit 11 of some request received from the OS 3 of the execution environment to which the OS sub cooperation unit 21 itself belongs as input information.

The execution environment sub management and synchronization unit 22 has a function of, when notified by the OS sub cooperation unit 21 that an instruction has been executed, synchronizing processing with the execution environment main management and synchronization unit 11 by notifying the execution environment main management and synchronization unit 11 that the instruction has been executed or the like.

Figure 10:
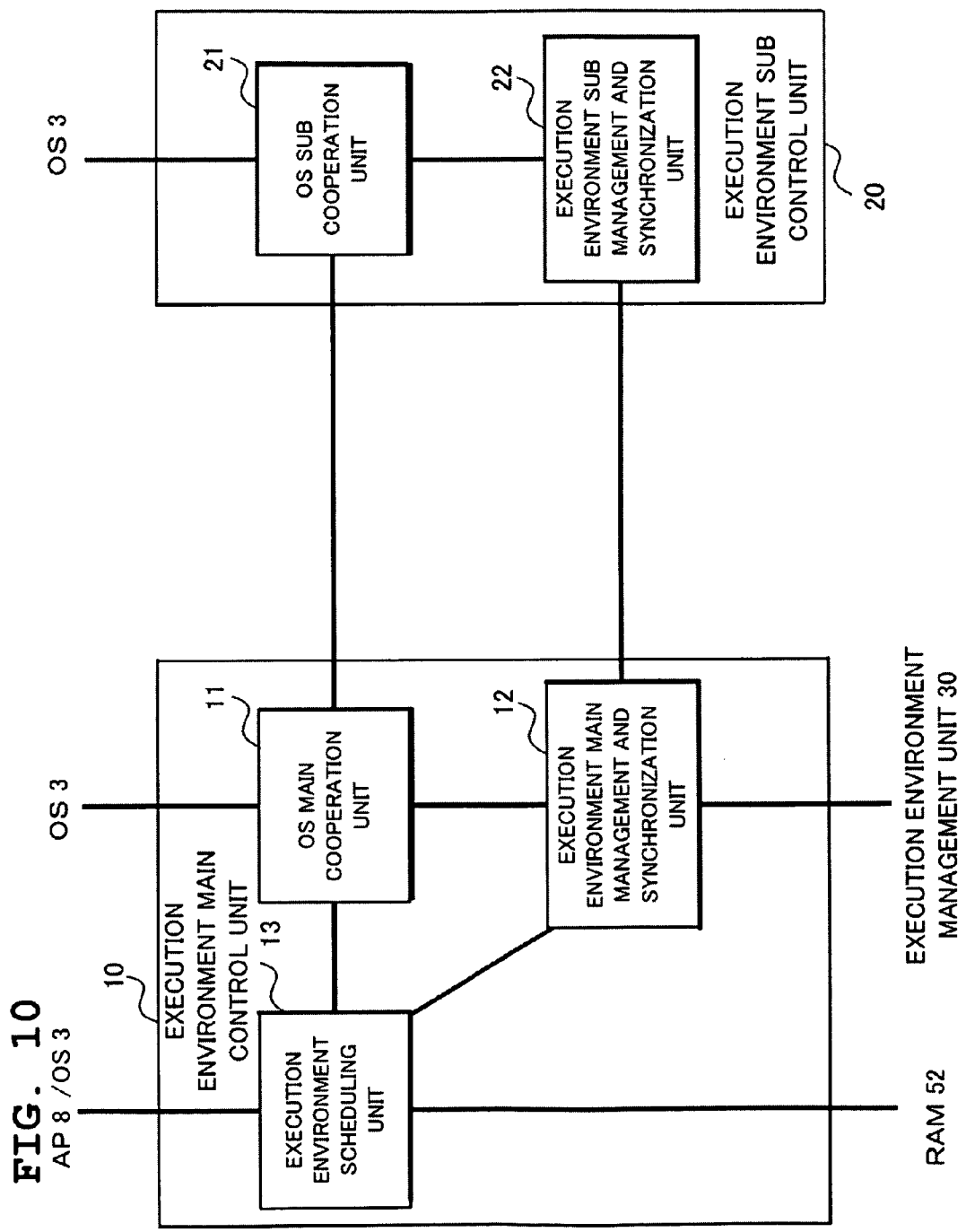
FIG. 10 is a block diagram showing a connection relationship between the execution environment main control unit and the execution environment sub control unit according to the first mode of implementation.

FIG. 10 is a block diagram showing a connection relationship between the execution environment main control unit 10 and the execution environment sub control unit 20 according to the first mode of implementation of the present invention.

Here, further detailed description will be made of the structure of the execution environment management unit 30 according to the present mode of implementation on (a) a CPU basis and (b) an execution environment basis.

((A) CPU Base)

FIG. 11 through FIG. 15 are diagrams for use in explaining the structure of the execution environment management unit 30 according to the present mode of implementation on a CPU basis.

Figures 11, 12:
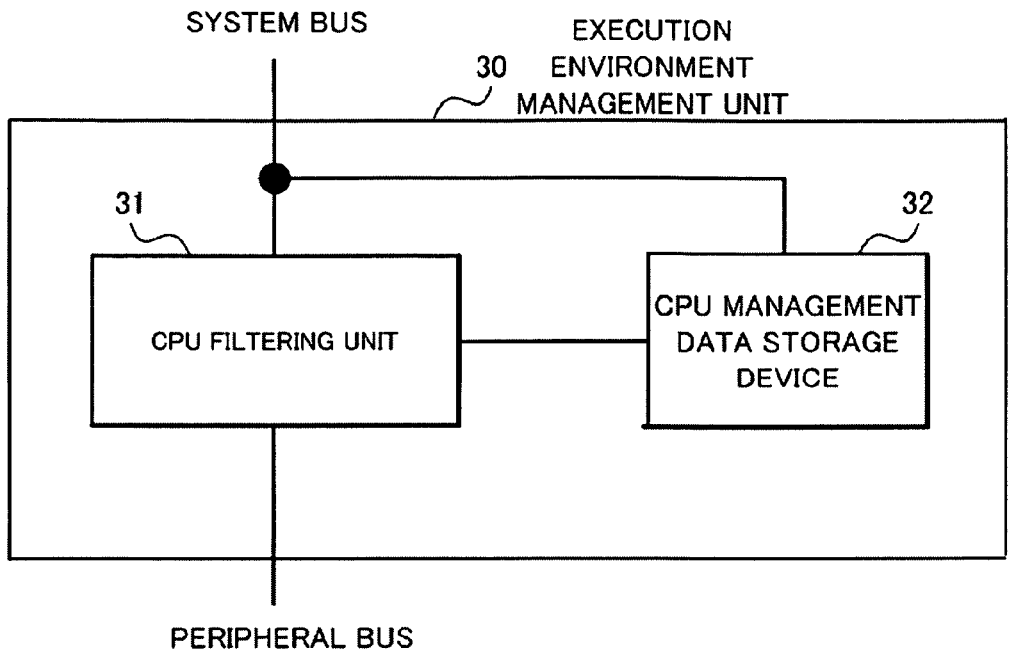
FIG. 11 is a block diagram for use in explaining a structure of the execution environment management unit according to the first mode of implementation on a CPU basis.
FIG. 12 is a diagram for use in explaining a structure of CPU management data according to the first mode of implementation.

FIG. 11 is a block diagram for use in explaining the structure of the execution environment management unit 30 according to the present mode of implementation on a CPU basis. With reference to FIG. 11, the execution environment management unit 30 comprises a CPU filtering unit 31 connected to a system bus and a peripheral bus, and a CPU management data storage device 32 connected to the system bus and the CPU filtering unit 31.

The CPU filtering unit 31 has a function of, upon receiving an access request from a certain CPU 4 through the system bus, determining whether to refuse the access request based on CPU management data 321 (which will be described later) read from the CPU management data storage device 32.

The CPU management data storage device 32 has a function of storing the CPU management data 321 to execute a request for updating the CPU management data 321.

FIG. 12 is a diagram for use in explaining a structure of the CPU management data 321 according to the present mode of implementation. With reference to FIG. 12, the CPU management data 321 is formed, with respect to each of the CPUs 4-0~4-4, of entries in which a start point and an end point of an assigned storage device 5 region, and an allowance bit indicative of allowed processing, either read processing (R) or write processing (W), are recited.

Next, description will be made of a CPU-based function of the execution environment management unit 30 according to the present mode of implementation.

(Data Updating Function)

Figure 13:
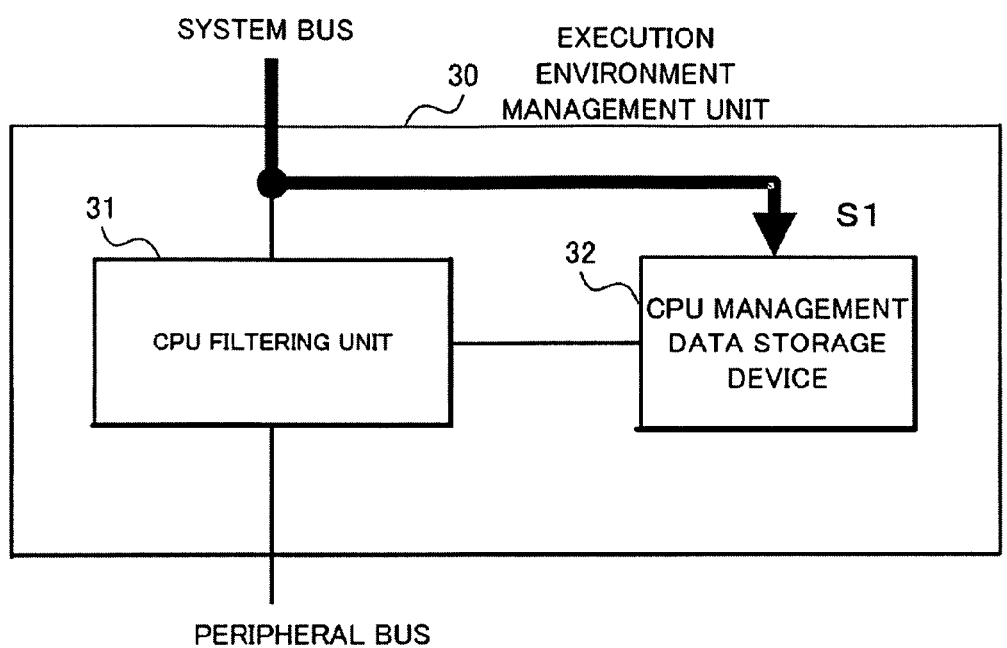
FIG. 13 is a diagram for use in explaining a data updating function of the execution environment management unit according to the first mode of implementation.

FIG. 13 is a diagram for use in explaining a data updating function of the execution environment management unit 30 according to the present mode of implementation. With reference to FIG. 13, the data updating function of the execution environment management unit 30 updates the CPU management data 321 at Step S1. Basically, only a CPU which is executing the basic processing is allowed to access the CPU management data 321. As to a predetermined entry, a CPU which is executing the additional processing is allowed to access the CPU management data 321.

(Access Allowance Function)

Figure 14:
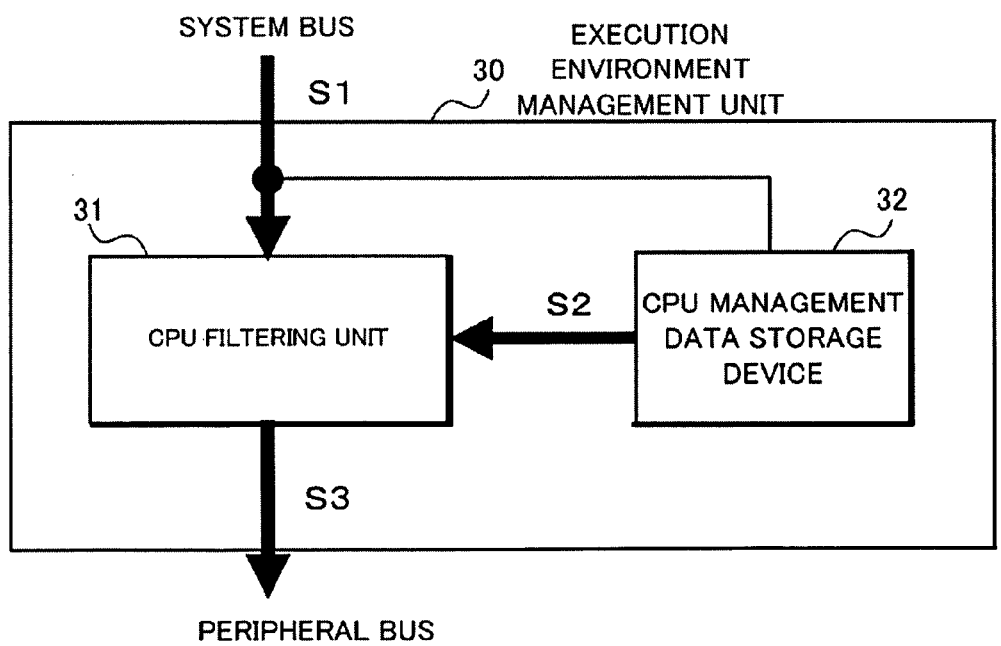
FIG. 14 is a diagram for use in explaining an access allowance function of the execution environment management unit according to the first mode of implementation.

FIG. 14 is a diagram for use in explaining an access allowance function of the execution environment management unit 30 according to the present mode of implementation. With reference to FIG. 14, in the access allowance function of the execution environment management unit 30, the CPU filtering unit 31 accepts an access from an arbitrary CPU at Step S1, reads the CPU management data 321 at Step S2, and determines whether the accepted access is allowed or not based on the read CPU management data 321 to allow the accepted access at Step S3.

(Access Refusal Function)

Figure 15:
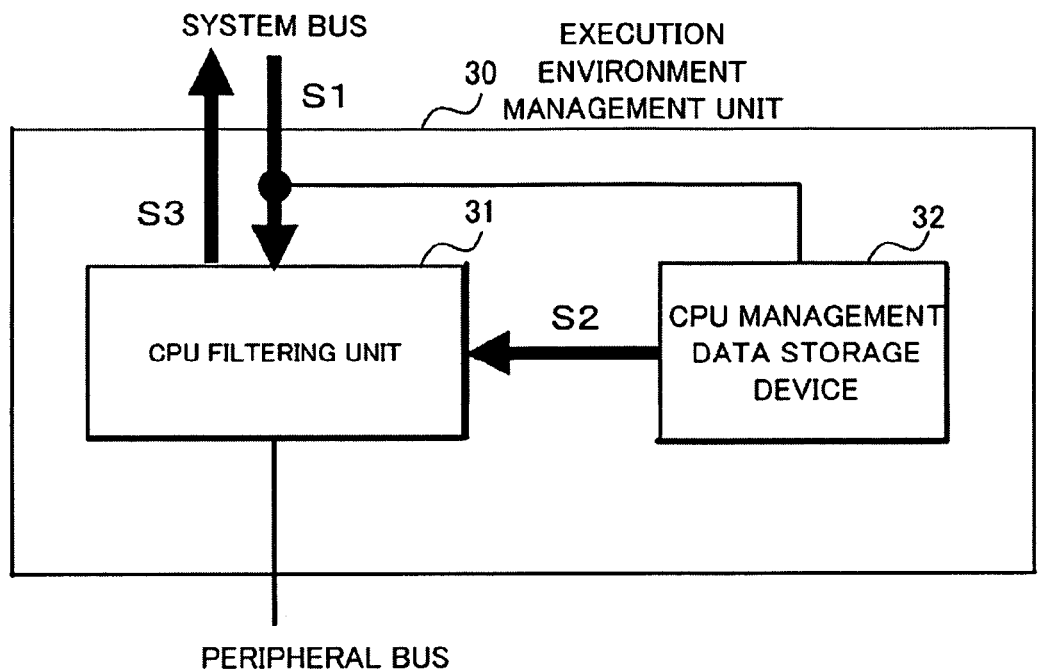
FIG. 15 is a diagram for use in explaining an access refusal function of the execution environment management unit according to the first mode of implementation.

FIG. 15 is a diagram for use in explaining an access refusal function of the execution environment management unit 30 according to the present mode of implementation. With reference to FIG. 15, in the access refusal function of the execution environment management unit 30, the CP filtering unit 31 accepts an access from an arbitrary CPU at Step S1, reads the CPU management data 321 at Step S2, and determines whether the accepted access is allowed or not based on the read CPU management data 321 to refuse the accepted access at Step S3. When constraint on timing is strict, not by refusing the access by this circuit but by daring to convert an access address to an address not existing in the system to cause another circuit to make such a refusal.

((B) Execution Environment Base)

FIG. 16 through FIG. 21 are diagrams for use in explaining the structure of the execution environment management unit 30 according to the present mode of implementation on an execution environment basis.

Figure 16:
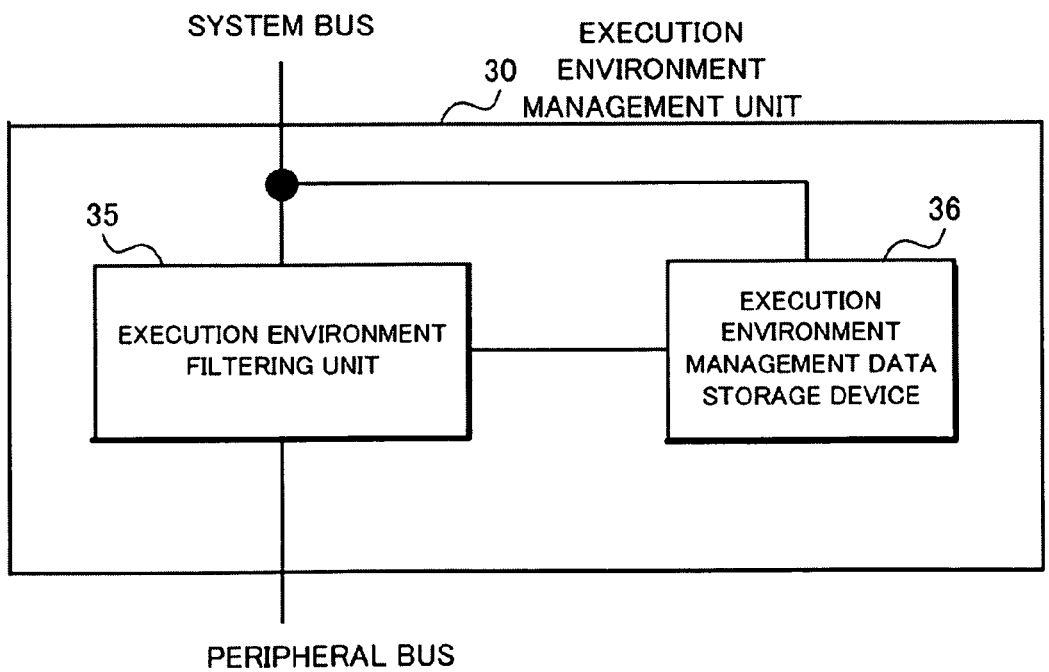
FIG. 16 is a block diagram for use in explaining a structure of the execution environment management unit according to the first mode of implementation on an execution environment basis.

FIG. 16 is a block diagram for use in explaining the structure of the execution environment management unit 30 according to the present mode of implementation on an execution environment basis. With reference to FIG. 16, the execution environment management unit 30 comprises an execution environment filtering unit 35 connected to a system bus and a peripheral bus and an execution environment management data storage device 36 connected to the system bus and the execution environment filtering unit 35.

The execution environment filtering unit 35 has a function of, upon receiving an access request from a certain CPU 4 through the system bus, determining to refuse the access request based on execution environment management data 361 and execution environment correspondence information 362 (which will be described later) read from the execution environment management data storage device 36.

The execution environment management data storage device 36 has a function of storing the execution environment management data 361 and the execution environment correspondence information 362 to execute a request for updating the execution environment management data 361 and the execution environment correspondence information 362.

FIG. 17 is a diagram for use in explaining the execution environment correspondence information 362 of the execution environment management data storage device 36 according to the present mode of implementation. With reference to FIG. 17, the execution environment correspondence information 362 has the respective CPUs 4-0~4-4 correlated with the execution environments 100-0~100-4 indicated by the execution environment numbers. In more detail, the CPUs 4-0 and 4-1 are made to correspond to the execution environment 100-0, the CPU 4-2 to the execution environment 100-1, the CPU 4-3 to the execution environment 100-2 and the CPU 4-4 to the execution environment 100-3.

FIG. 18 is a diagram for use in explaining a structure of the execution environment management data 361 according to the present mode of implementation. With reference to FIG. 18, the execution environment management data 361 is formed, with respect to the execution environments 100-0~100-4 indicating the execution environment numbers, of entries in which a start point and an end point of an assigned storage device 5 region, and an allowance bit indicative of processing allowed, either the read processing (R) or the write processing (W), are recited.

Next, description will be made of a function of the execution environment management unit 30 according to the present mode of implementation on an execution environment basis.

(Data Updating Function)

Figure 19:
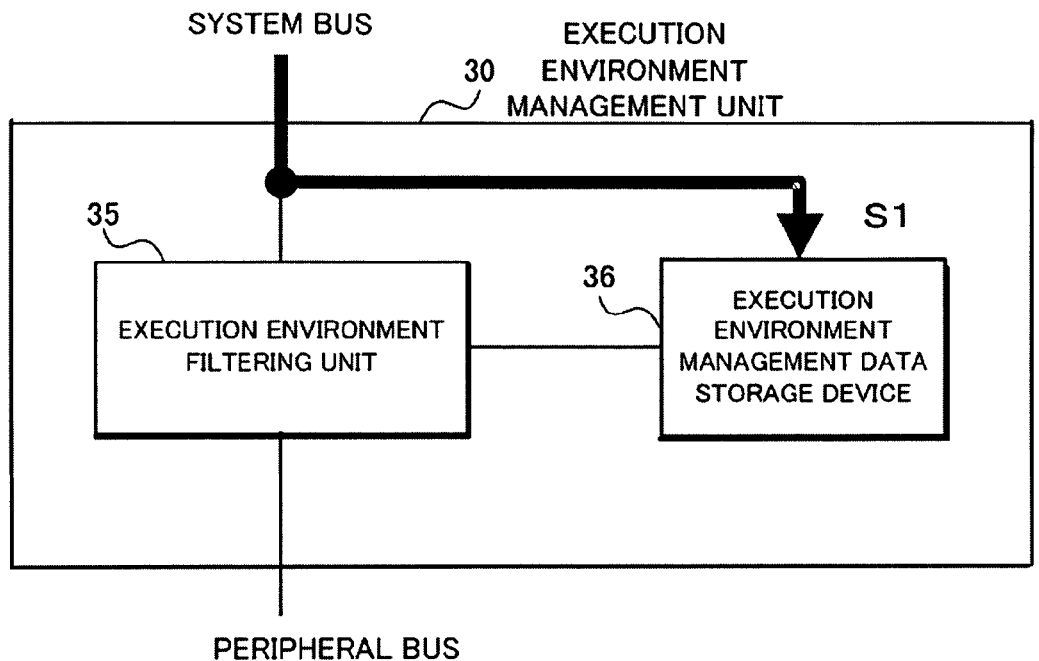
FIG. 19 is a diagram for use in explaining the data updating function of the execution environment management unit according to the first mode of implementation.

FIG. 19 is a diagram for use in explaining a data updating function of the execution environment management unit 30 according to the present mode of implementation. With reference to FIG. 19, the data updating function of the execution environment management unit 30 updates the execution environment management data 361 at Step S1. Basically, only a CPU which is executing the basic processing is allowed to access the execution environment management data 361. As to a predetermined entry, the CPU 4 which is executing the additional processing is allowed to access the execution environment management data 361.

(Access Allowance Function)

Figure 20:
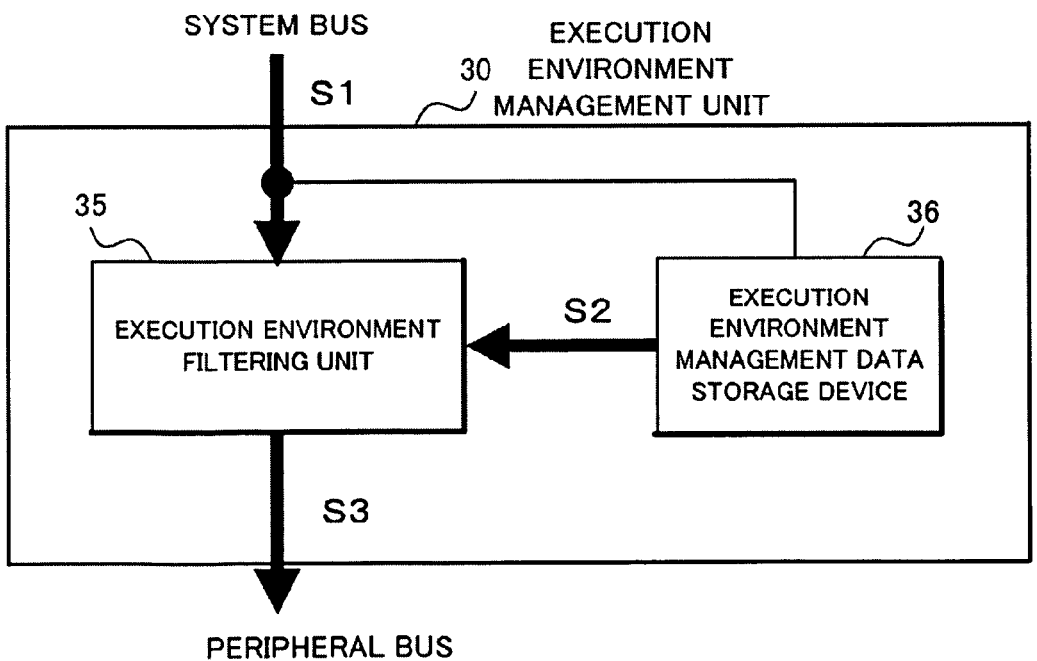
FIG. 20 is a diagram for use in explaining the access allowance function of the execution environment management unit according to the first mode of implementation.

FIG. 20 is a diagram for use in explaining an access allowance function of the execution environment management unit 30 according to the present mode of implementation. With reference to FIG. 20, in the access allowance function of the execution environment management unit 30, the execution environment filtering unit 35 accepts an access from an arbitrary CPU at Step S1, reads the execution environment management data 361 at Step S2, and determines whether the accepted access is allowed or not based on the read execution environment management data 361 to allow the accepted access at Step S3.

(Access Refusal Function)

Figure 21:
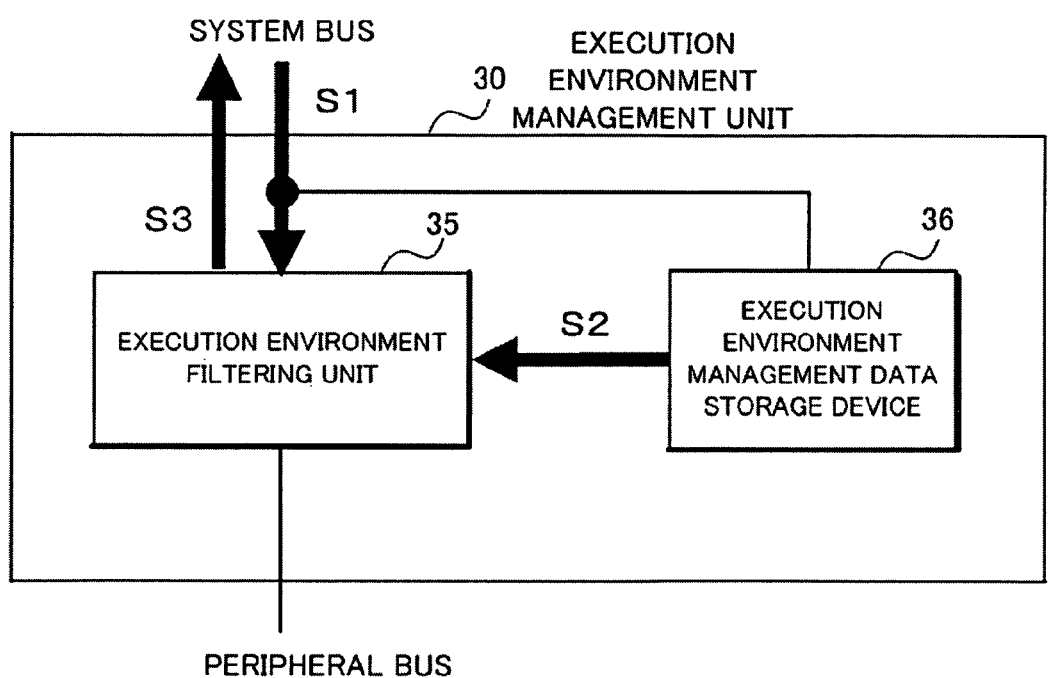
FIG. 21 is a diagram for use in explaining the access refusal function of the execution environment management unit according to the first mode of implementation.

FIG. 21 is a diagram for use in explaining an access refusal function of the execution environment management unit 30 according to the present mode of implementation. With reference to FIG. 21, in the access refusal function of the execution environment management unit 30, the execution environment filtering unit 35 accepts an access from an arbitrary CPU at Step S1, reads the execution environment management data 361 at Step S2, and determines whether the accepted access is allowed or not based on the read execution environment management data 361 to refuse the accepted access at Step S3. When constraint on timing is strict, not by refusing the access by this circuit but by daring to convert an access address to an address not existing in the system to cause another circuit to make such a refusal.

Figure 22:
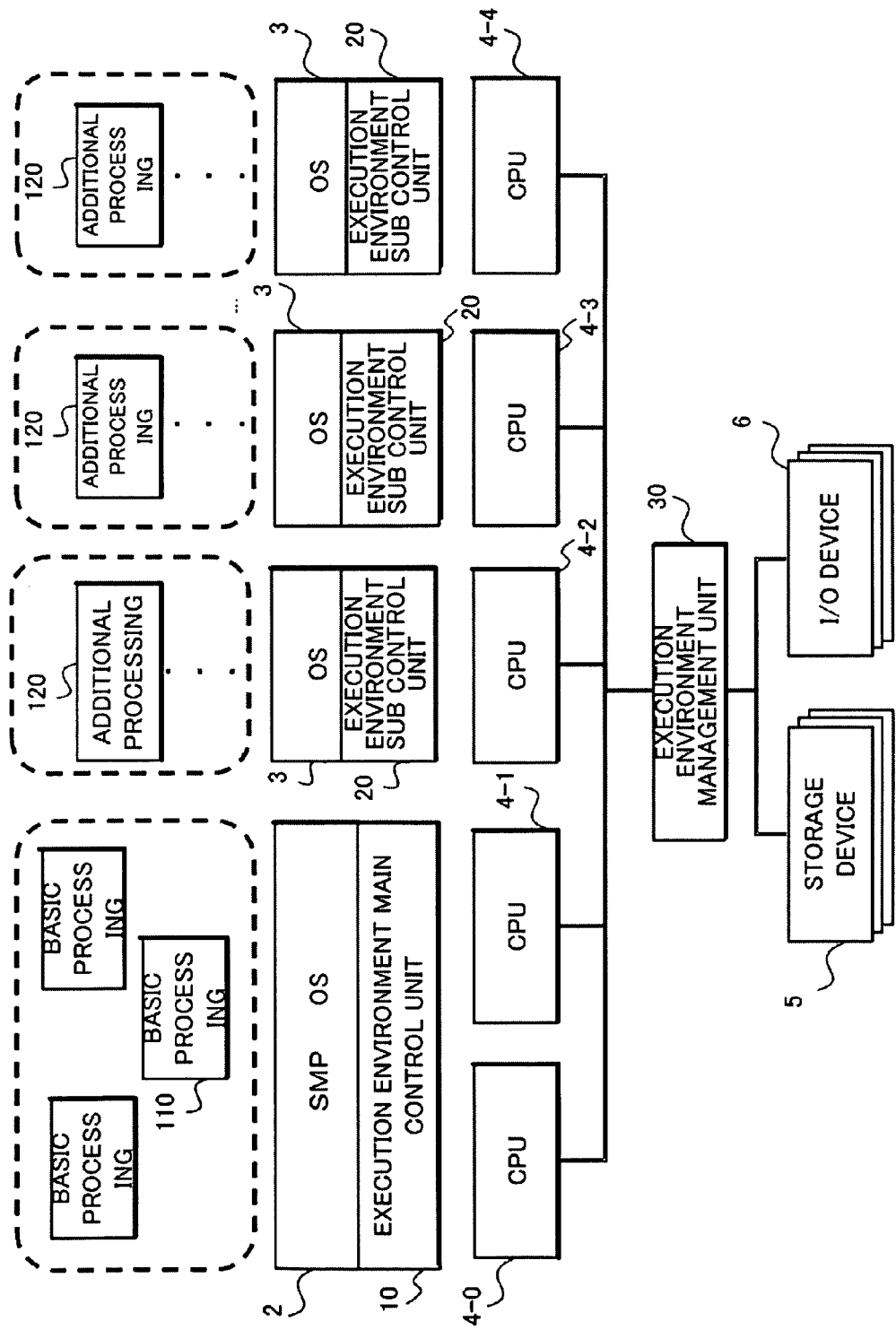
FIG. 22 is a block diagram showing a structure of a multiple processor system as of after switching according to a second mode of implementation of the present invention.

Structure of the multiple processor system as of after switching on a CPU or an execution environment basis according to the present mode of implementation is shown in FIG. 22.

Here, description will be made of a hardware structure of the multiple processor system.

Figure 23:
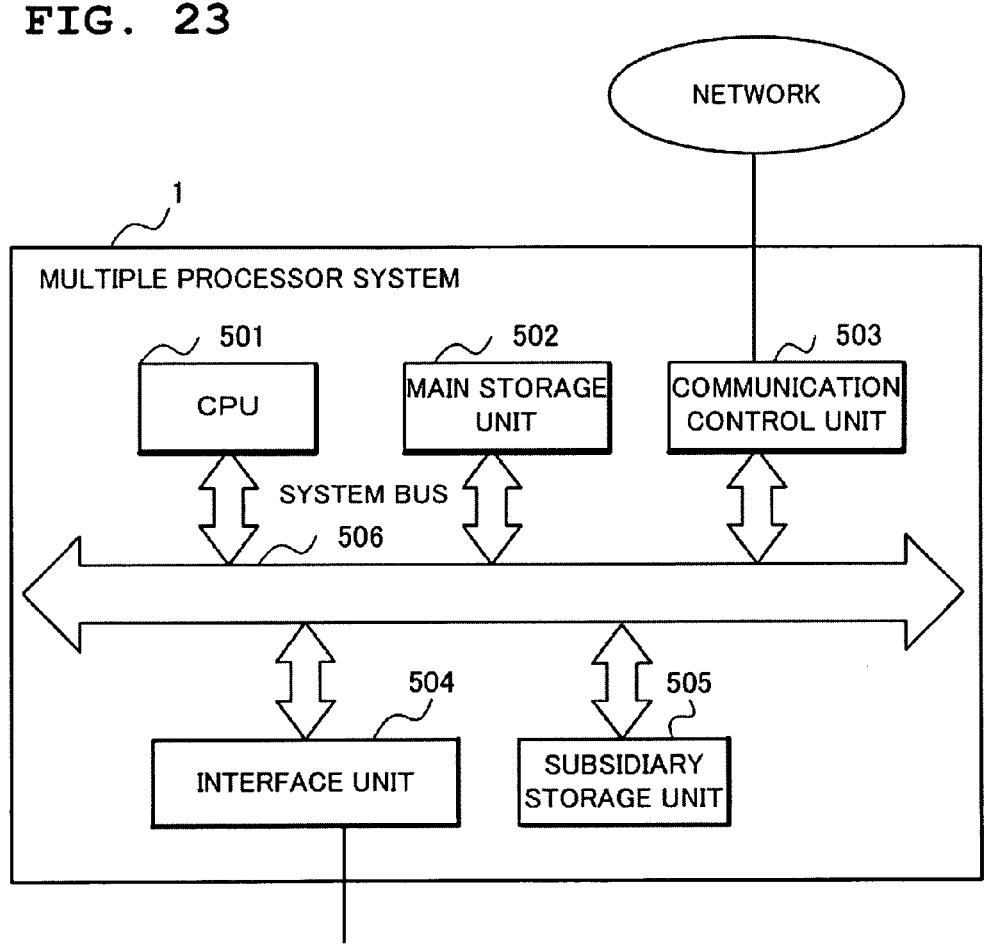
FIG. 23 is a block diagram showing a hardware structure of the multiple processor system according to the present mode of implementation.

FIG. 23 is a block diagram showing a hardware structure of the multiple processor system according to the present mode of implementation.

With reference to FIG. 23, the multiple processor system according to the present invention, which can be realized by the same hardware structure as that of a common computer device, comprises a CPU (Central Processing Unit) 501, a main storage unit 502 which is a main memory such as a RAM (Random Access Memory) or the like for use as a data working region or a data temporary saving region, a communication control unit 503 for transmitting and receiving data through the Internet or the like, an interface unit 504 connected to a peripheral apparatus for transmitting and receiving data, a subsidiary storage unit 505 as a hard disk device formed of a non-volatile memory such as a ROM (Read Only Memory), a magnetic disk, or a semiconductor memory, a system bus 506 connecting the above-described respective components of the present information processing device.

The multiple processor system according to the present invention has its operation realized not only in hardware with a circuit part formed of a hardware part such as LSI (Large Scale Integration) or the like mounted which has a program for realizing such functions incorporated inside the multiple processor system but also in software by executing the program providing each function of the above-described respective functions on the CPU 501 on the computer processing device.

More specifically, the CPU 501 (CPU 4, CPUs 4-0~4-n, CPU 4-k) loads a program stored in the subsidiary storage unit 505 (storage device 5) into the main storage unit 501 (storage device 5) and executes the same to control operation of the multiple processor system, thereby realizing the above-described respective functions in software.

(Operation of the First Mode of Implementation)

FIG. 24 through FIG. 59 are diagrams for use in explaining operation of the multiple processor system according to the first mode of implementation of the present invention.

First, detailed description will be made of execution environment stopping processing and execution environment switching processing according to the present mode of implementation on (a) a shared memory based synchronization basis, (b) an interruption based synchronization basis and (c) a barrier synchronization basis.

(Execution Environment Stopping Processing)

Execution stopping processing is processing of stopping an execution environment to which the execution environment sub management and synchronization unit 22 belongs.

((A) Shared Memory Based Synchronization)

Figure 24:
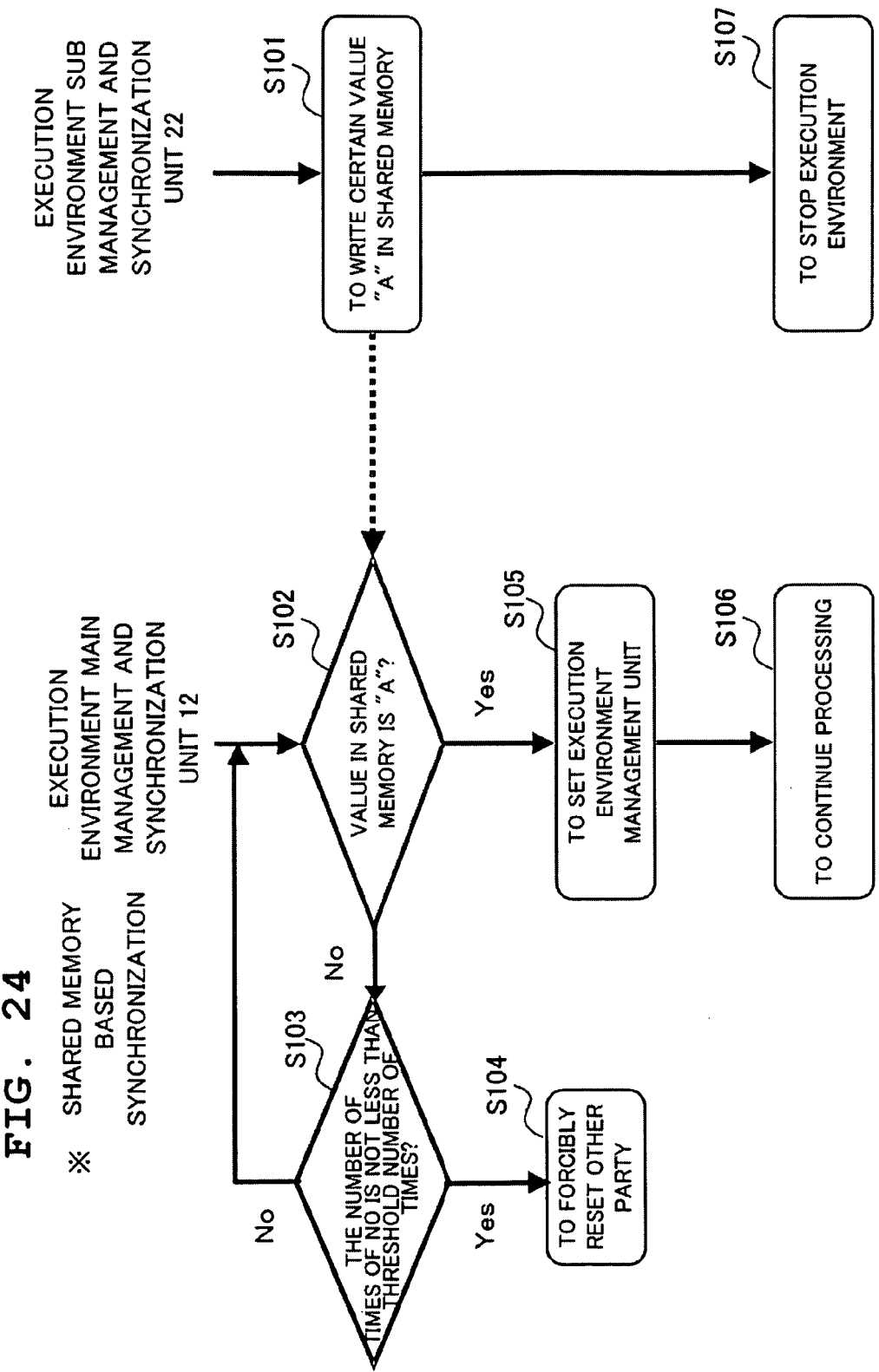
FIG. 24 is a diagram for use in explaining execution environment stopping processing according to the first mode of implementation on a shared memory based synchronization basis.

FIG. 24 is a diagram for use in explaining execution environment stopping processing according to the present mode of implementation on a shared memory based synchronization basis.

With reference to FIG. 24, the execution environment sub management and synchronization unit 22 writes a certain value (e.g. "A") in the storage device 5 as a shared memory (Step S101). When a value is written in the shared memory by the execution environment sub management and synchronization unit 22, the execution environment main management and synchronization unit 12 determines whether the value of the shared memory is "A" or not (Step S102) and when the value of the shared memory is "A", sets the execution environment management unit 30 (Step S105) to continue processing (Step S106), so that an execution environment to which the execution environment sub management and synchronization unit 22 belongs stops (Step S107). When the value of the shared memory is not "A", if the shared memory value is determined to fail to be "A" not less than a threshold number of times (Step S103), the execution environment main management and synchronization unit 12 forcibly resets the other party (Step S104) and if the number of times of determination that the value is not "A" fails to reach the threshold value (Step S103), again determines whether the value of the shared memory is "A" or not (Step S102). The execution environment sub management and synchronization unit 22 may loop.

((B)) Interruption Based Synchronization)

Figure 25:
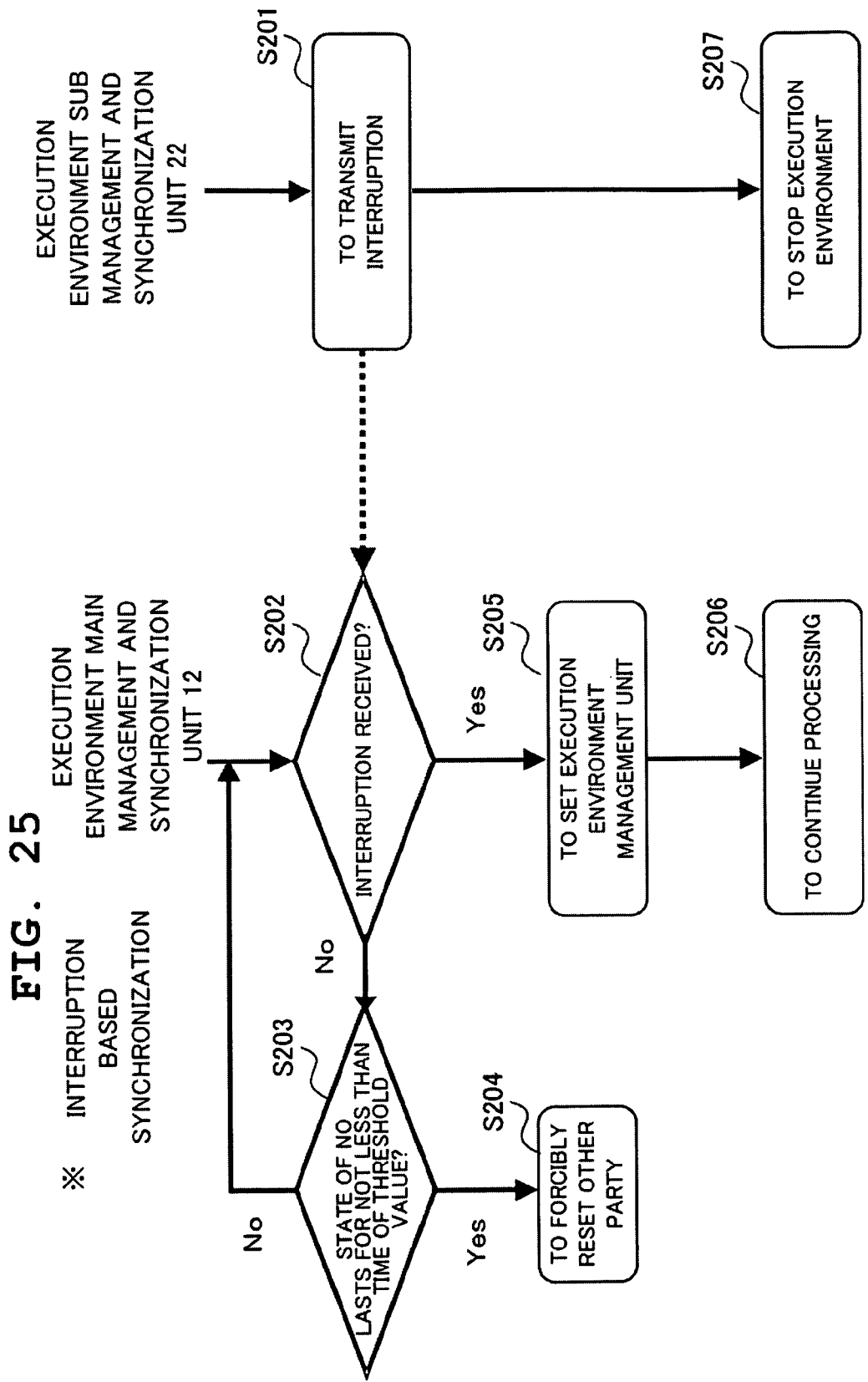
FIG. 25 is a diagram for use in explaining the execution environment stopping processing according to the first mode of implementation on an interruption based synchronization basis.

FIG. 25 is a diagram for use in explaining execution environment stopping processing according to the present mode of implementation on an interruption based synchronization basis.

With reference to FIG. 25, when the execution environment sub management and synchronization unit 22 transmits an interruption request (Step S201), the execution environment main management and synchronization unit 12 determines whether an interruption request is received or not (Step S202) and when receiving the interruption request, sets the execution environment management unit 30 (Step S205) to continue processing (Step S206), so that an execution environment to which the execution environment sub management and synchronization unit 22 belongs stops (Step S207). When failing to receive an interruption request, if a state of no reception lasts for longer than the threshold value time (Step S203), the execution environment main management and synchronization unit 12 forcibly resets the other party (Step S204) and when a lapse of time of being such a state fails to reach the threshold value (Step S203), again determines whether the interruption request is received or not (Step S202). The execution environment sub management and synchronization unit 22 may loop.

((C) Barrier Synchronization)

Figure 26:
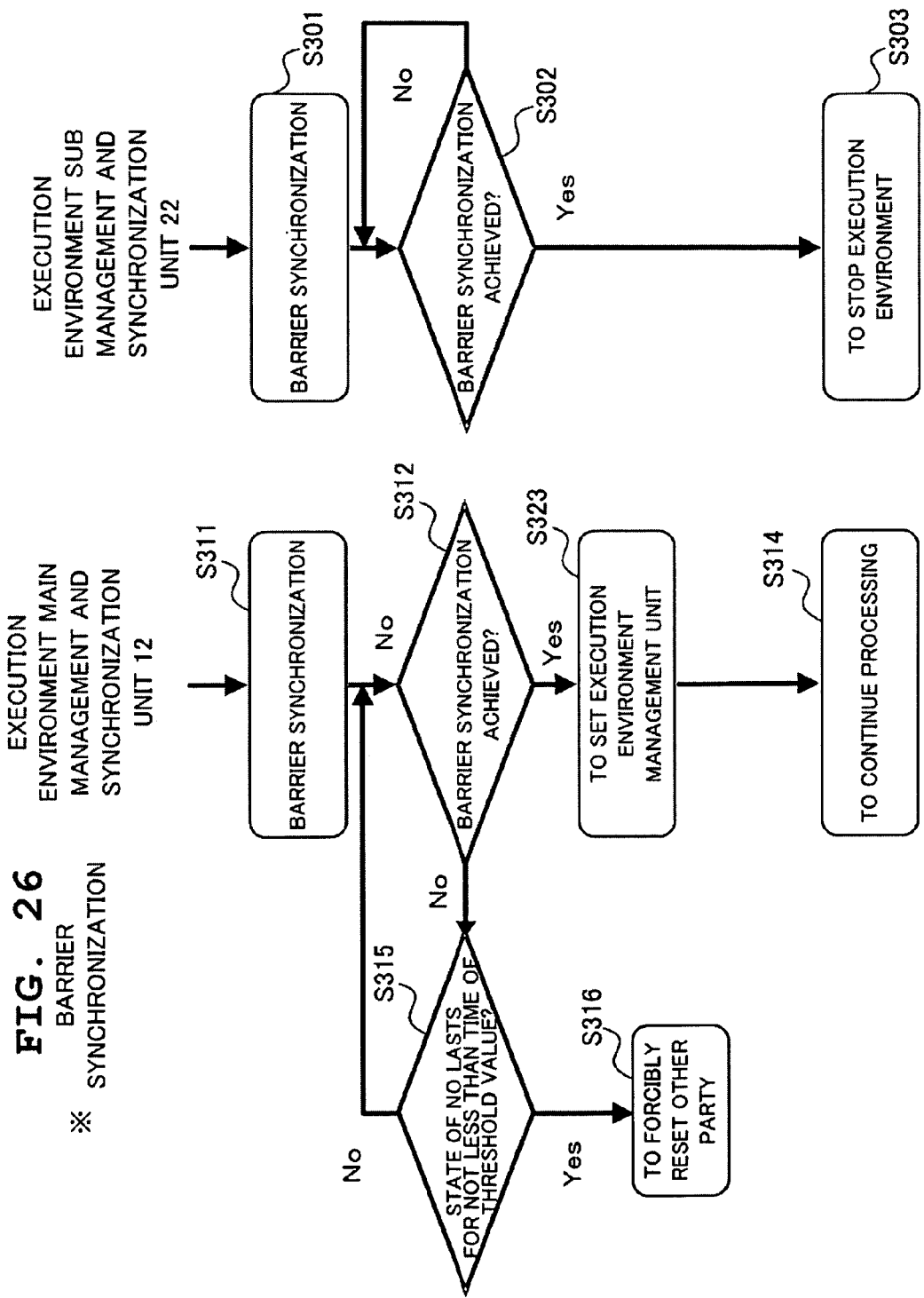
FIG. 26 is a diagram for use in explaining the execution environment stopping processing according to the first mode of implementation on a barrier synchronization basis.

FIG. 26 is a diagram for use in explaining execution environment stopping processing according to the present mode of implementation on a barrier synchronization basis.

With reference to FIG. 26, the execution environment sub management and synchronization unit 22 executes barrier synchronization with the execution environment main management and synchronization unit 12 (Step S301) to determine whether barrier synchronization is achieved or not (Step S302) and when it is yet to be achieved, again makes determination and when achieved, stops the execution environment (Step S303). The execution environment main management and synchronization unit 12 executes barrier synchronization with the execution environment sub management and synchronization unit 22 (Step S311) to determine whether barrier synchronization is achieved or not (Step S312) and when it is achieved, sets the execution environment management unit 30 (Step S313) to continue processing (Step S314). When it is yet to be achieved, the execution environment sub management and synchronization unit 22 determines whether a state where barrier synchronization is yet to be achieved lasts for not less than a threshold value time (Step S315), and when the state lasts for not less than the time of the threshold value, forcibly resets the other party (Step S316) and when the time of the state is yet to reach the time of the threshold value, again determines whether barrier synchronization is achieved or not (Step S312).

(Execution Environment Switching Processing)

Execution environment switching processing is processing of switching an execution environment to which the execution environment main control unit 10 or the execution environment sub control unit 20 belongs.

((A) Shared Memory Based Synchronization)

Figure 27:
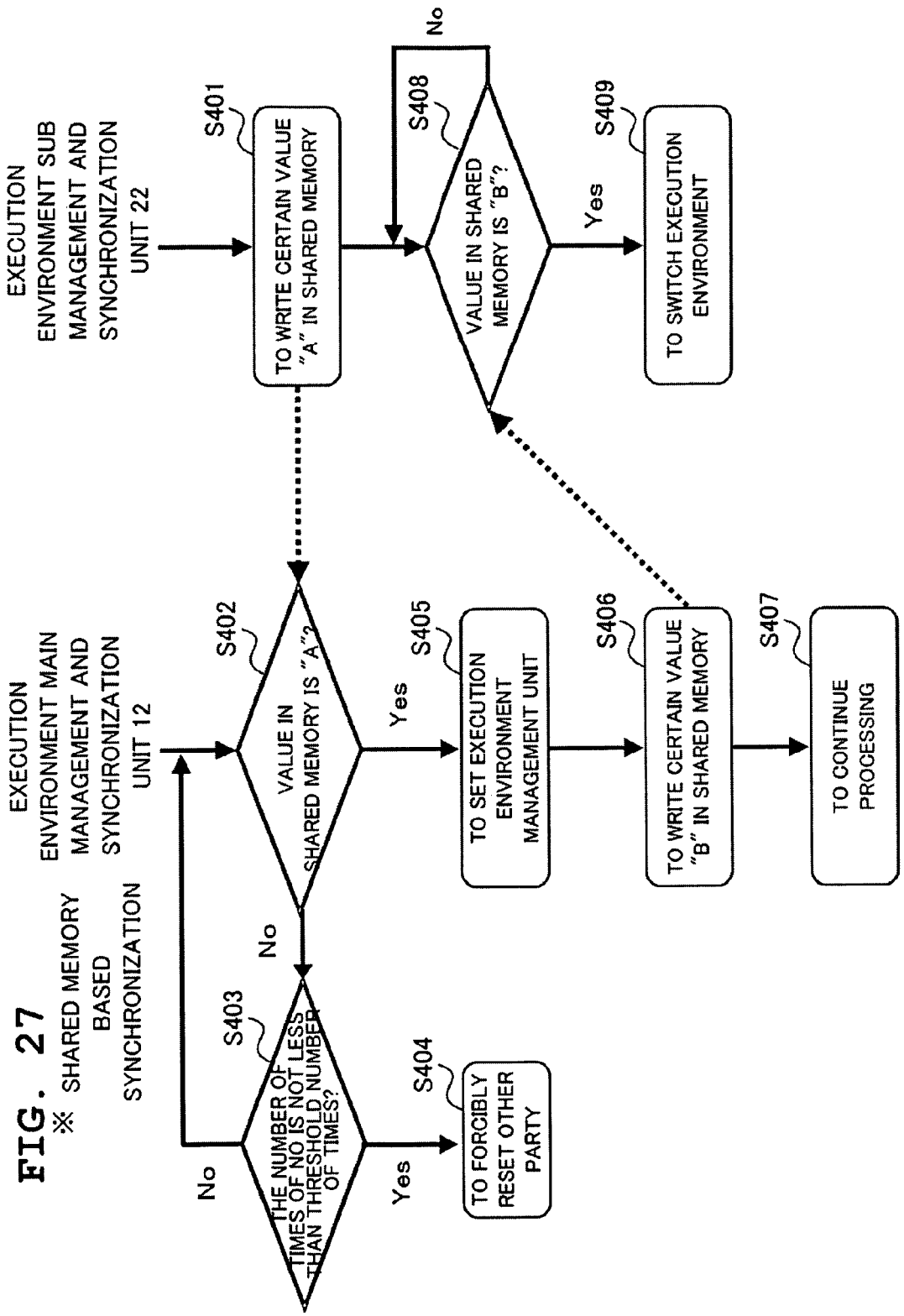
FIG. 27 is a diagram for use in explaining execution environment switching processing according to the first mode of implementation on a shared memory based synchronization basis.

FIG. 27 is a diagram for use in explaining execution environment switching processing according to the present mode of implementation on a shared memory based synchronization basis.

With reference to FIG. 27, the execution environment sub management and synchronization unit 22 writes a certain value (e.g. "A") in the shared memory (Step S401). When a value is written in the shared memory by the execution environment sub management and synchronization unit 22, the execution environment main management and synchronization unit 12 determines whether the value of the shared memory is "A" or not (Step S402), and when the value of the shared memory is not "A", if the shared memory value is determined to fail to be "A" not less than a threshold number of times (Step S403), forcibly resets the other party (Step S404), if the number of times fails to reach the threshold value, again determines whether the value of the shared memory is "A" or not (Step S402) and when the value of the shared memory is "A", sets the execution environment management unit 30 (Step S405) and writes a certain value (e.g. "B") in the shared memory (Step S406) to continue the processing (Step S407). When a value is written in the shared memory by the execution environment main management and synchronization unit 12, the execution environment sub management and synchronization unit 22 determines whether the value of the shared memory is "B" or not (Step S408), and when the value of the shared memory is not "B", again determines whether the value of the shared memory is "B" (Step S408), and if the value of the shared memory is "B", switches the execution environment (Step S409). The execution environment sub management and synchronization unit 22 may loop first.

((B) Interruption Based Synchronization)

Figure 28:
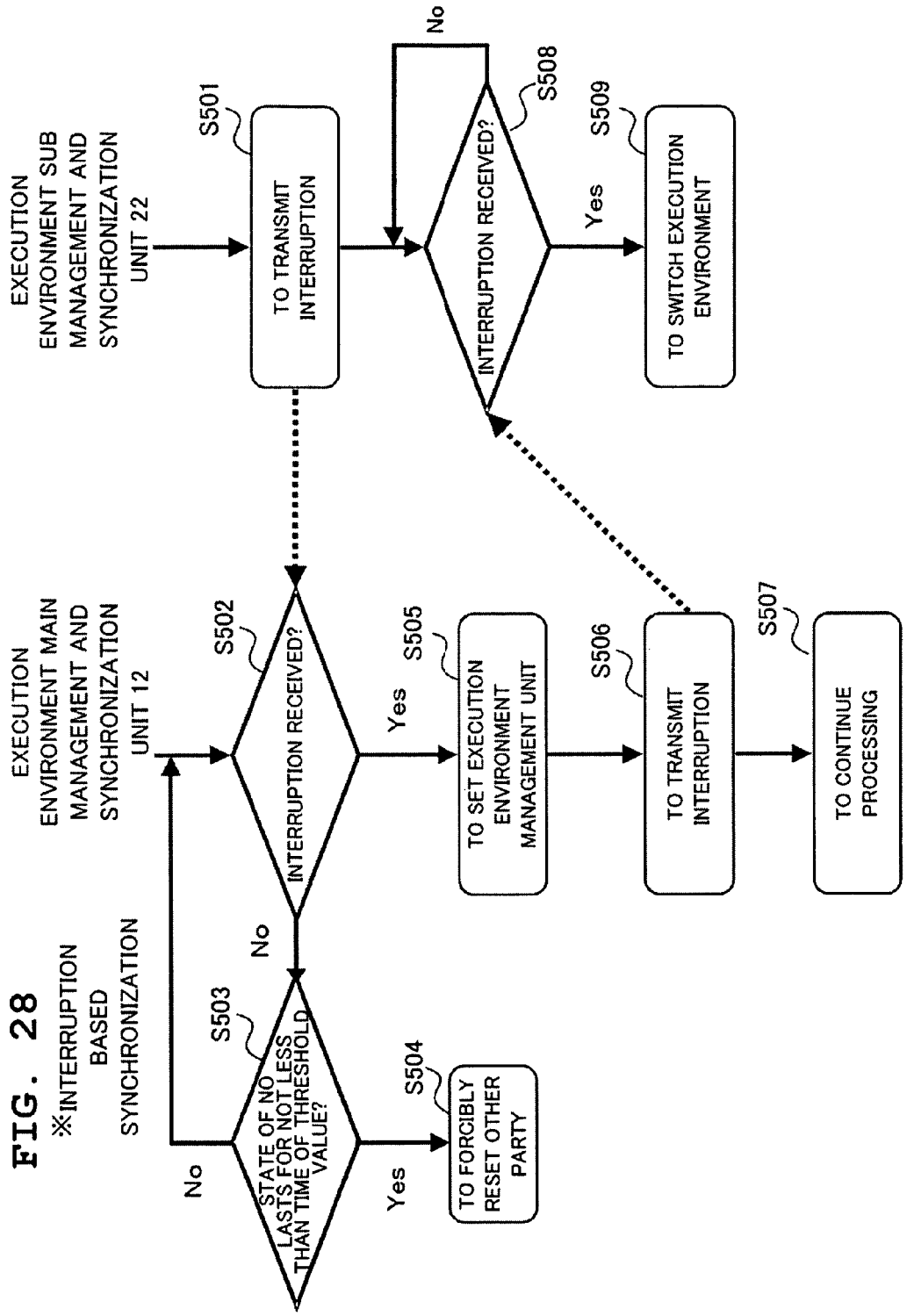
FIG. 28 is a diagram for use in explaining the execution environment switching processing according to the first mode of implementation on an interruption based synchronization basis.

FIG. 28 is a diagram for use in explaining execution environment switching processing according to the present mode of implementation on an interruption based synchronization basis.

With reference to FIG. 28, when the execution environment sub management and synchronization unit 22 transmits an interruption request (Step S501), the execution environment main management and synchronization unit 12 determines whether an interruption request is received or not (Step S502), and when failing to receive an interruption request, if a state of no reception lasts for longer than a threshold value time (Step S503), forcibly resets the other party (Step S504) and when a lapse of time of being such a state fails to reach the threshold value, again determines whether an interruption request is received or not (Step S502), and when receiving the interruption request, sets the execution environment management unit 30 (Step S505) and transmits the interruption request (Step S506) to continue the processing (Step S507). The execution environment sub management and synchronization unit 22 determines whether an interruption request is received or not (Step S508) and when an interruption request is yet to be received, again determines whether an interruption request is received or not (Step S508), and when receiving an interruption request, switches the execution environment (Step S509). The execution environment sub management and synchronization unit 22 may loop first.

((C) Barrier Synchronization)

Figure 29:
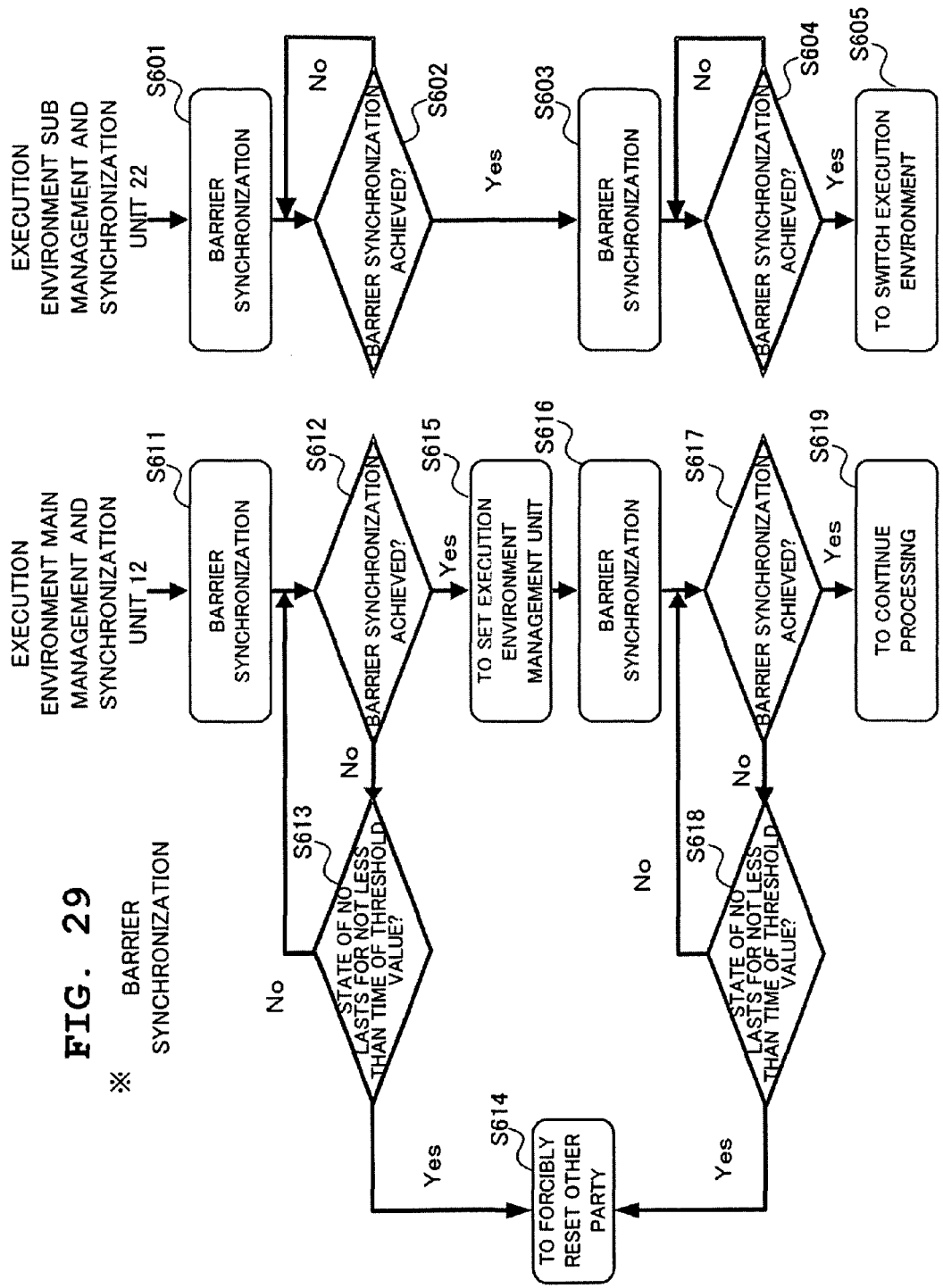
FIG. 29 is a diagram for use in explaining the execution environment switching processing according to the first mode of implementation on a barrier synchronization basis.

FIG. 29 is a diagram for use in explaining execution environment switching processing according to the present mode of implementation on a barrier synchronization basis.

With reference to FIG. 29, the execution environment sub management and synchronization unit 22 executes barrier synchronization with the execution environment main management and synchronization unit 12 (Step S601) to determine whether barrier synchronization is achieved or not (Step S602) and when it is yet to be achieved, again makes determination (Step S602) and when achieved, again executes barrier synchronization with the execution environment main management and synchronization unit 12 (Step S603) to determine whether barrier synchronization is achieved (Step S604), and when it is yet to be achieved, again makes determination (Step S604) and when achieved, stops the execution environment (Step S605). The execution environment main management and synchronization unit 12 executes barrier synchronization with the execution environment sub management and synchronization unit 22 (Step S611) to determine whether barrier synchronization is achieved (Step S612), and when it is yet to be achieved, again determines whether a state of being yet to be achieved lasts for not less than a threshold value (Step S613), and when the state lasts for not less than the time of the threshold value, forcibly resets the other party (Step S614) and when the time of the state fails to reach the time of the threshold value, again determines whether barrier synchronization is achieved or not (Step S612). When the barrier synchronization is achieved at Step S612, the execution environment main management and synchronization unit 12 sets the execution environment management unit 30 (Step S615) to again execute barrier synchronization with the execution environment sub management and synchronization unit 22 (Step S616) and determine whether barrier synchronization is achieved or not (Step S617) and when it is yet to be achieved, determines whether a state of being yet to be achieved lasts for not less than a threshold value (Step S618), and when the state lasts for not less than the time of the threshold value, forcibly resets the other party (Step S614) and when a lapse of time of being such a state fails to reach the time of the threshold value, again determines whether barrier synchronization is achieved or not (Step S617) to continue the processing (Step S619).

Next, operation of the multiple processor system according to the present mode of implementation will be described in detail mainly with respect to operation of the execution environment main control unit 10. The execution environment main control unit 10 according to the present mode of implementation operates on the execution environment 100-0 including at least the CPU 4-0.

Figure 30:
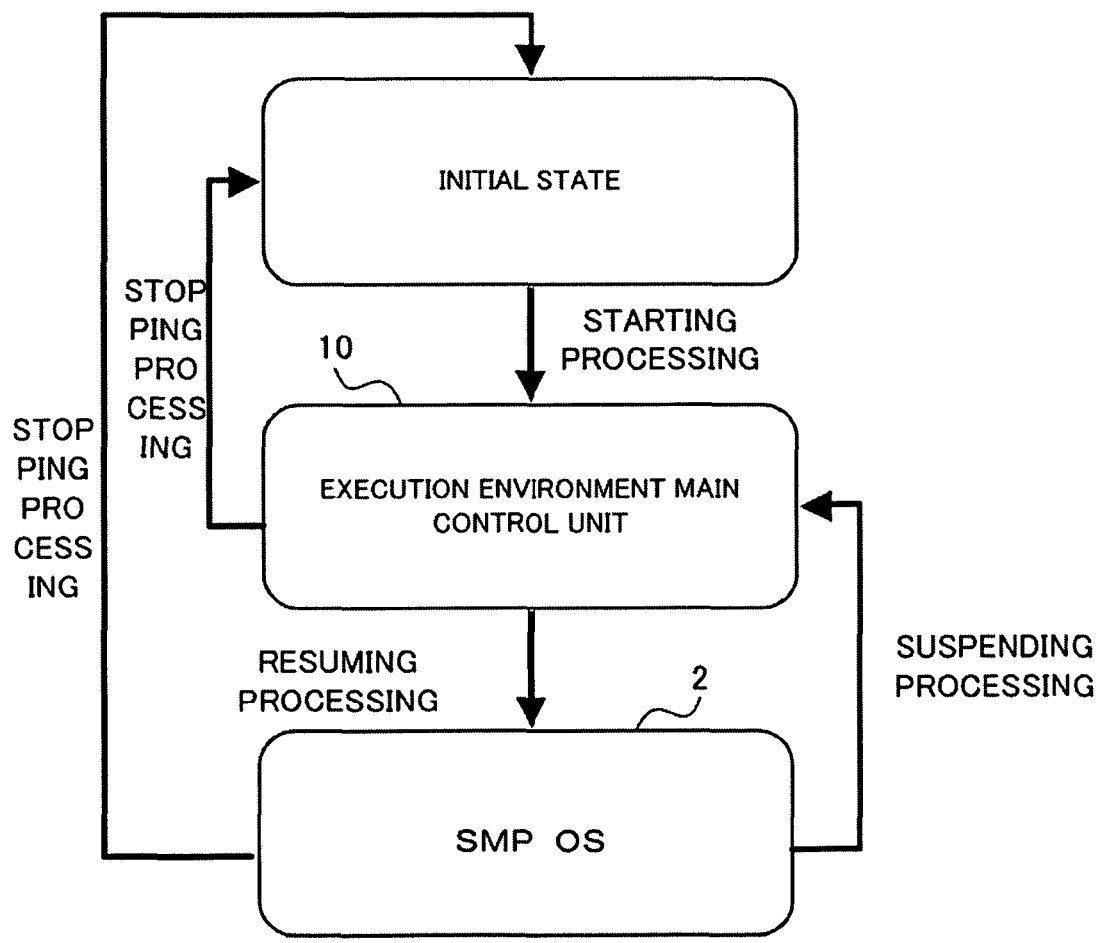
FIG. 30 is a diagram for use in schematically explaining operation of a CPU 4-0 of the multiple processor system according to the first mode of implementation.
Figure 31:
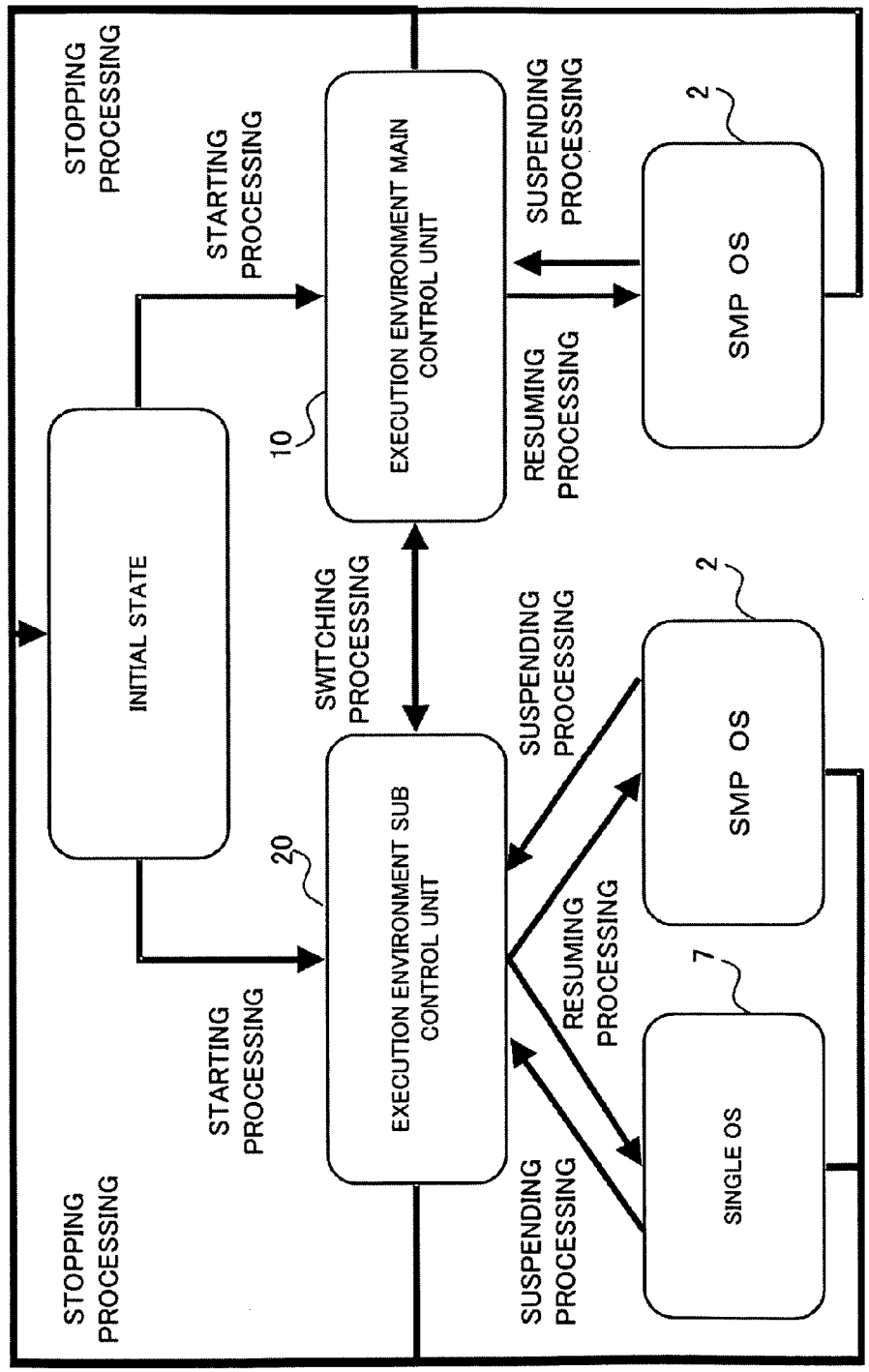
FIG. 31 is a diagram for use in schematically explaining operation of CPUs 4-1~4-*n* of the multiple processor system according to the first mode of implementation.

FIG. 30 is a diagram for use in schematically explaining operation of the CPU 4-0 of the multiple processor system according to the present mode of implementation and FIG. 31 is a diagram for use in schematically explaining operation of the CPUs 4-1~4-n of the multiple processor system according to the present mode of implementation.

With reference to FIG. 30, with respect to the CPU 4-0, starting processing at an initial state starts the execution environment main control unit 10. Also with respect to the CPU 4-0, resuming processing of the execution environment main control unit 10 starts the SMP OS 2 and suspending processing stops the SMP OS 2. The CPU 4-0 also returns to the initial state by the stopping processing of the SMP OS 2 or the execution environment main control unit 10.

With reference to FIG. 31, with respect to the CPUs 4-1~4-n, starting processing of the execution environment main control unit 10 at the initial state starts the execution environment main control unit 10 and starting processing of the execution environment sub control unit at the initial state starts the execution environment sub control unit 20, and switching processing enables switching between the execution environment main control unit 10 and the execution environment sub control unit 20. The execution environment main control unit 10 executes resuming processing and suspending processing for the SMP OS 2 and the execution environment sub control unit executes the resuming processing and the suspending processing for the SMP OS 2 and a single OS 7. The CPUs 4-1~4-$n$ return to the initial state by the stopping processing of the SMP OS 2, the single OS7, the execution environment main control unit 10 or the execution environment sub control unit 20.

FIG. 32 through FIG. 46 are diagrams for use in explaining a state transition of the multiple processor system according to the present mode of implementation.

(CPU Stopping Processing in Main Execution Environment (without Automatic Switching Function))

Figure 47:
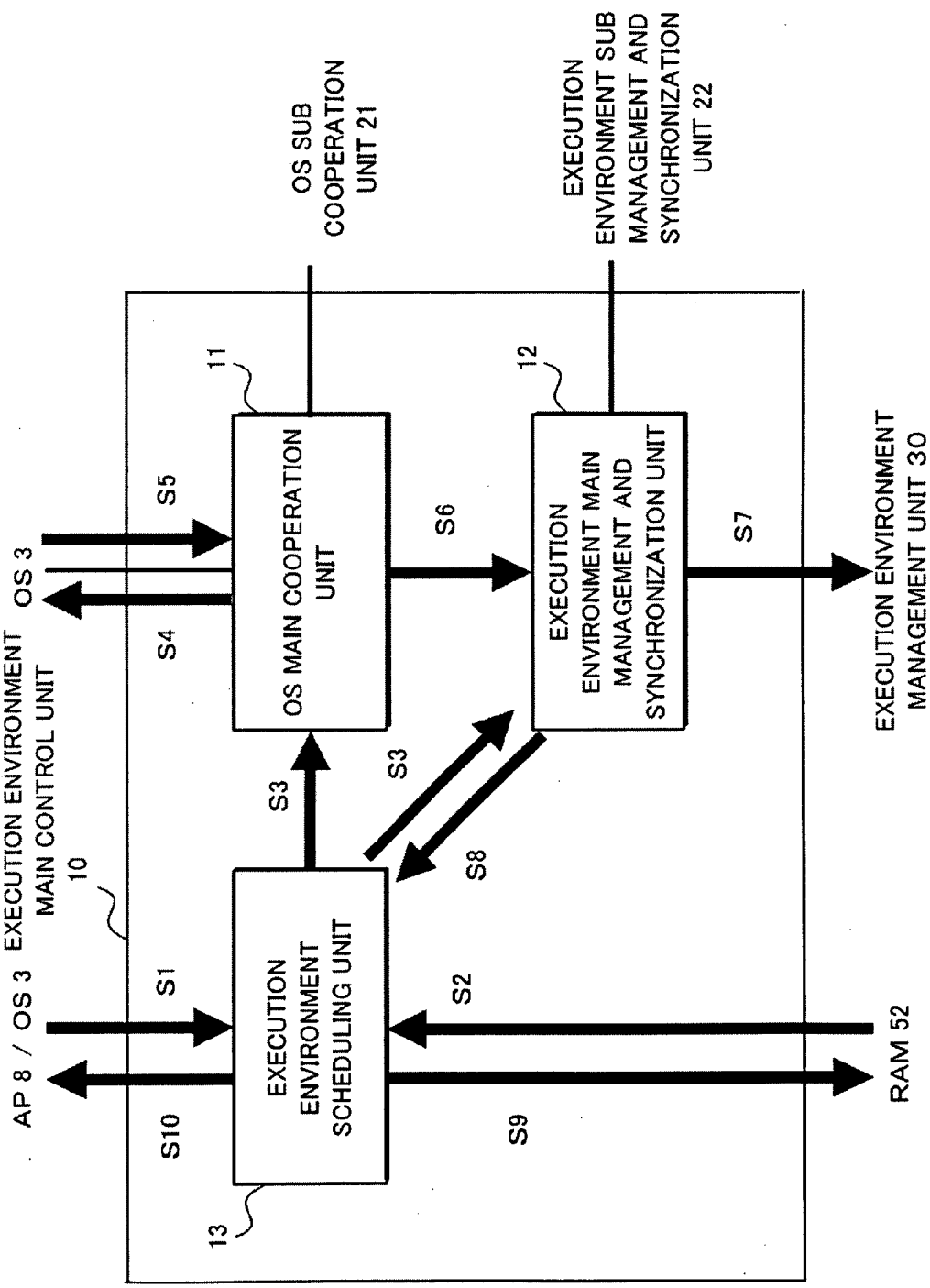
FIG. 47 is a diagram for use in explaining CPU stopping processing (without an automatic switching function) in the main execution environment which is executed by the execution environment main control unit according to the first mode of implementation.

FIG. 47 is a diagram for use in explaining CPU stopping processing (without the automatic switching function) in the main execution environment executed by the execution environment main control unit 10 according to the present mode of implementation.

With reference to FIG. 47, in the CPU stopping processing (without the automatic switching function) in the main execution environment executed by the execution environment main control unit 10 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for stopping a CPU in the execution environment in question at Step S3 or notifies the execution environment main management and synchronization unit 12 of setting information of the execution environment management unit 30 as of after CPU stop.

Next, the OS main cooperation unit 11 requests the OS 3 to stop the above CPU at Step S4, receives a notification of completion of the CPU stop from the OS 3 (which is approximate to CPU shut-down processing in power supply management) at Step S5, and notifies, at Step S6, the execution environment main management and synchronization unit 12 that the CPU stop is completed.

Next, the execution environment main management and synchronization unit 12 sets, at the execution environment management unit 30, setting information of the execution environment management unit 30 as of after CPU stop at Step S7 and notifies the execution environment scheduling unit 13 of the completion of the processing at Step S8.

Next, the execution environment scheduling unit 13 updates the execution environment information 521 at Step S9 and notifies the AP 8/OS 3 of the completion of the request at Step S10.

(CPU Stopping Processing and Context Preserving Processing in Main Execution Environment (without Automatic Switching Function))

Figure 48:
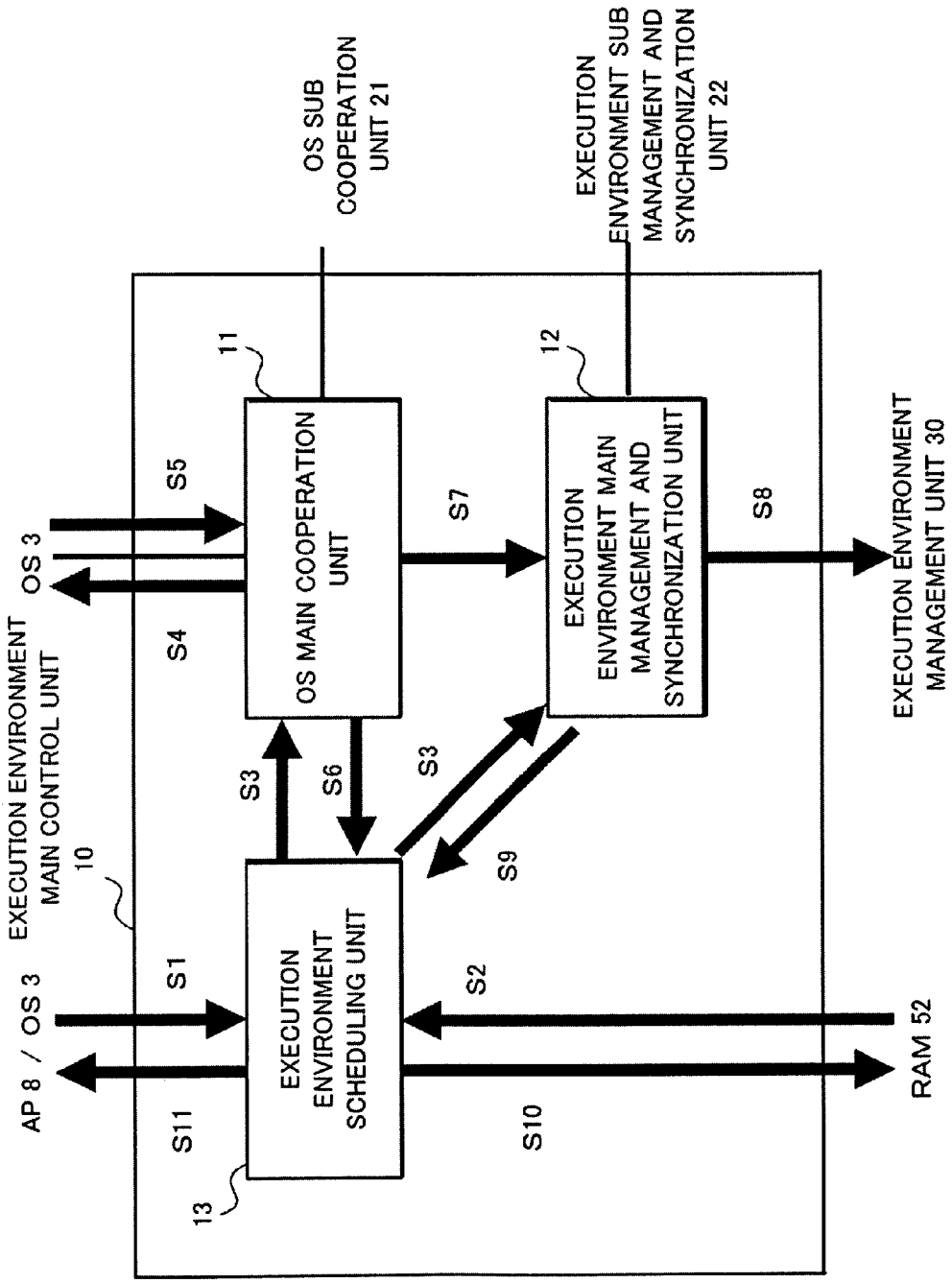
FIG. 48 is a diagram for use in explaining CPU stopping processing and context preserving processing (without the automatic switching function) in the main execution environment which is executed by the execution environment main control unit according to the first mode of implementation.

FIG. 48 is a diagram for use in explaining CPU stopping processing and context preserving processing (without the automatic switching function) in the main execution environment by the execution environment main control unit 10 according to the present mode of implementation.

With reference to FIG. 48, in the CPU stopping processing and the context preserving processing (without the automatic switching function) in the main execution environment which are executed by the execution environment main control unit 10 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for stopping a CPU in the execution environment in question and a context preserving request and notifies the execution environment main management and synchronization unit 12 of setting information of the execution environment management unit 30 as of after the CPU stop at Step S3.

Next, the OS main cooperation unit 11 requests the OS 3 to stop the above CPU and preserve the context at Step S4, receives a notification of completion of the CPU stop and the context 90 of the above OS 3 from the OS 3 (which is approximate to CPU suspending processing in power supply management) at Step S5, transfers the context 90 of the above OS 3 to the execution environment scheduling unit 13 at Step S6 and notifies the execution environment main management and synchronization unit 12 that the CPU stop is completed at Step S7.

Next, the execution environment main management and synchronization unit 12 sets, at the execution environment management unit 30, setting information of the execution environment management unit 30 as of after CPU stop at Step S8 and notifies the execution environment scheduling unit 13 of the completion of the processing at Step S9.

Next, the execution environment scheduling unit 13 updates the execution environment information 521 at Step S10 and notifies the AP 8/OS 3 of the completion of the request at Step S11.

Description will be made of a state transition of the multiple processor system caused by the above CPU stopping processing and context preserving processing (without the automatic switching function) in the main execution environment.

Figure 32:
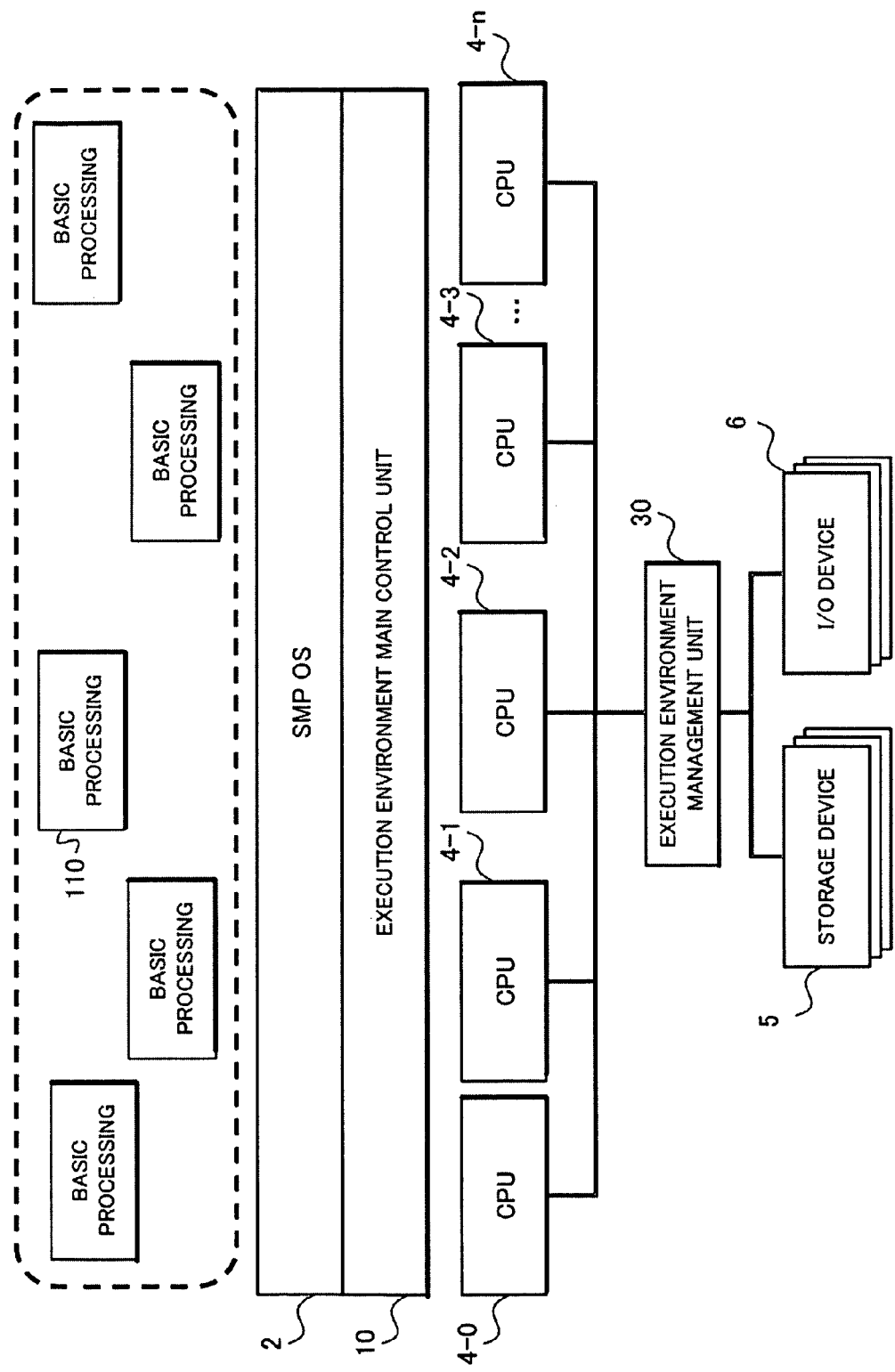
FIG. 32 is a diagram for use in explaining a state transition of the multiple processor system according to the first mode of implementation.
Figure 33:
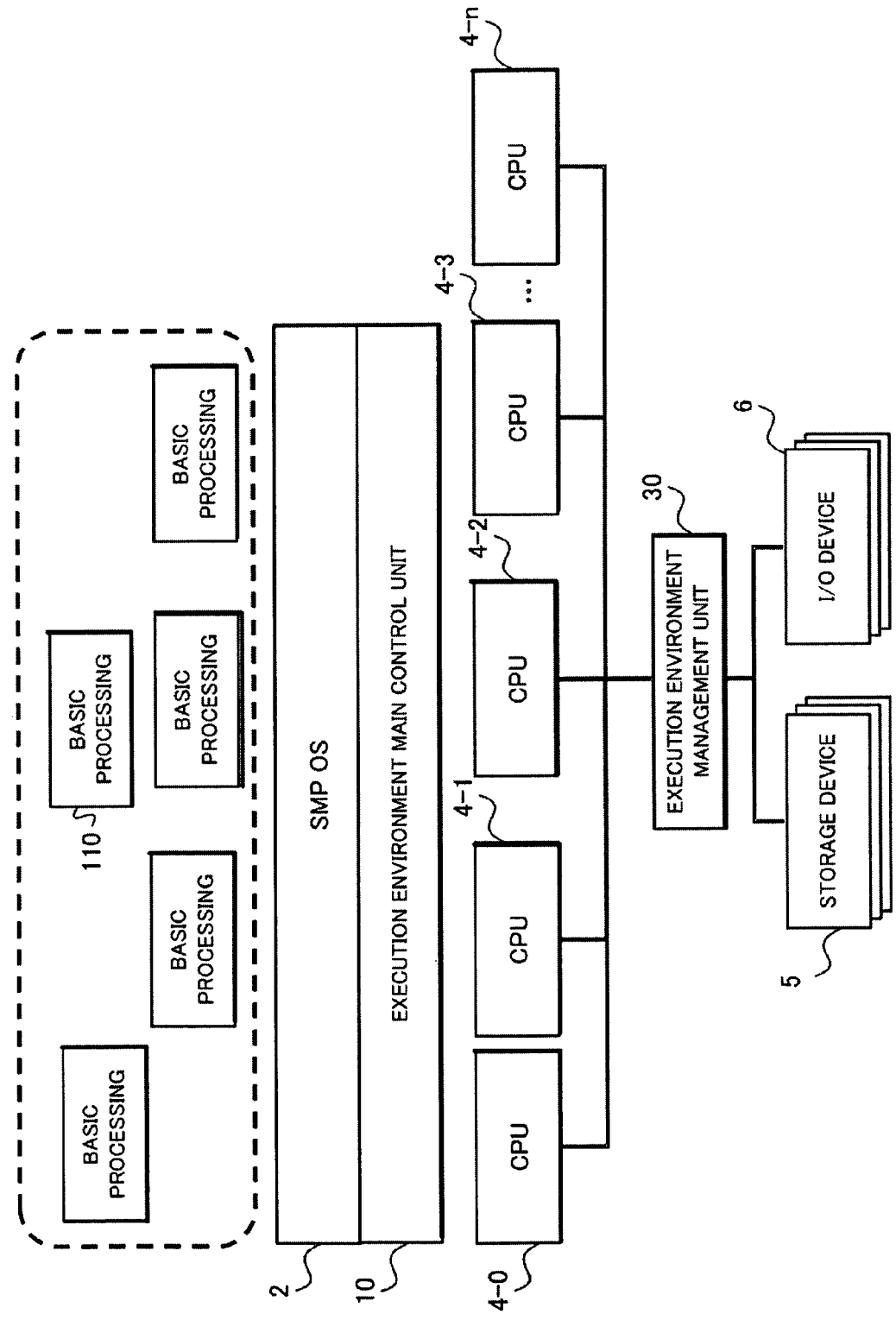
FIG. 33 is a diagram for use in explaining a state transition of the multiple processor system according to the first mode of implementation.

FIG. 32 illustrates a state where under one execution environment formed by all the CPUs, the SMP OS causes execution of the basic processing 110 which is a state as of before the CPU stopping processing in the main execution environment and FIG. 33 illustrates a state where under one execution environment formed by all the other CPUs than one CPU, the SMP OS causes execution of the basic processing 110 which is a state as of after the CPU stopping processing in the main execution environment. In other words, the state shown in FIG. 32 makes a transition to the state shown in FIG. 33 where a predetermined CPU stops in the main execution environment by the above CPU stopping processing in the main execution environment.

(Switching Processing in Main Execution Environment (without Automatic Switching Function))

Figure 49:
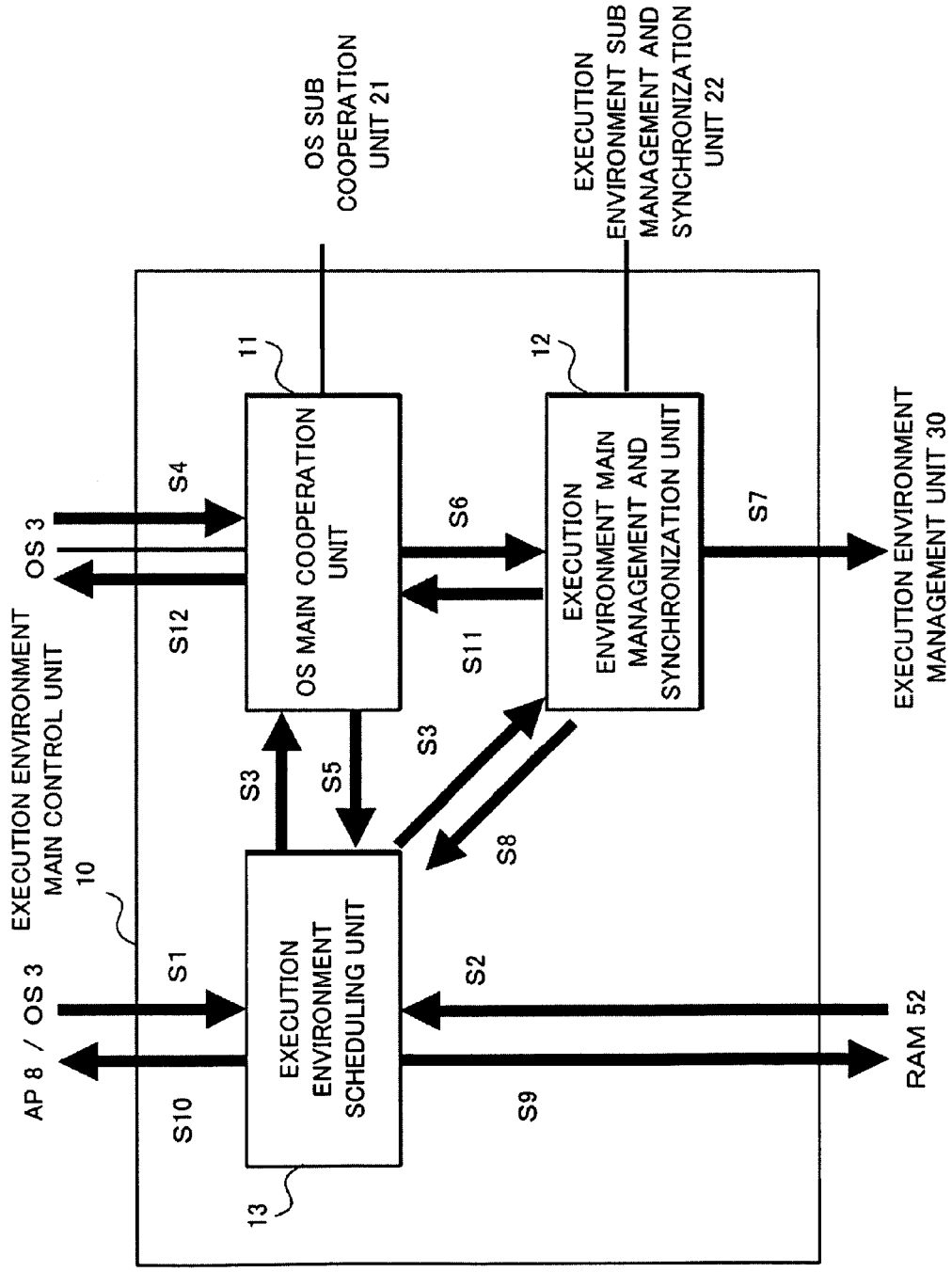
FIG. 49 is a diagram for use in explaining switching processing (without the automatic switching function) in the main execution environment which is executed by the execution environment main control unit according to the first mode of implementation.

FIG. 49 is a diagram for use in explaining switching processing (without the automatic switching function) in the main execution environment which is executed by the execution environment main control unit 10 according to the present mode of implementation.

With reference to FIG. 49, in the switching processing (without the automatic switching function) in the main execution environment which is executed by the execution environment main control unit 10 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for switching an execution environment and of the context 90 of a switching destination in the execution environment in question and notifies the execution environment main management and synchronization unit 12 of setting information of the execution environment management unit 30 as of after switching at Step S3.

Next, the OS main cooperation unit 11 receives the context 90 of the OS 3 in operation from the OS 3 at Step S4, transfers the above context 90 of the OS 3 to the execution environment scheduling unit 13 at Step S5 and notifies the execution environment main management and synchronization unit 12 that preservation of the context is completed at Step S6.

Next, the execution environment main management and synchronization unit 12 sets, at the execution environment management unit 30, setting information of the execution environment management unit 30 as of after switching at Step S7 and notifies the execution environment scheduling unit 13 of the completion of the processing at Step S8.

Next, the execution environment scheduling unit 13 updates the execution environment information 521 at Step S9 and notifies the AP 8/OS 3 of the completion of the request at Step S10.

Next, at Step S11, the execution environment main management and synchronization unit 12 notifies the OS main cooperation unit 13 of the completion of the processing and at Step S12, the OS main cooperation unit 11 sets the context 90 of a switching destination received previously.

Description will be made of a state transition of the multiple processor system caused by the above switching processing in the main execution environment (without the automatic switching function).

Figure 34:
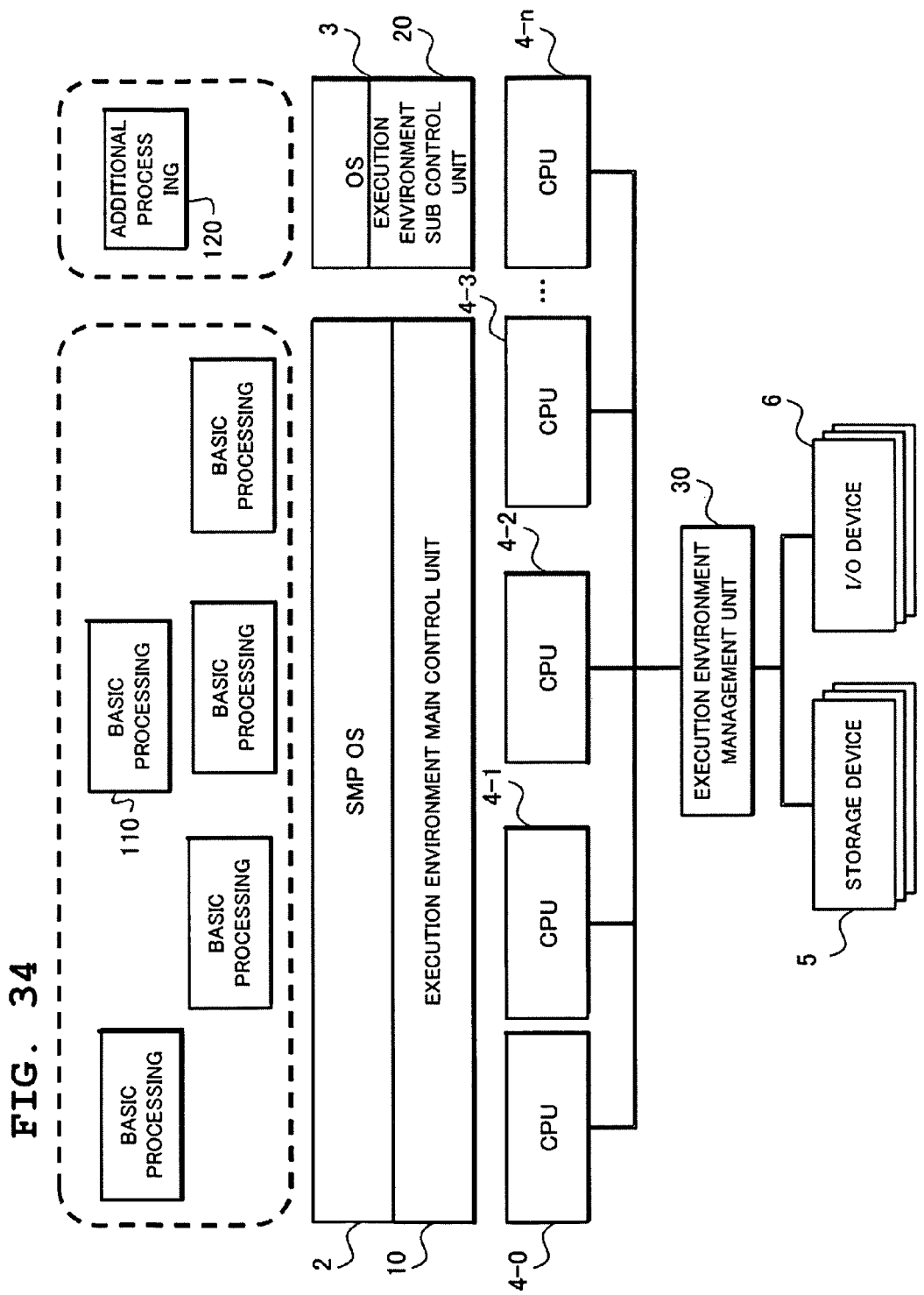
FIG. 34 is a diagram for use in explaining a state transition of the multiple processor system according to the first mode of implementation.

FIG. 32 illustrates a state where under one execution environment formed by all the CPUs, the SMP OS causes execution of the basic processing 110 which is a state as of before the switching processing in the main execution environment and FIG. 34 illustrates a state where under one execution environment formed by all the other CPUs than one CPU, the SMP OS causes execution of the basic processing 110 and under an execution environment formed by the remaining one CPU, the OS 3 causes execution of the additional processing 120 which is a state as of after the switching processing in the main execution environment. In other words, the state shown in FIG. 32 makes a transition by the switching processing in the main execution environment to the state shown in FIG. 34 where switching is executed in the main execution environment.

Figure 35:
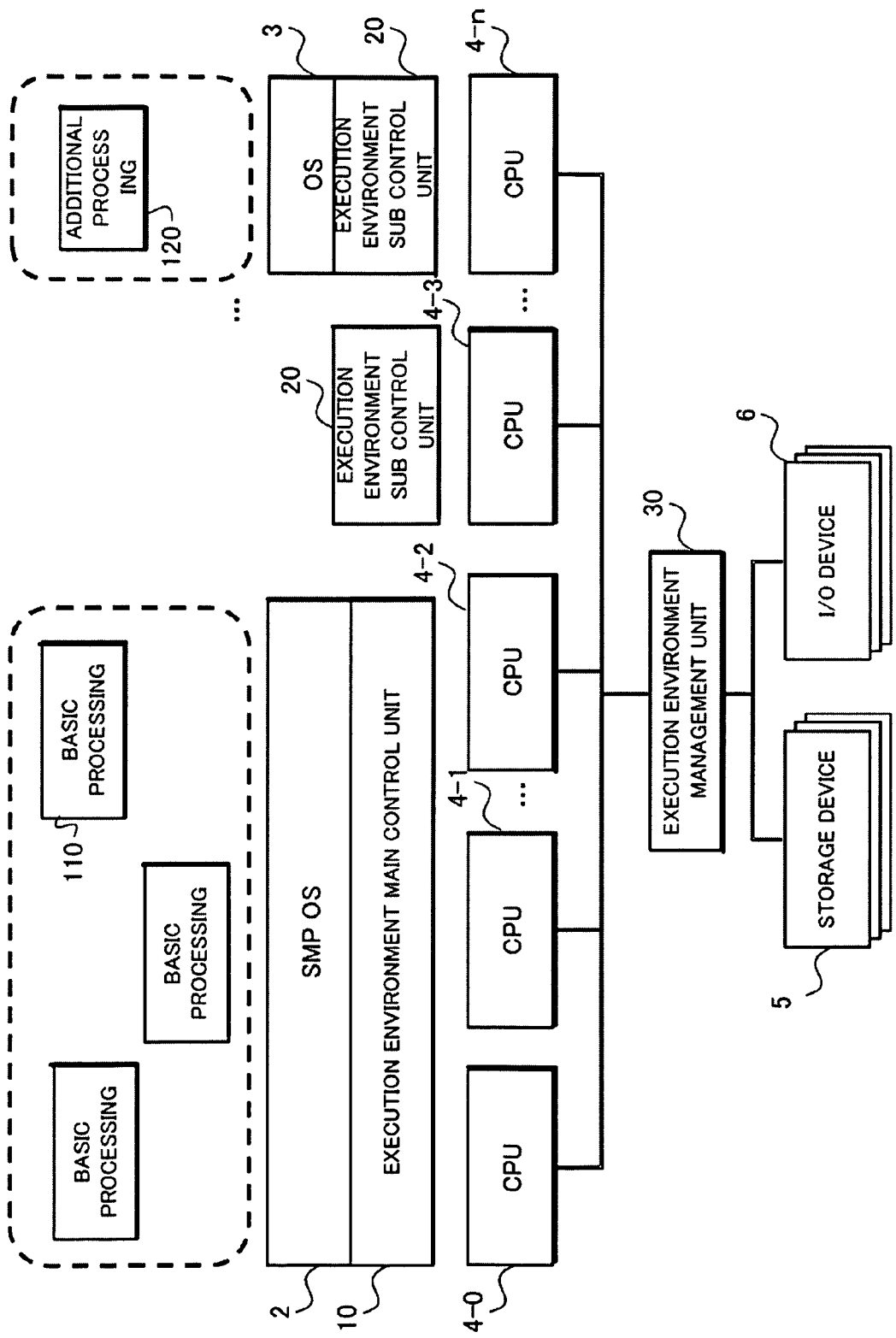
FIG. 35 is a diagram for use in explaining a state transition of the multiple processor system according to the first mode of implementation.
Figure 36:
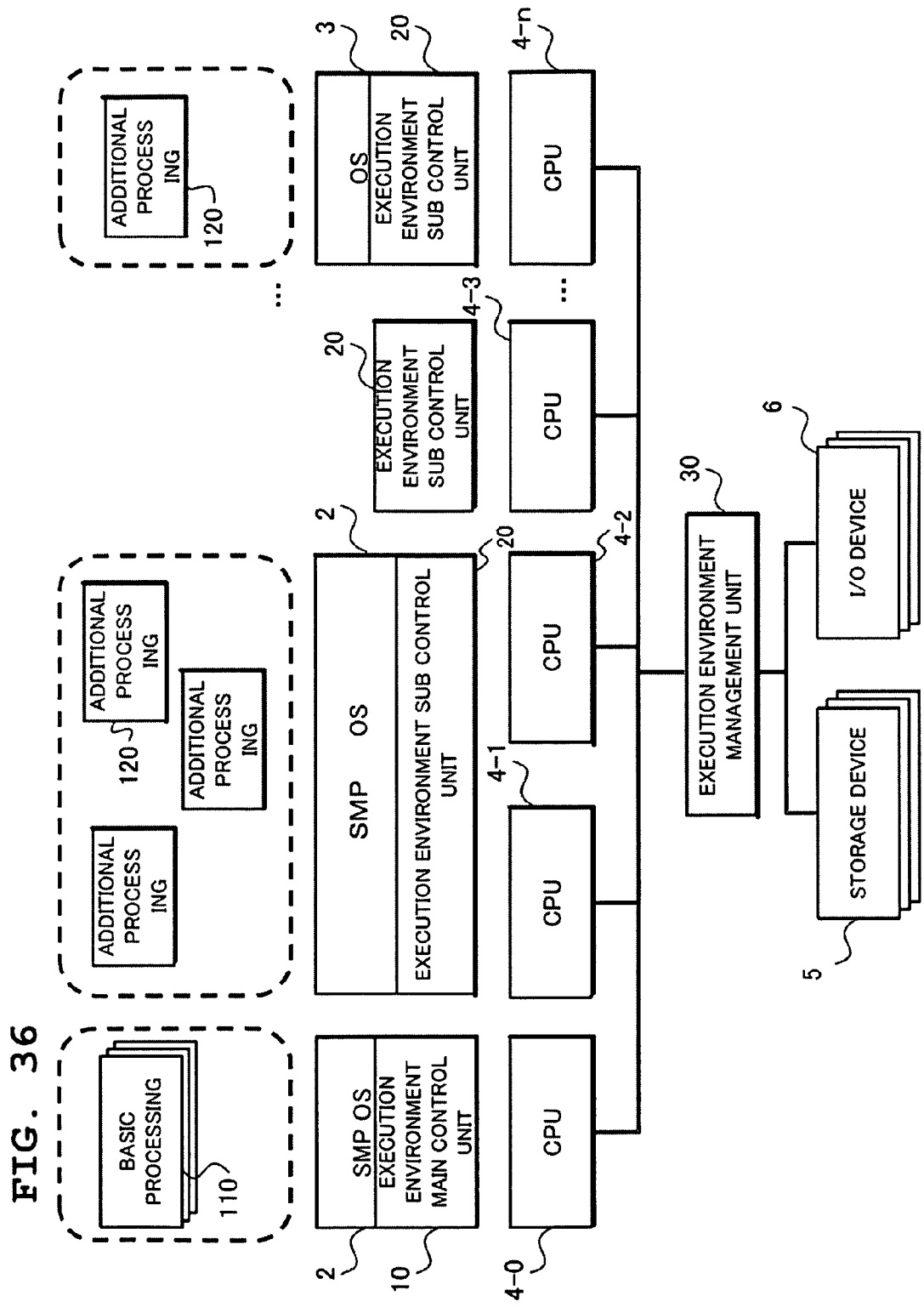
FIG. 36 is a diagram for use in explaining a state transition of the multiple processor system according to the first mode of implementation.

In addition, by the same manner, the above switching processing in the execution environment causes a state where the SMP OS 2 causes execution of the basic processing 110 under one execution environment formed by a plurality of CPUs shown in FIG. 35 to make a transition to a state where the SMP OS 2 causes execution of the basic processing 110 under one execution environment formed by one CPU and the SMP OS 2 causes execution of the additional processing 120 under one execution environment formed by a plurality of CPUs out of the remaining CPUs shown in FIG. 36.

Figure 37:
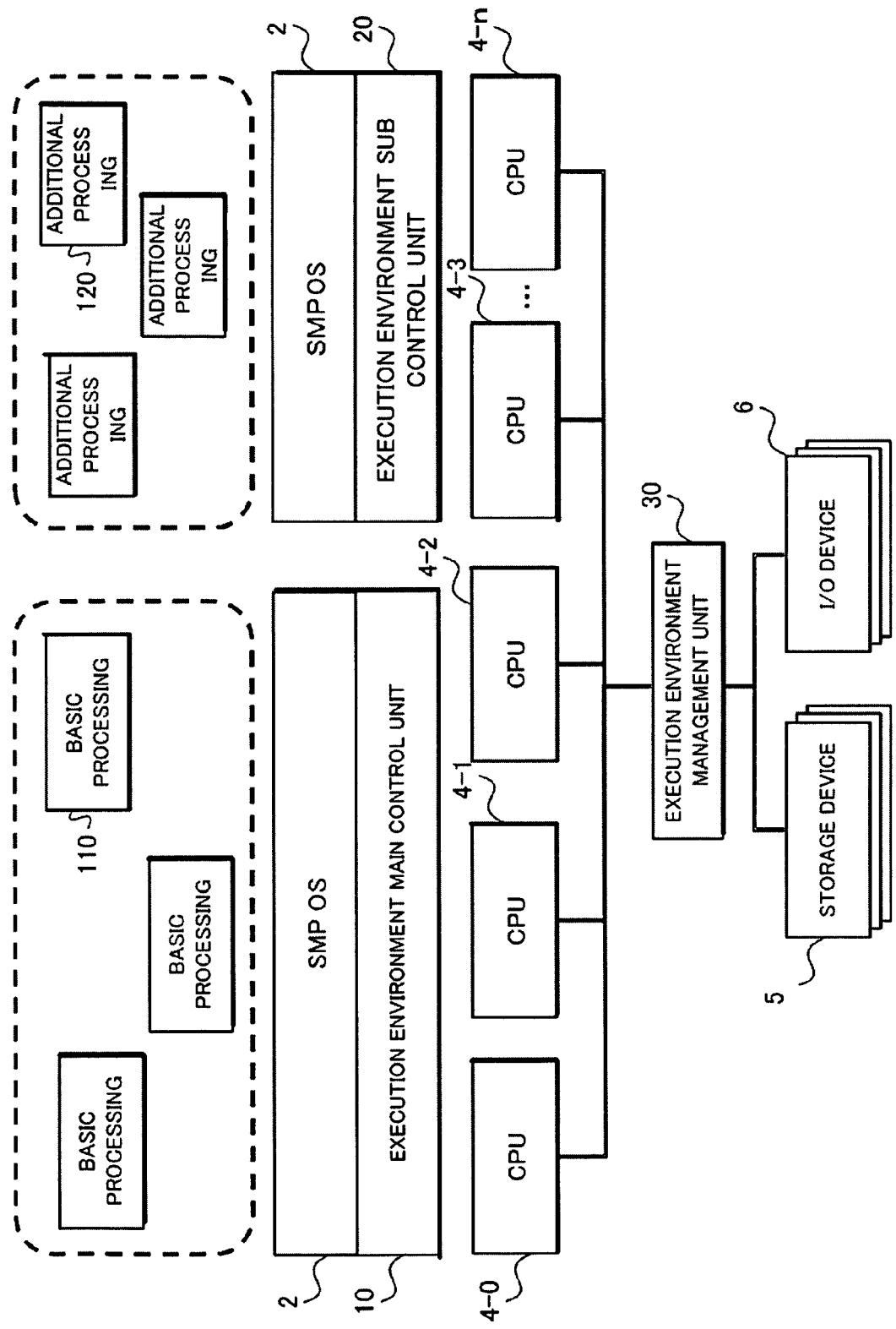
FIG. 37 is a diagram for use in explaining a state transition of the multiple processor system according to the first mode of implementation.
Figure 38:
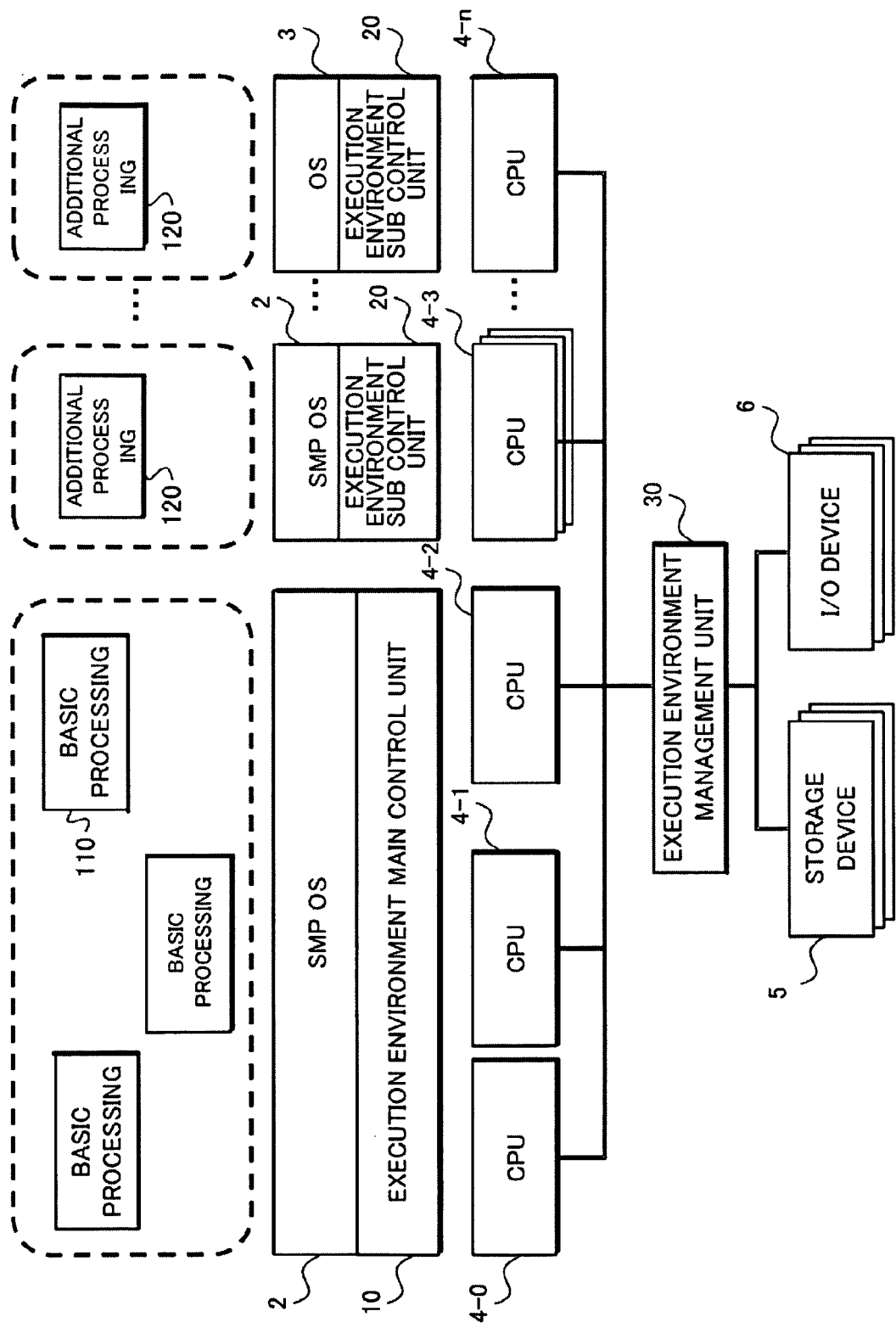
FIG. 38 is a diagram for use in explaining a state transition of the multiple processor system according to the first mode of implementation.

Further by the same manner, the above switching processing in the execution environment causes a state where the SMP OS 2 causes execution of the basic processing 110 under one execution environment formed by a plurality of CPUs and the SMP OS 2 causes execution of the additional processing 120 under an execution environment formed by all the remaining CPUs shown in FIG. 37 to make a transition to a state where the SMP OS 2 causes execution of the basic processing 110 under an execution environment formed by a plurality of CPUs, the SMP OS 2 causes execution of the additional processing 120 under one execution environment formed by one CPU out of the remaining CPUs and the OS 3 causes execution of the additional processing 120 under each execution environment formed by each of the remaining CPUs shown in FIG. 38.

(CPU Addition Processing (without Automatic Switching Function) in Main Execution Environment at Initial State)

Figure 50:
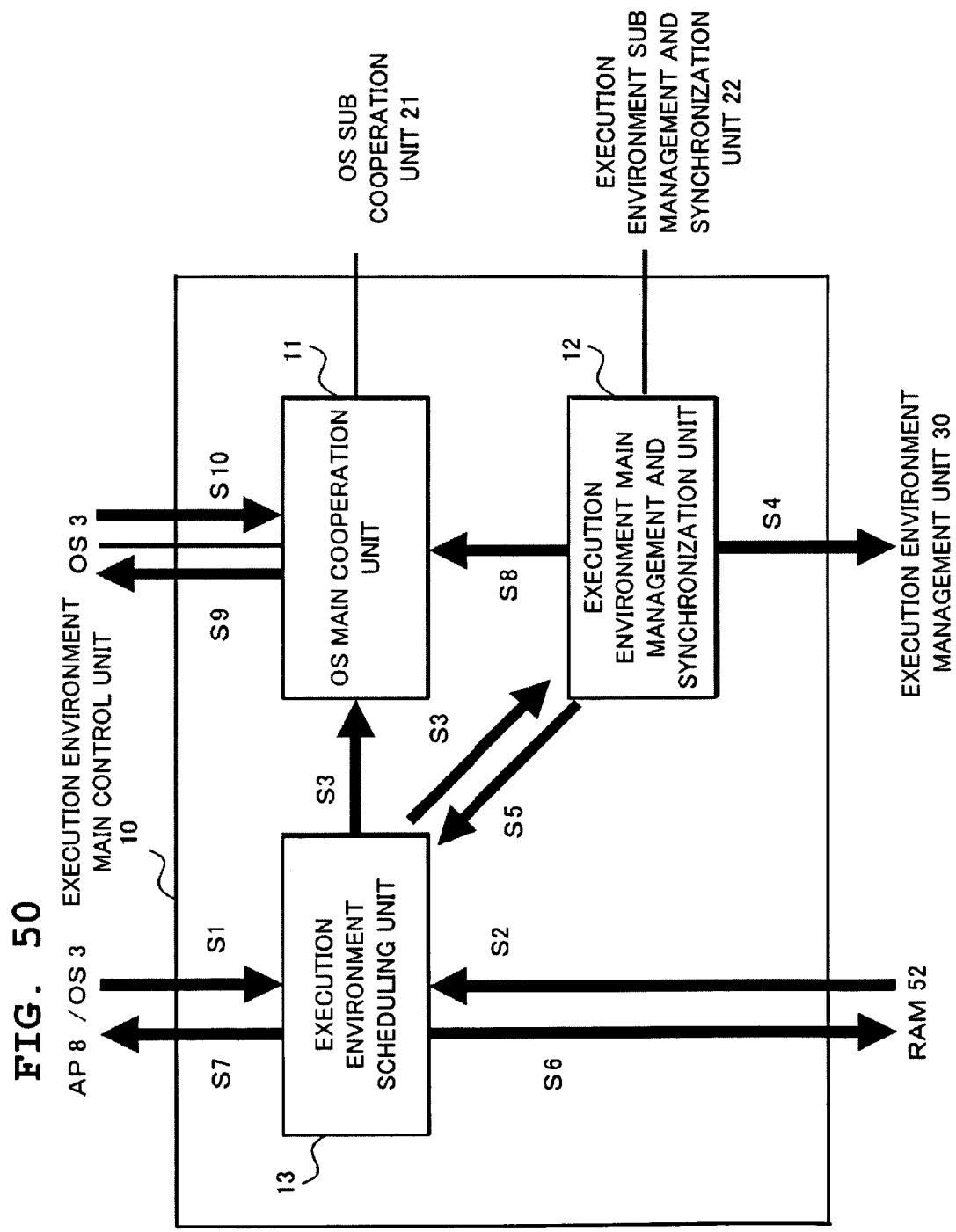
FIG. 50 is a diagram for use in explaining CPU addition processing (without the automatic switching function) in the main execution environment at an initial state which is executed by the execution environment main control unit according to the first mode of implementation.

FIG. 50 is a diagram for use in explaining CPU addition processing (without the automatic switching function) in the main execution environment at the initial state of the execution environment main control unit 10 according to the present mode of implementation.

With reference to FIG. 50, in the CPU addition processing (without the automatic switching function) in the main execution environment at the initial state of the execution environment main control unit 10 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for adding a CPU outside the relevant execution environment and notifies the execution environment main management and synchronization unit 12 of setting information of the execution environment management unit 30 as of after CPU addition at Step S3.

Next, the OS main cooperation unit 11 sets, at the execution environment management unit 30, setting information of the execution environment management unit 30 as of after CPU stop at Step S4 and notifies the execution environment scheduling unit 13 of the completion of the processing at Step S5.

Next, the execution environment scheduling unit 13 updates the execution environment information 521 at Step S6 and notifies the AP 8/OS 3 of completion of the request at Step S7.

Next, at Step S8, the execution environment main management and synchronization unit 12 notifies the OS main cooperation unit 11 of the completion of setting of the execution environment management unit 30 at Step S8.

Next, the OS main cooperation unit 11 requests the OS 3 to add the above-described CPU at Step S9 and receives a notification that the addition of the above CPU is completed from the OS 3 (approximate to CPU power-up processing in power supply management) at Step S10.

(CPU Addition Processing (without Automatic Switching Function) in Main Execution Environment with Context Setting Processing)

Figure 51:
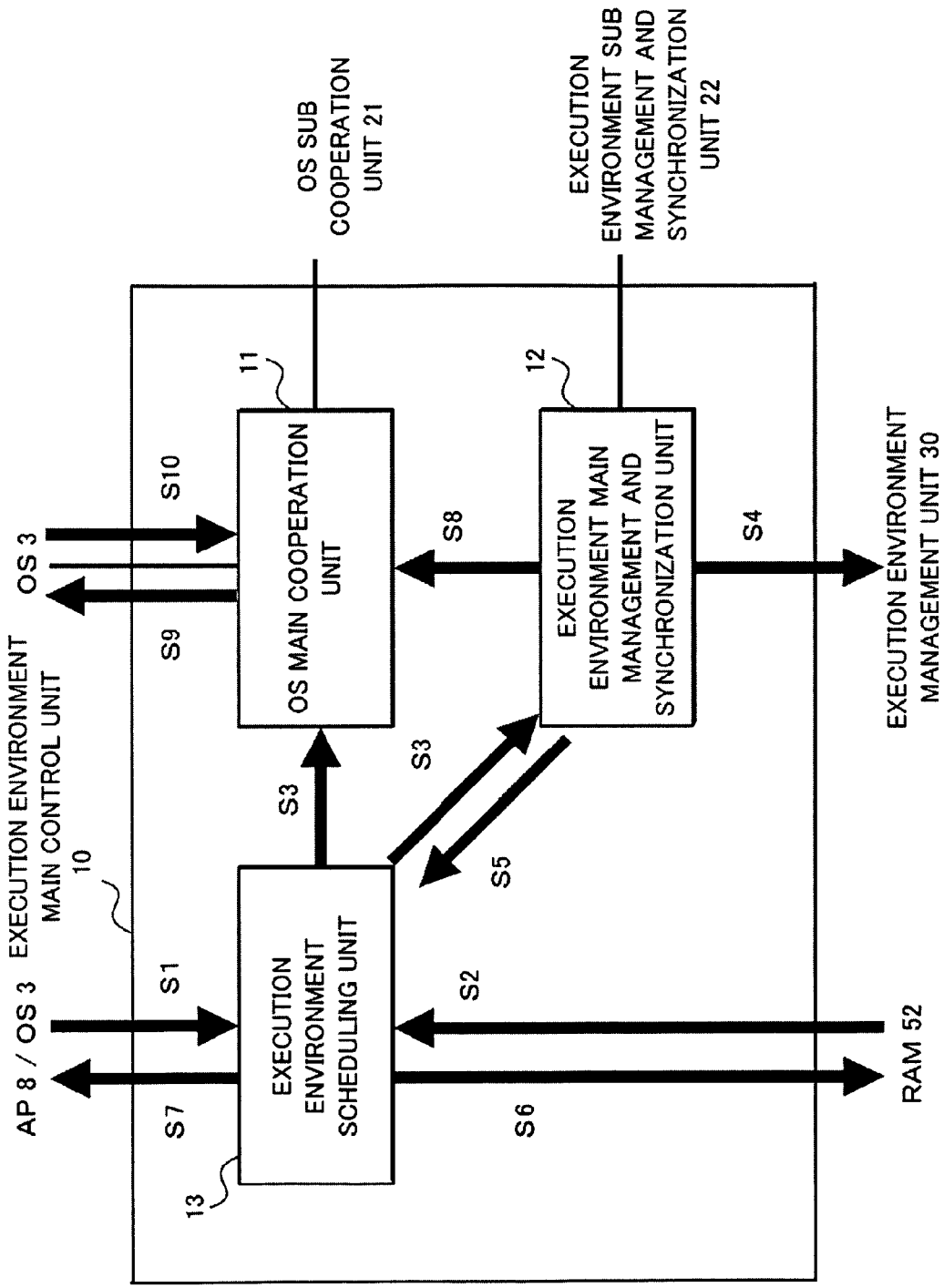
FIG. 51 is a diagram for use in explaining CPU addition processing (without the automatic switching function) in the main execution environment with context setting which is executed by the execution environment main control unit according to the first mode of implementation.

FIG. 51 is a diagram for use in explaining CPU addition processing (without automatic switching function) in the main execution environment with context setting processing by the execution environment main control unit 10 according to the present mode of implementation.

With reference to FIG. 51, in the CPU addition processing (without automatic switching function) in the main execution environment with context setting processing which is executed by the execution environment main control unit 10 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for adding a CPU outside the execution environment in question and a previous context 90 and notifies the execution environment main management and synchronization unit 12 of setting information of the execution environment management unit 30 as of after CPU addition at Step S3.

Next, the execution environment main management and synchronization unit 12 sets, at the execution environment management unit 30, setting information of the execution environment management unit 30 as of after the CPU stop at Step S4 and notifies the execution environment scheduling unit 13 of the completion of the processing at Step S5.

Next, the execution environment scheduling unit 13 updates the execution environment information 521 at Step S6 and notifies the AP 8/OS 3 of the completion of the request at Step S7.

Next, the execution environment main management and synchronization unit 12 notifies the OS main cooperation unit 11 of the completion of the setting of the execution environment management unit 30 at Step S8.

Next, the OS main cooperation unit 11 requests the OS 3 for adding the above CPU and previous context setting at Step S9 and receives a notification from the OS 3 that the CPU addition is completed at Step S10 (which is approximate to CPU resuming processing in power supply management).

Next, detailed description will be made of operation executed by the execution environment main control unit 10 in cooperation with the execution environment sub control unit 20 according to the present mode of implementation.

Description will be made of a state transition of the multiple processor system caused by the above CPU addition processing (without the automatic switching function) in the main execution environment with the context setting processing.

Figure 39:
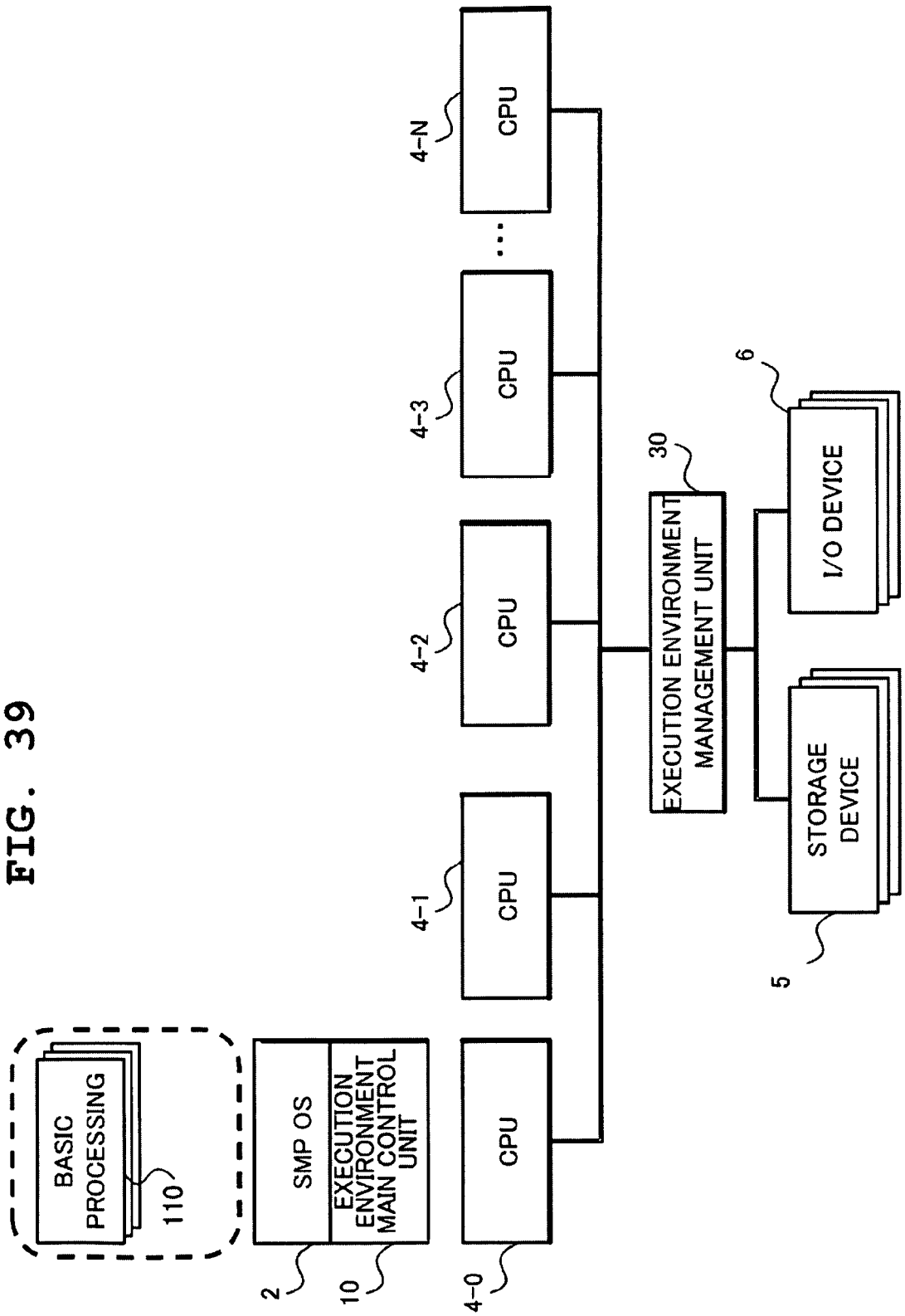
FIG. 39 is a diagram for use in explaining a state transition of the multiple processor system according to the first mode of implementation.
Figure 40:
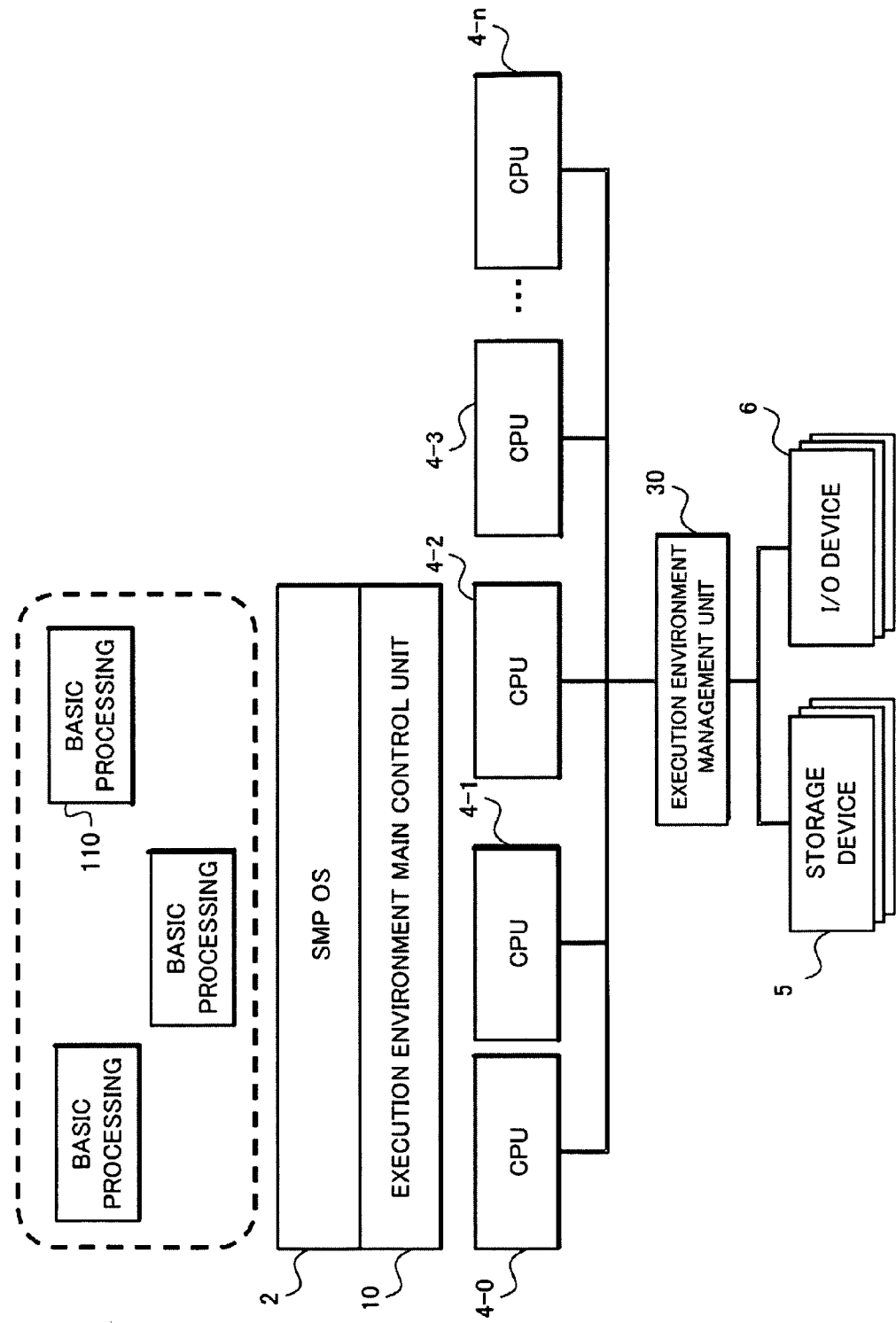
FIG. 40 is a diagram for use in explaining a state transition of the multiple processor system according to the first mode of implementation.

FIG. 39 illustrates a state where under one execution environment formed by one CPU, the SMP OS causes execution of the basic processing 110 and the remaining CPUs stop which is a state as of before the above CPU addition processing and FIG. 40 illustrates a state where under one execution environment formed by a plurality of CPUs, the SMP OS causes execution of the basic processing 110 and the remaining CPUs stop which is a state as of after the above CPU addition processing. In other words, the state shown in FIG. 39 makes a transition by the CPU addition processing to the state shown in FIG. 40 where a CPU in the main execution environment is added.

(OS Stopping Processing (without Automatic Switching Function) on Another CPU)

Figure 52:
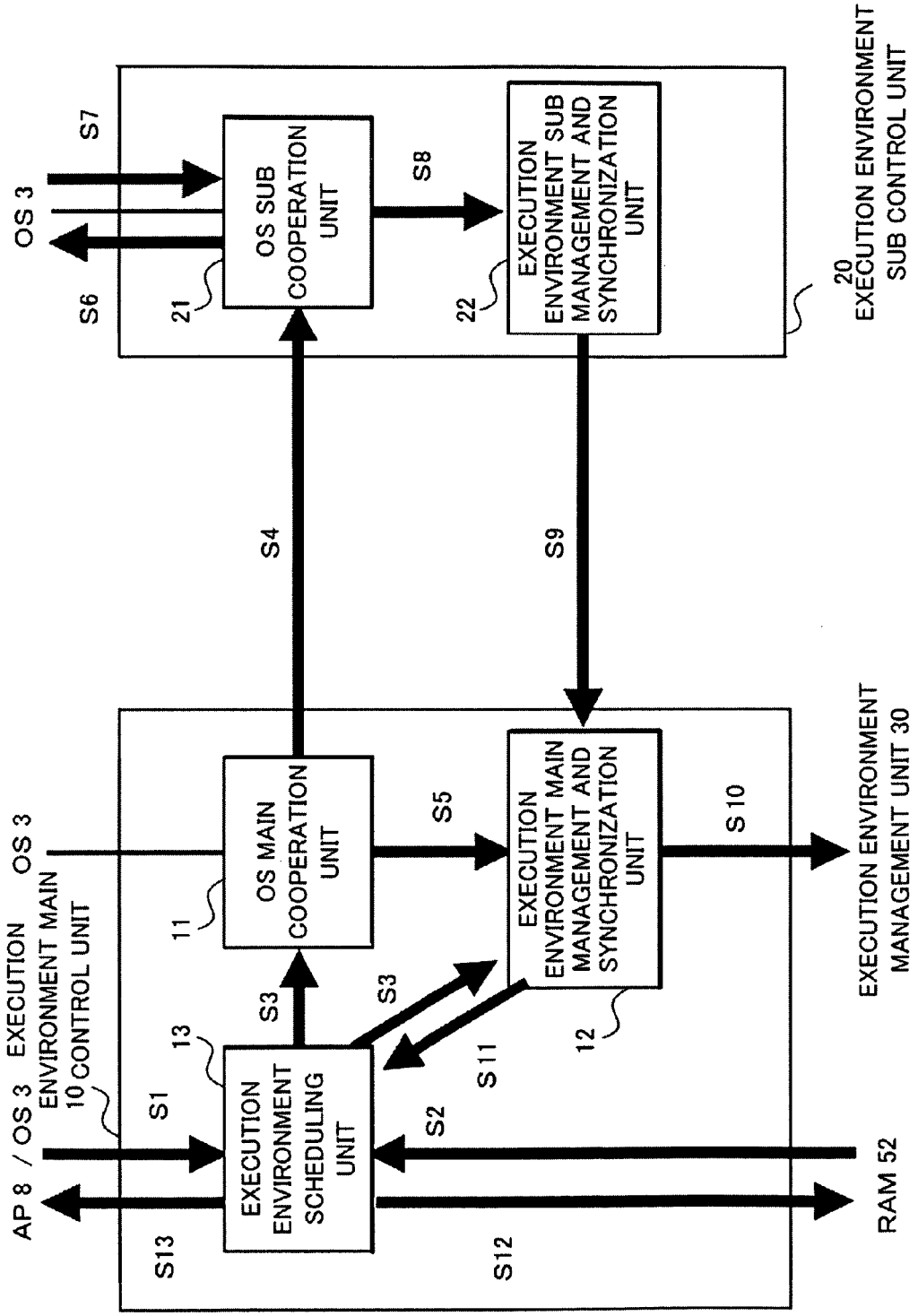
FIG. 52 is a diagram for use in explaining OS stopping processing (without the automatic switching function) on another CPU by the execution environment main control unit and the execution environment sub control unit according to the first mode of implementation.

FIG. 52 is a diagram for use in explaining OS stopping processing (without the automatic switching function) on another CPU executed by the execution environment main control unit 10 and the execution environment sub control unit 20 according to the present mode of implementation.

With reference to FIG. 52, in the OS stopping processing (without the automatic switching function) on another CPU executed by the execution environment main control unit 10 and the execution environment sub control unit 20 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for stopping an OS in an execution environment on another CPU and notifies the execution environment main management and synchronization unit 12 of setting information of the execution environment management unit 30 as of after OS stop at Step S3.

Next, the OS main cooperation unit 11 notifies the OS sub cooperation unit 21 on another CPU of the OS stop request at Step S4 and notifies the execution environment main management and synchronization unit 12 of waiting for the completion of the CPU stopping at Step S5.

Next, the OS sub cooperation unit 21 having received the notification requests the OS 3 to stop the CPU at Step S6, receives a notification of completion of the above CPU stop from the OS 3 (which is approximate to CPU shut-down processing in power supply management) at Step S7 and notifies the execution environment sub management and synchronization unit 22 of the completion of OS stop at Step S8.

Next, the execution environment sub management and synchronization unit 22 notifies the execution environment main management and synchronization unit 12 that the CPU stop is completed at Step S9.

Next, the execution environment main management and synchronization unit 12 sets, at the execution environment management unit 30, setting information of the execution environment management unit 30 as of after the CPU stop at Step S10 and notifies the execution environment scheduling unit 13 of the completion of the processing at Step S11.

Next, the execution environment scheduling unit 13 updates the execution environment information 521 at Step S12 and notifies the AP 8/OS 3 of the completion of the request at Step S13.

Next, the execution environment main management and synchronization unit 12 notifies the OS main cooperation unit 11 of the completion of setting of the execution environment management unit 30 at Step S8.

Next, the OS main cooperation unit 11 requests the OS 3 for the above CPU addition and previous context setting at Step S9 and receives a notification of completion of the above CPU addition from the OS 3 (which is approximate to CPU resuming processing in power supply management).

(OS Stopping Processing and Context Preserving Processing (without Automatic Switching Function) on Another CPU)

Figure 53:
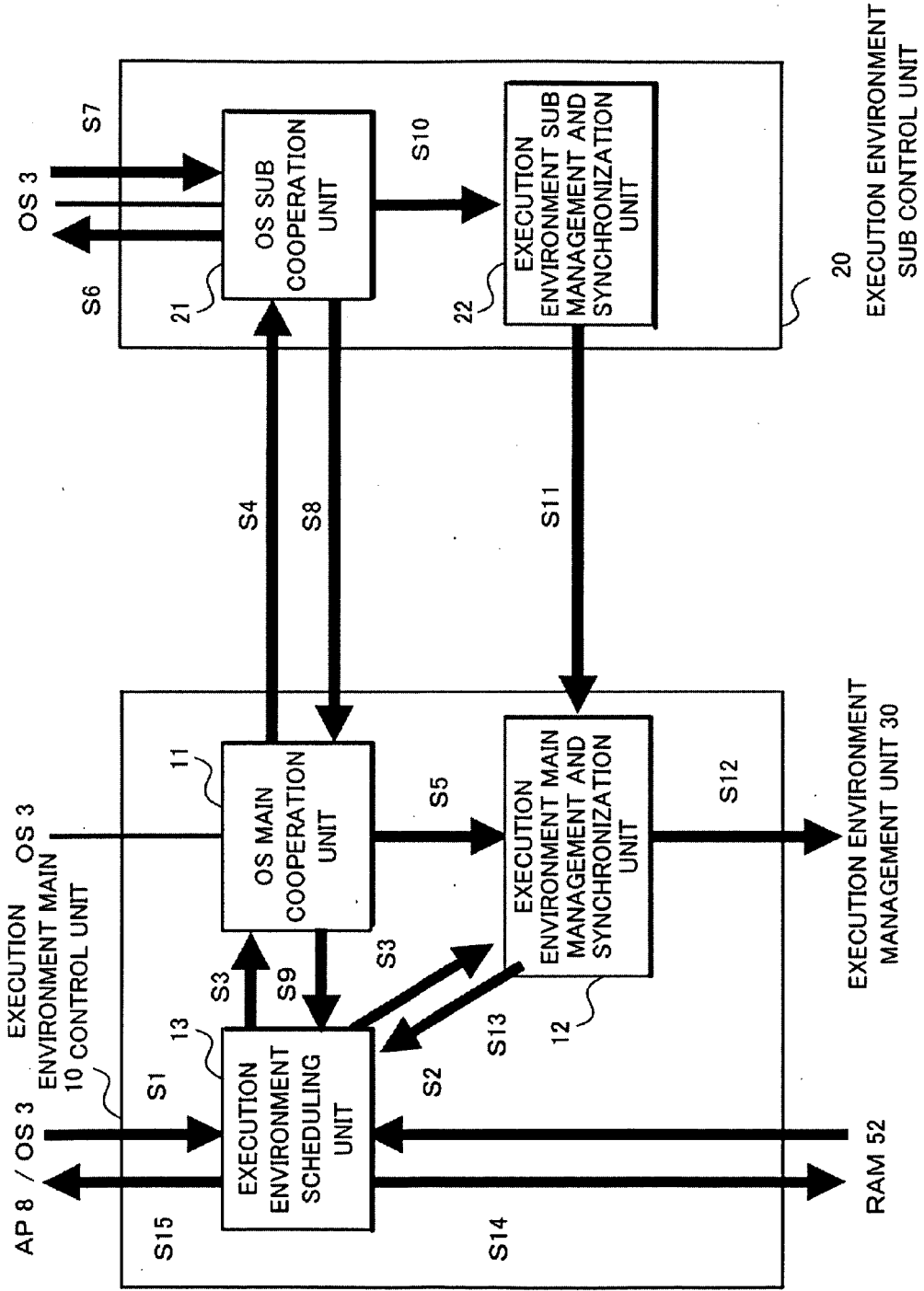
FIG. 53 is a diagram for use in explaining OS stopping processing and context preserving processing (without the automatic switching function) on another CPU which are executed by the execution environment main control unit and the execution environment sub control unit according to the first mode of implementation.

FIG. 53 is a diagram for use in explaining OS stopping processing and context preserving processing (without the automatic switching function) on another CPU executed by the execution environment main control unit 10 and the execution environment sub control unit 20 according to the present mode of implementation.

With reference to FIG. 53, in the OS stopping processing and the context preserving processing (without the automatic switching function) on another CPU executed by the execution environment main control unit 10 and the execution environment sub control unit 20 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for stopping an OS in an execution environment on another CPU and notifies the execution environment main management and synchronization unit 12 of setting information of the execution environment management unit 30 as of after OS stop at Step S3.

Next, the OS main cooperation unit 11 notifies the OS sub cooperation unit 21 on another CPU of the OS stop request at Step S4 and notifies the execution environment main management and synchronization unit 12 of waiting for the completion of the CPU stopping at Step S5.

Next, the OS sub cooperation unit 21 having received the notification requests the OS 3 to stop the CPU and preserve the context at Step S6, receives a notification of the completion of the above CPU stop and the context 90 of the OS 3 from the OS 3 (which is approximate to CPU suspending processing in power supply management) at Step S7 and sends the context 90 of the OS 3 to the OS main cooperation unit 11 at Step S8.

Next, the OS main cooperation unit 11 transfers the context 90 of the OS 3 to the execution environment scheduling unit 13 at Step S9.

Next, the OS sub cooperation unit 21 notifies the execution environment sub management and synchronization unit 22 of completion of OS stop at Step S10.

Next, at Step S11, the execution environment sub management and synchronization unit 22 notifies the execution environment main management and synchronization unit 12 that the CPU stop is completed.

Next, the execution environment main management and synchronization unit 12 sets, at the execution environment management unit 30, setting information of the execution environment management unit 30 as of after the OS stop at Step S12 and notifies the execution environment scheduling unit 13 of the completion of the processing at Step S13.

Next, the execution environment scheduling unit 13 updates the execution environment information 521 at Step S14 and notifies the AP 8/OS 3 of the completion of the request at Step S15.

Description will be made of a state transition of the multiple processor system by the OS stopping processing and the context preserving processing (without the automatic switching function) on another CPU.

Figure 41:
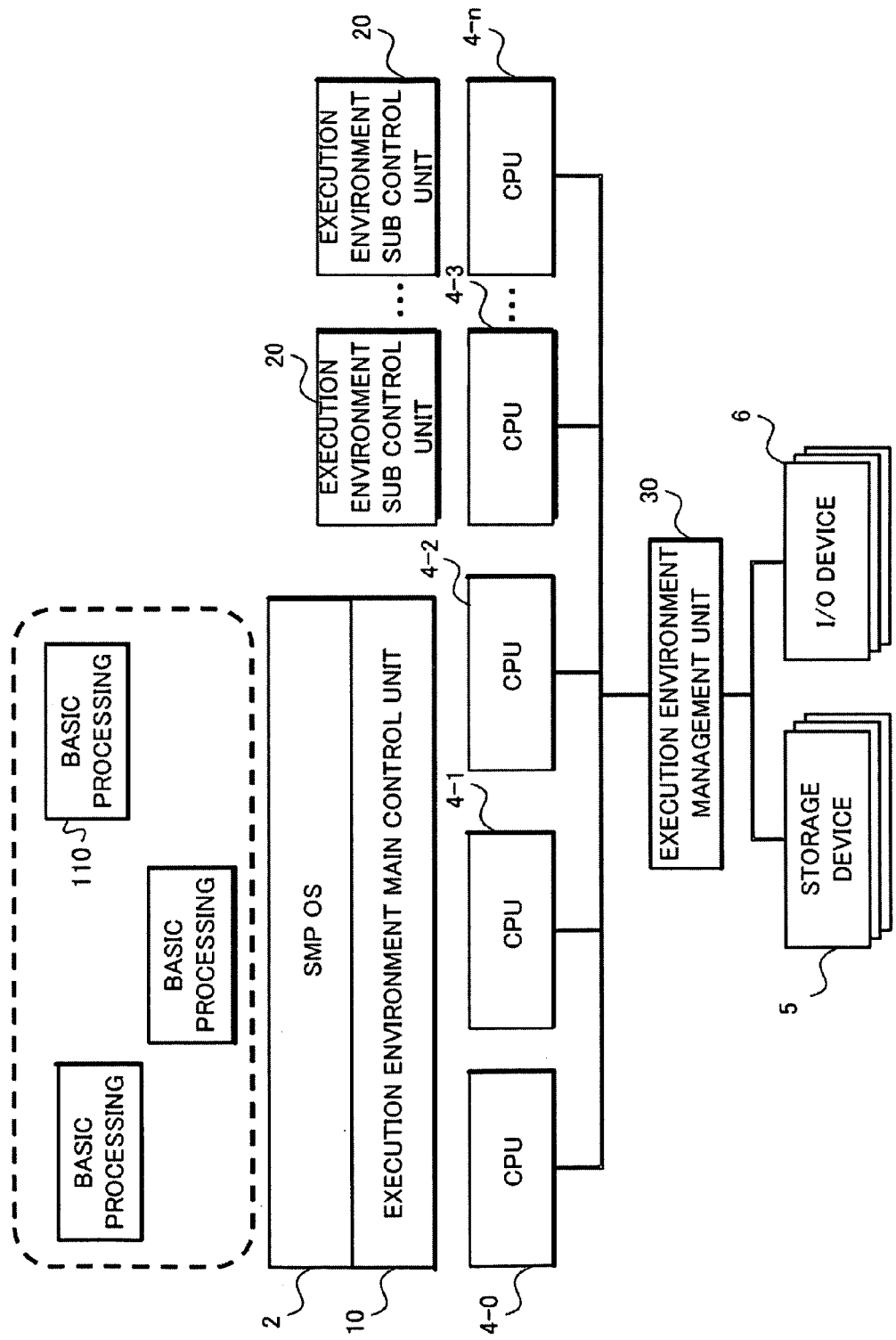
FIG. 41 is a diagram for use in explaining a state transition of the multiple processor system according to the first mode of implementation.

FIG. 35 illustrates a state where under one execution environment formed by a plurality of CPUs, the SMP OS causes execution of the basic processing 110 and under the other one execution environment formed by one CPU, the OS causes execution of the additional processing 120 which is a state as of before the above OS stopping processing and FIG. 41 illustrates a state where under one execution environment formed by a plurality of CPUs, the SMP OS causes execution of the basic processing 110 and under other one execution environment formed by one CPU, the OS which causes execution of the additional processing 120 stops which is a state as of after the above OS stopping processing. In other words, the state shown in FIG. 35 makes a transition by the OS stopping processing to the state shown in FIG. 41 where the OS 3 on another CPU stops.

(Execution Environment Switching Processing on Another CPU (without Automatic Switching Function))

Figure 54:
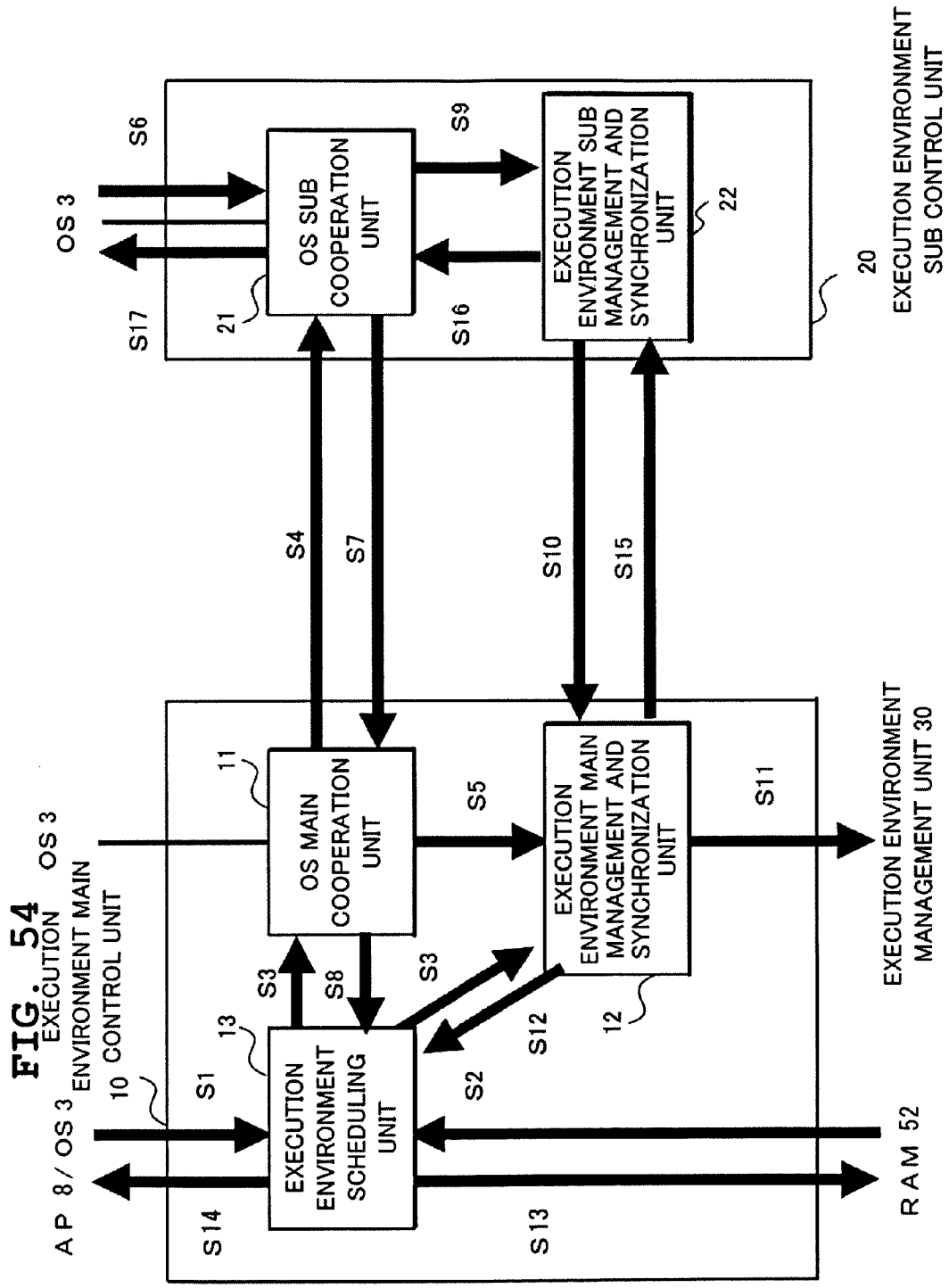
FIG. 54 is a diagram for use in explaining execution environment switching processing (without the automatic switching function) on another CPU which is executed by the execution environment main control unit and the execution environment sub control unit according to the first mode of implementation.

FIG. 54 is a diagram for use in explaining execution environment switching processing (without the automatic switching function) on another CPU which is executed by the execution environment main control unit 10 and the execution environment sub control unit 20 according to the present mode of implementation.

With reference to FIG. 54, in the execution environment switching processing (without the automatic switching function) on another CPU which is executed by the execution environment main control unit 10 and the execution environment sub control unit 20 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of an execution environment switching request for an execution environment on another CPU and the context 90 of a switching destination and notifies the execution environment main management and synchronization unit 12 of setting information of the execution environment management unit 30 as of after switching at Step S3.

Next, the OS main cooperation unit 11 notifies the OS sub cooperation unit 21 on another CPU of the execution environment switching request and the context 90 of the switching destination at Step S4 and notifies the execution environment main management and synchronization unit 12 of waiting for the completion of the execution environment switching at Step S5.

Next, the OS sub cooperation unit 21 having received the notification accepts the context 90 of the OS 3 in operation at Step S6 and sends the context 90 of the OS 3 to the OS main cooperation unit 11 at Step S7.

Next, the OS main cooperation unit 11 transfers the context 90 of the OS 3 to the execution environment scheduling unit 13 at Step S8.

Next, at Step S9, the OS sub cooperation unit 21 notifies the execution environment sub management and synchronization unit 22 of the completion of context extraction.

Next, at Step S10, the execution environment sub management and synchronization unit 22 notifies the execution environment main management and synchronization unit 12 that the context extraction is completed.

Next, the execution environment main management and synchronization unit 12 sets, at the execution environment management unit 30, setting information of the execution environment management unit 30 as of after the CPU stop at Step S11 and notifies the execution environment scheduling unit 13 of the completion of the processing at Step S12.

Next, the execution environment scheduling unit 13 updates the execution environment information 521 at Step S13 and notifies the AP 8/OS 3 of the completion of the request at Step S14.

Next, the execution environment main management and synchronization unit 12 notifies the execution environment sub management and synchronization unit 22 of the completion of setting of the execution environment management unit 30 at Step S15.

Next, the execution environment sub management and synchronization unit 22 notifies the OS sub cooperation unit 21 of the completion of the setting at Step S16.

Next, the OS sub cooperation unit 21 sets the previously received context 90 of the switching destination at Step S17.

At the time of executing the switching processing shown in FIG. 54, first execute the OS stopping processing and the context preserving processing on another CPU shown in FIG. 53 and then reset another CPU or turn off the power. Next, by re-starting another CPU from a clear state by reset-releasing or power-on, start the OS sub cooperation unit on another CPU from a clear state. Thereafter, by executing the OS starting processing on another CPU with the context setting processing shown in FIG. 56, even when the OS sub cooperation unit on another CPU in question fails to normally operate due to affection of viruses or the like, the OS sub cooperation unit at a normal state can be again started through resetting and power-off, so that extremely stable and safe execution environment switching processing can be realized on another CPU although the transition takes time.

Description will be made of a state transition of the multiple processor system caused by the above execution environment switching processing (without the automatic switching function) on another CPU.

Figure 42:
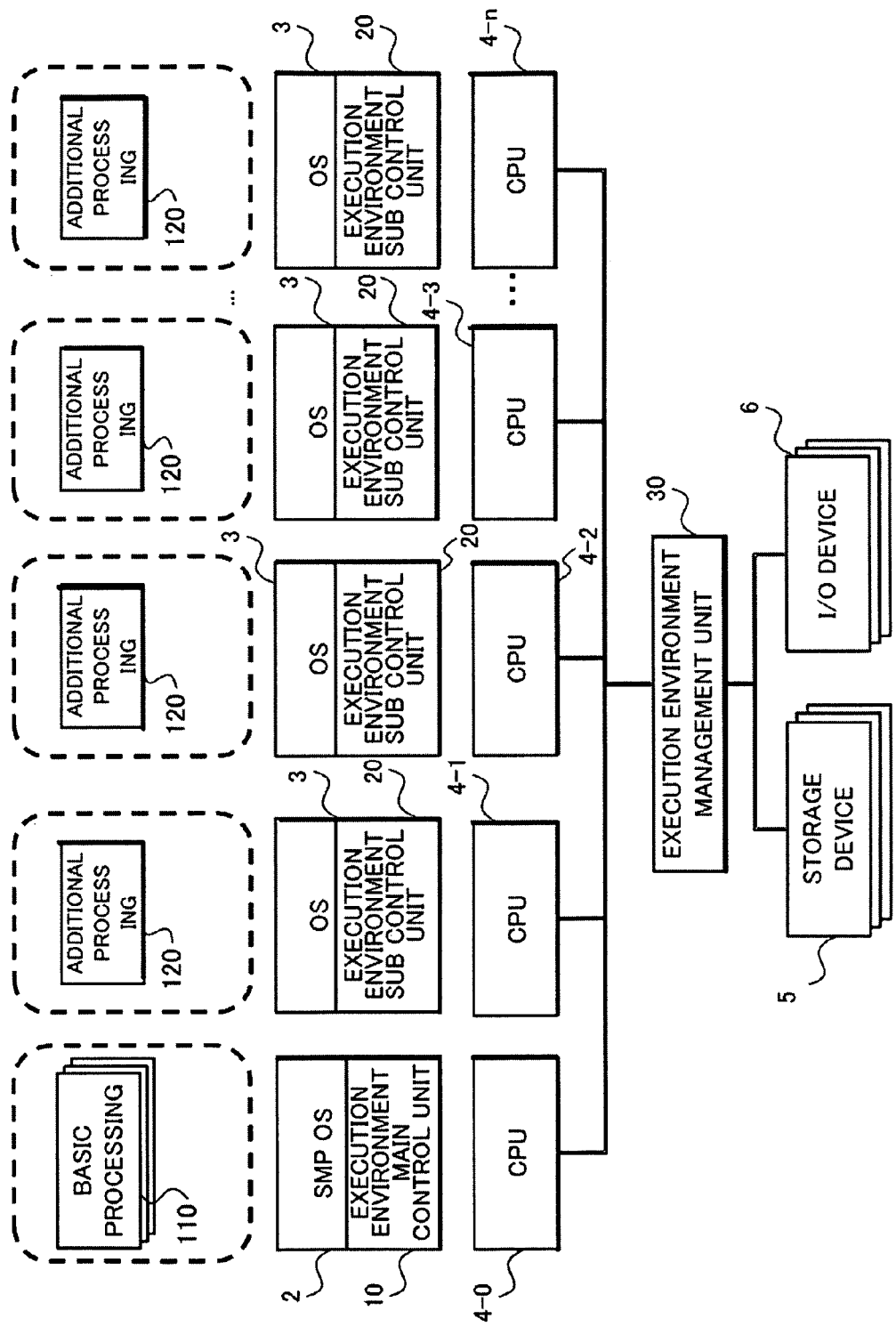
FIG. 42 is a diagram for use in explaining a state transition of the multiple processor system according to the first mode of implementation.
Figure 43:
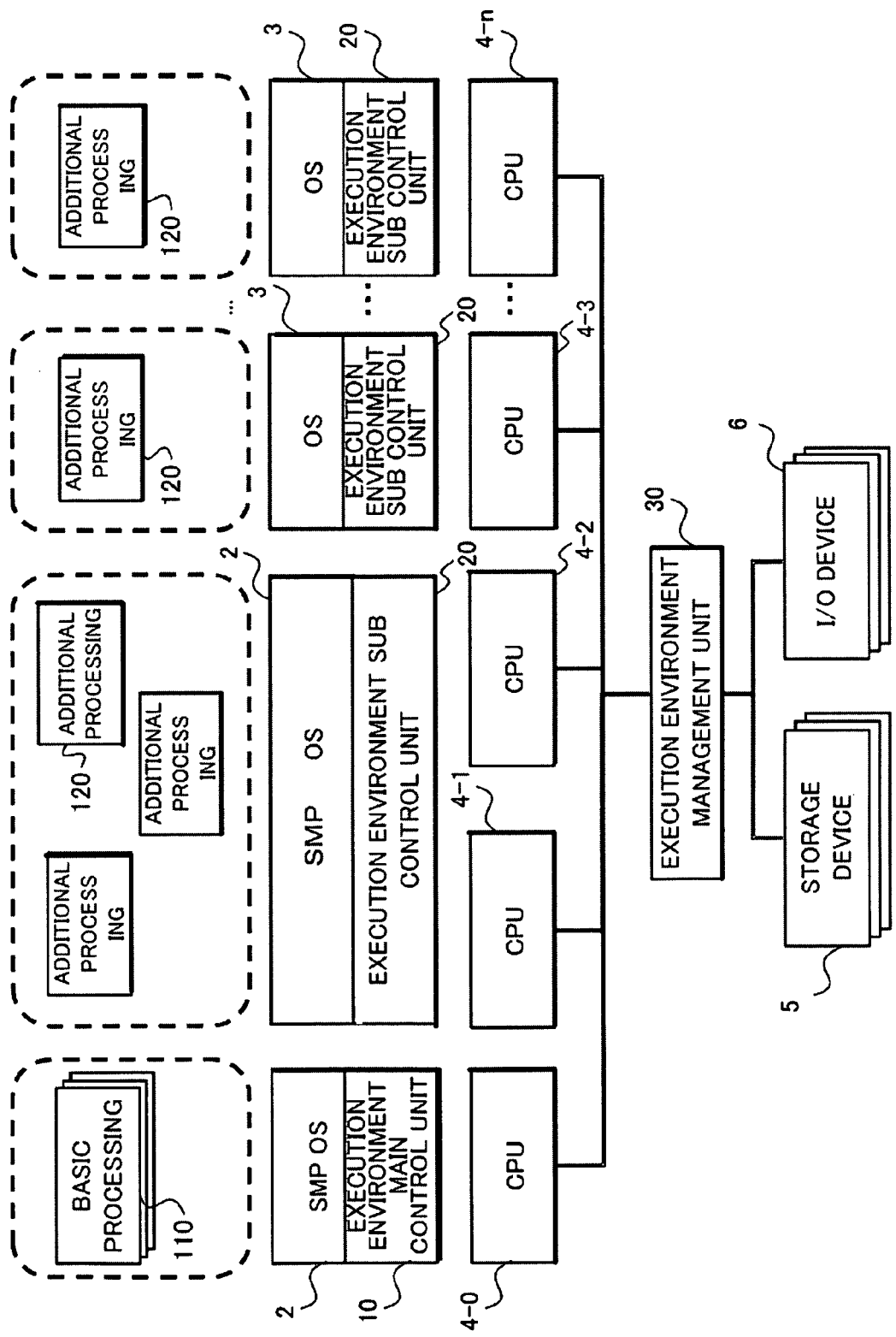
FIG. 43 is a diagram for use in explaining a state transition of the multiple processor system according to the first mode of implementation.

FIG. 42 illustrates a state where under one execution environment formed by one CPU, the SMP OS causes execution of the basic processing 110 and under each execution environment formed by each of the remaining CPUs, each OS causes execution of the additional processing 120 which is a state as of before the above execution environment switching processing and FIG. 43 illustrates a state where under one execution environment formed by one CPU, the SMP OS causes execution of the basic processing 110, under one execution environment formed of a plurality of CPUs among the remaining respective CPUs, the SMP OS causes execution of the additional processing 120 and under each execution environment formed by each of the remaining CPUs, each OS causes execution of the additional processing 120 which is a state as of after the above execution environment switching processing. In other words, the state shown in FIG. 42 makes a transition by the execution environment switching processing to the state shown in FIG. 43 where switching is executed in the execution environment on another CPU.

Figure 44:
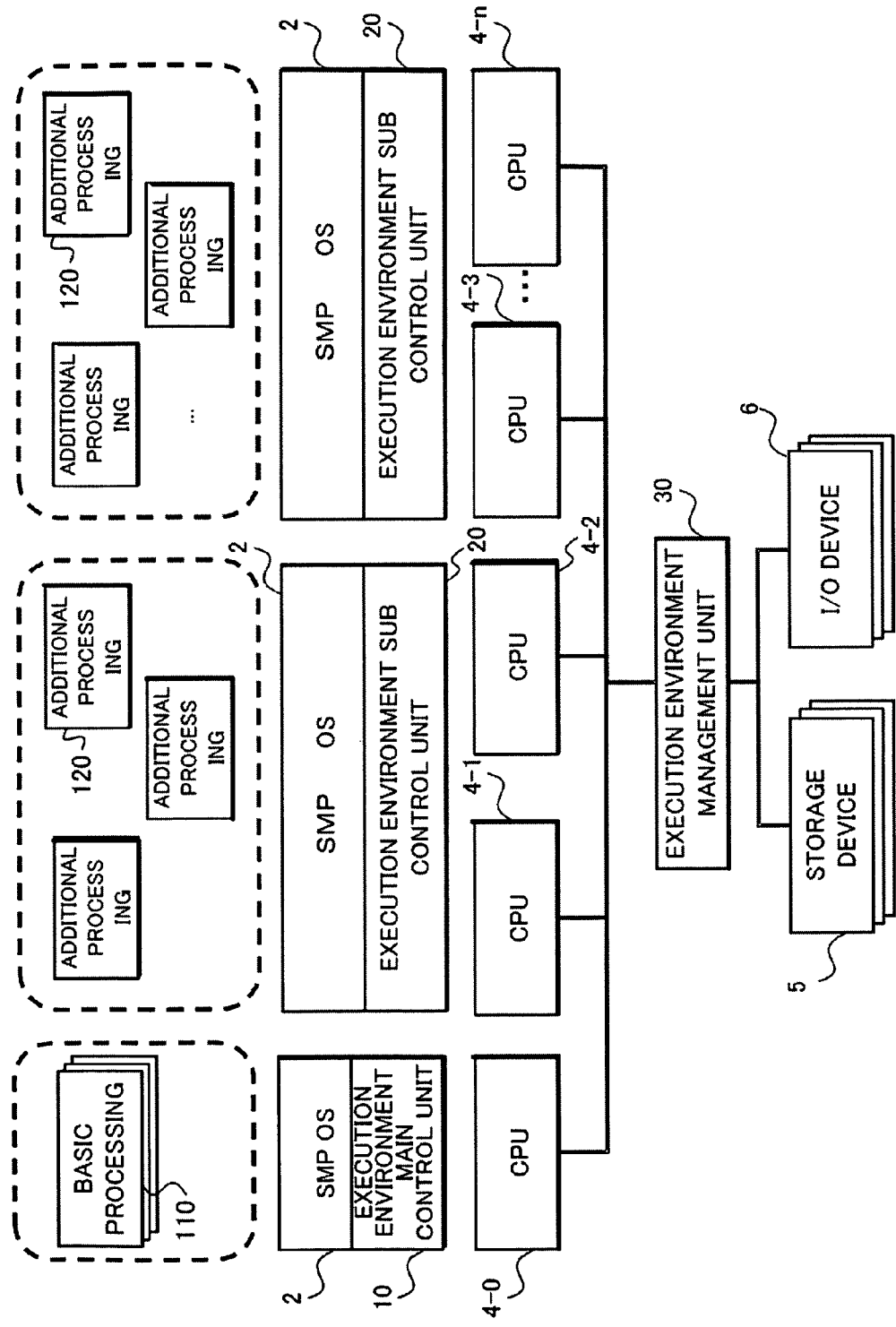
FIG. 44 is a diagram for use in explaining a state transition of the multiple processor system according to the first mode of implementation.

Moreover, in the same manner, the state shown in FIG. 43 makes a transition by the above execution environment switching processing to the state shown in FIG. 44 where under one execution environment formed by one CPU, the SMP OS 2 causes execution of the basic processing 110, under one execution environment formed of a plurality of CPUs among the remaining respective CPUs, the SMP OS 2 causes execution of the additional processing 120 and under one execution environment formed of all the remaining CPUs, the SMP OS 2 causes execution of the additional processing 120.

(OS Starting Processing (without Automatic Switching Function) on Another CPU in Initial State)

Figure 55:
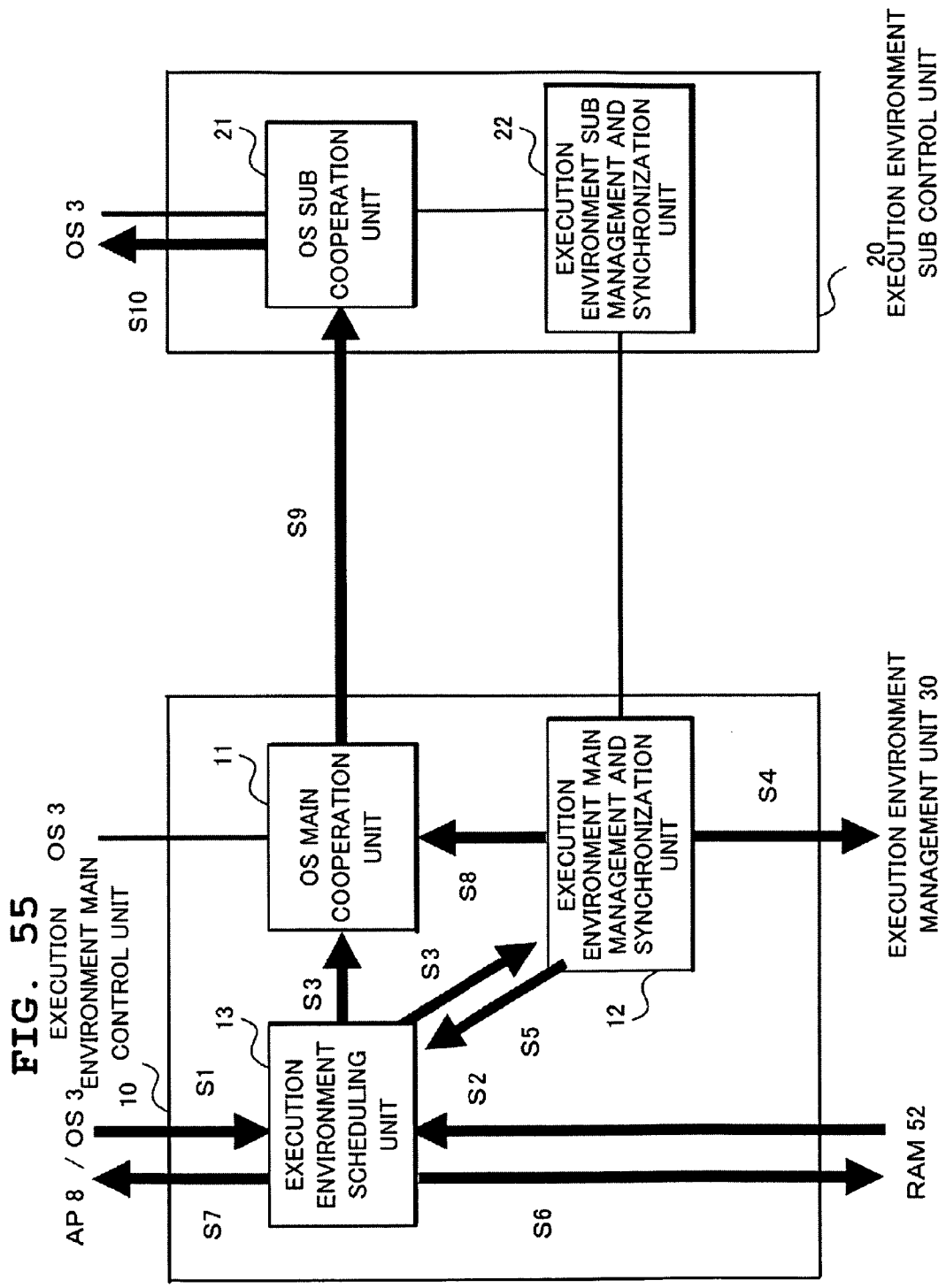
FIG. 55 is a diagram for use in explaining OS starting processing (without the automatic switching function) on another CPU at the initial state which is executed by the execution environment main control unit and the execution environment sub control unit according to the first mode of implementation.

FIG. 55 is a diagram for use in explaining OS starting processing (without the automatic switching function) on another CPU in an initial state which is executed by the execution environment main control unit 10 and the execution environment sub control unit 20 according to the present mode of implementation.

With reference to FIG. 55, in OS starting processing (without the automatic switching function) on another CPU in an initial state which is executed by the execution environment main control unit 10 and the execution environment sub control unit 20 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a CPU starting request for another CPU in question and notifies the execution environment main management and synchronization unit 12 of setting information of the execution environment management unit 30 as of after CPU start at Step S3.

Next, the execution environment main management and synchronization unit 12 sets, at the execution environment management unit 30, setting information of the execution environment management unit 30 as of after the CPU stop at Step S4 and notifies the execution environment scheduling unit 13 of the completion of the processing at Step S5.

Next, the execution environment scheduling unit 13 updates the execution environment information 521 at Step S6 and notifies the AP 8/OS 3 of the completion of the request at Step S7.

Next, the execution environment main management and synchronization unit 12 notifies the OS main cooperation unit 11 of the completion of the setting at Step S8.

Next, the OS main cooperation unit 11 requests the OS sub cooperation unit 21 on another CPU for starting a CPU at Step S9.

Next, the OS sub cooperation unit 21 starts the CPU at Step S10 (which is approximate to CPU power-up processing in power supply management).

(OS Starting Processing (without Automatic Switching Function) on Another CPU with Context Setting Processing)

Figure 56:
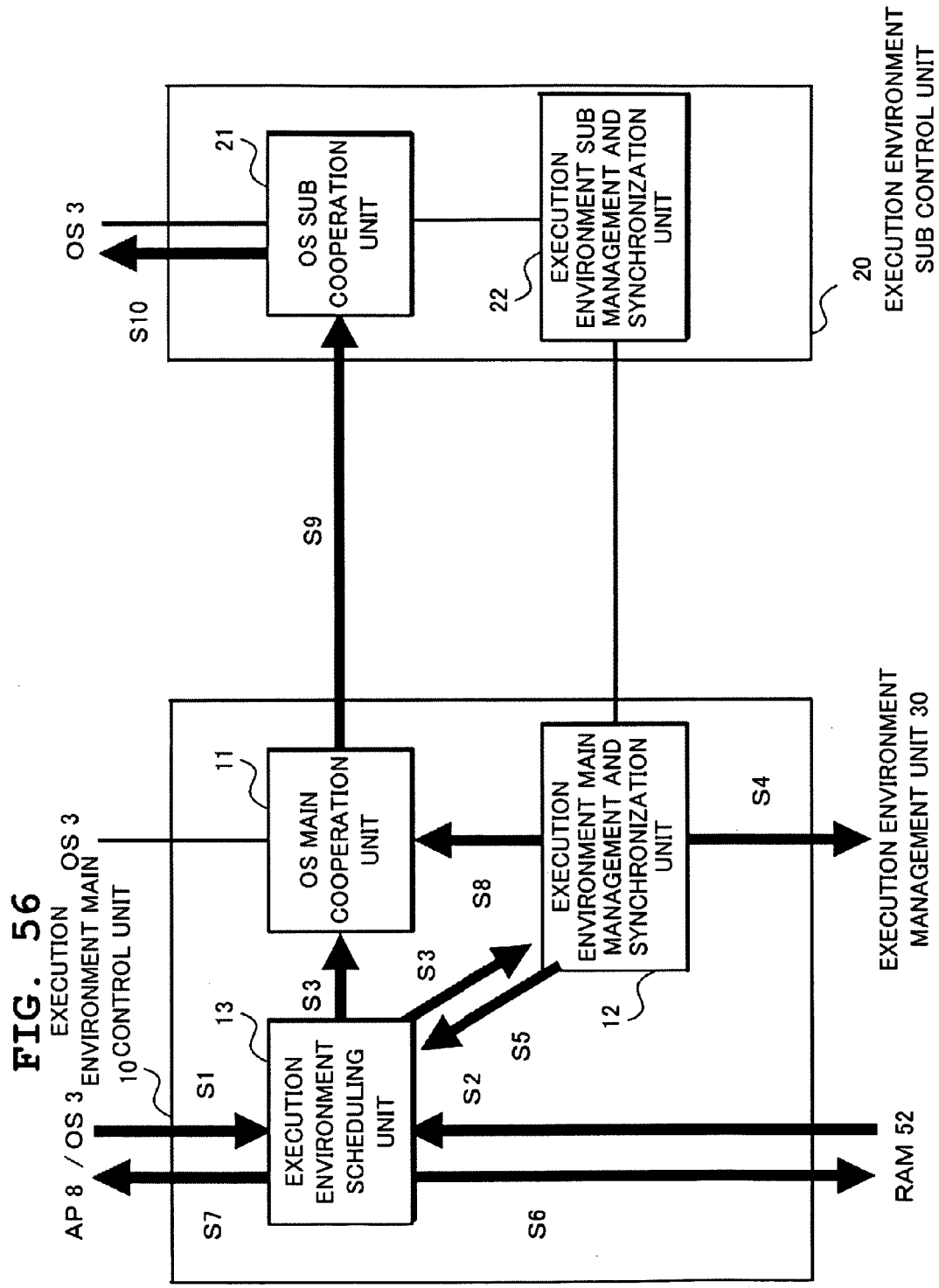
FIG. 56 is a diagram for use in explaining OS starting processing (without the automatic switching function) on another CPU with context setting which is executed by the execution environment main control unit and the execution environment sub control unit according to the first mode of implementation.

FIG. 56 is a diagram for use in explaining OS starting processing (without the automatic switching function) on another CPU with context setting processing which is executed by the execution environment main control unit 10 and the execution environment sub control unit 20 according to the present mode of implementation.

With reference to FIG. 56, in the OS starting processing (without the automatic switching function) on another CPU with context setting processing which is executed by the execution environment main control unit 10 and the execution environment sub control unit 20 according to the present mode of implementation, the execution environment scheduling unit 13 receives a request in question from the AP 8/OS 3 at Step S1, reads the execution environment information 521 on the RAM 52 at Step S2, and notifies the OS main cooperation unit 11 of a request for adding a CPU outside the execution environment in question and the previous context 90 and notifies the execution environment main management and synchronization unit 12 of setting information of the execution environment management unit 30 as of after CPU addition at Step S3.

Next, the execution environment main management and synchronization unit 12 sets, at the execution environment management unit 30, setting information of the execution environment management unit 30 as of after the CPU stop at Step S4 and notifies the execution environment scheduling unit 13 of the completion of the processing at Step S5.

Next, the execution environment scheduling unit 13 updates the execution environment information 521 at Step S6 and notifies the AP 8/OS 3 of the completion of the request at Step S7.

Next, the execution environment main management and synchronization unit 12 notifies the OS main cooperation unit 11 of the completion of the setting of the execution environment management unit 30 at Step S8.

Next, the OS main cooperation unit 11 requests the OS sub cooperation unit 21 on another CPU for CPU starting and previous context setting at Step S9.

Next, the OS sub cooperation unit 21 starts the CPU and sets the context at Step S10 (which is approximate to CPU resuming processing in power supply management).

Description will be made of a state transition of the multiple processor system caused by the OS starting processing (without the automatic switching function) on another CPU with the context setting processing.

FIG. 41 illustrates a state where under one execution environment formed by a plurality of CPUs, the SMP OS causes execution of the basic processing 110 and under other one execution environment formed by one CPU, an OS causing execution of the additional processing 120 stops which is a state as of before the above OS starting processing and FIG. 35 illustrates a state where under one execution environment formed by a plurality of CPUs, the SMP OS causes execution of the basic processing 110 and under other one execution environment formed by one CPU, the OS causes execution of the additional processing 120 which is a state as of after the OS starting processing. In other words, the state shown in FIG. 41 makes a transition by the OS starting processing to the state shown in FIG. 35 where the OS 3 on another CPU is started.

(Processing of Switching from Execution Environment Sub Control Unit 20 (without Automatic Switching Function))

Figure 57:
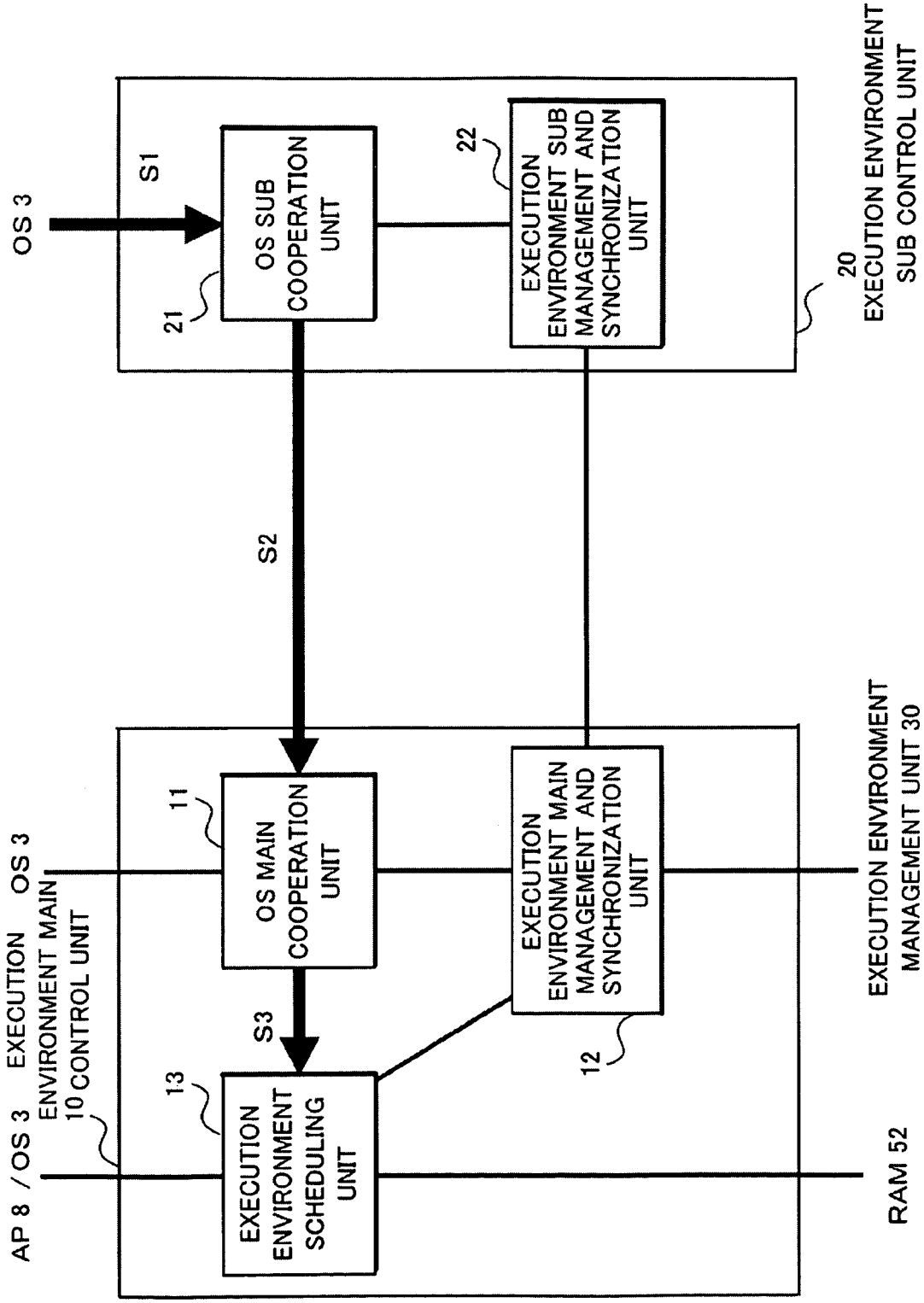
FIG. 57 is a diagram for use in explaining processing of switching (without the automatic switching function) from the execution environment sub control unit which is executed by the execution environment main control unit and the execution environment sub control unit according to the first mode of implementation.

FIG. 57 is a diagram for use in explaining processing of switching from the execution environment sub control unit (without the automatic switching function) which is executed by the execution environment main control unit 10 and the execution environment sub control unit 20 according to the present mode of implementation.

With reference to FIG. 57, in processing of switching from the execution environment sub control unit 20 (without the automatic switching function) which is executed by the execution environment main control unit 10 and the execution environment sub control unit 20 according to the present mode of implementation, the OS sub cooperation unit 21 receives a request in question from the OS 3 at Step S1 and notifies the OS main cooperation unit 11 of the request at Step S2.

Next, the OS main cooperation unit 11 notifies the execution environment scheduling unit 13 of the request at Step S3.

(Execution Environment Sub Control Unit Stopping Processing (without Automatic Switching Function) on Another CPU)

Figure 58:
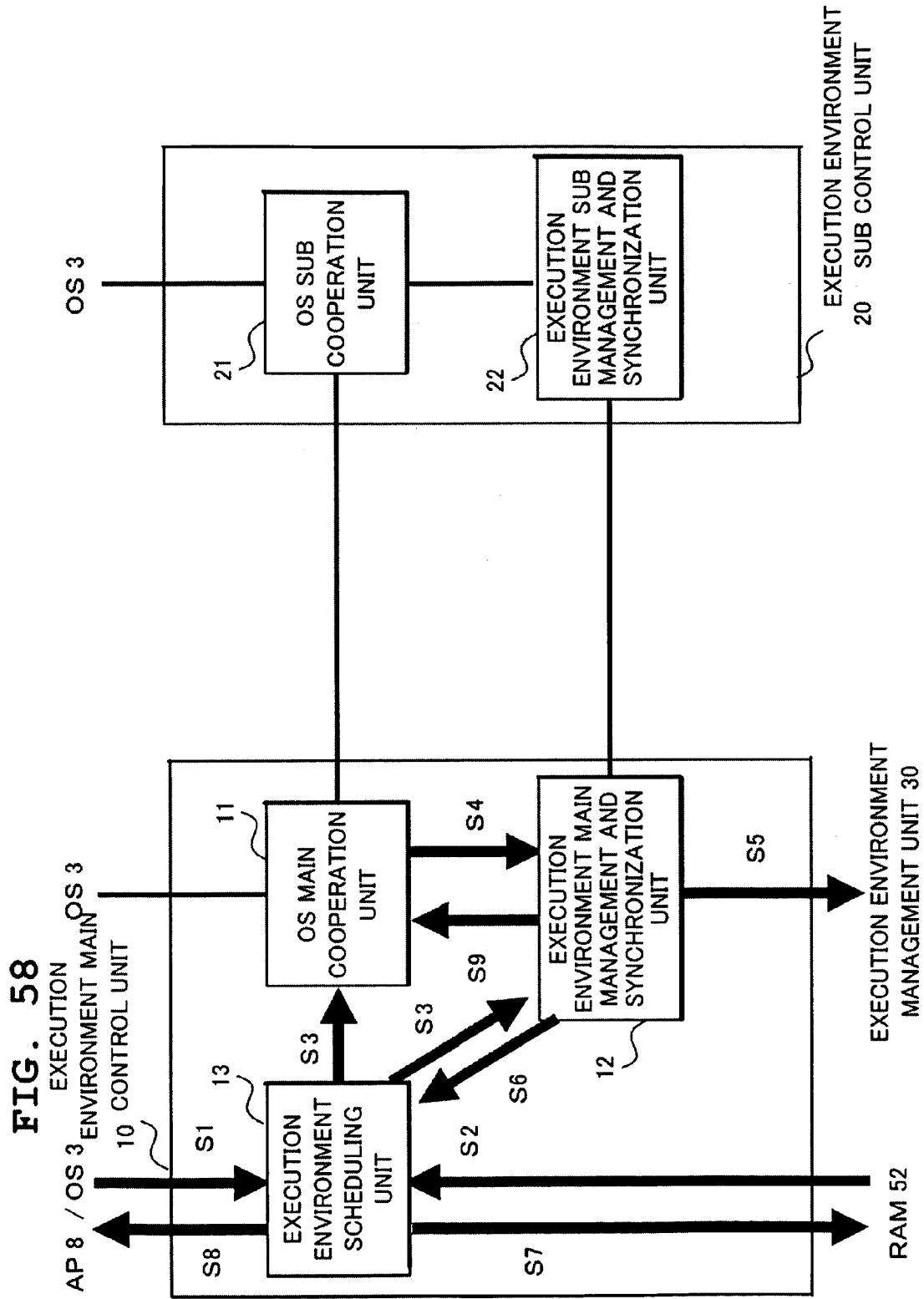
FIG. 58 is a diagram for use in explaining processing of stopping the execution environment sub control unit (without the automatic switching function) on another CPU which is executed by the execution environment main control unit according to the first mode of implementation.

FIG. 58 is a diagram for use in explaining execution environment sub control unit stopping processing (without the automatic switching function) on another CPU which is executed by the execution environment main control unit 10 according to the present mode of implementation.

With reference to FIG. 58, in the execution environment sub control unit stopping processing (without the automatic switching function) on another CPU which is executed by the execution environment main control unit 10 according to the present mode of implementation, the execution environment scheduling unit 13 receives a request in question from the AP 8/OS 3 at Step S1, reads the execution environment information 521 on the RAM 52 at Step S2, and at Step S3, notifies the OS main cooperation unit 11 of a request for stopping the execution environment sub control unit in the execution environment on another CPU and notifies the execution environment main management and synchronization unit 12 of setting information of the execution environment management unit 30 as of after the execution environment sub control unit stops.

Next, at Step S4, the OS main cooperation unit 11 requests the execution environment main management and synchronization unit 12 for setting of the execution environment management unit 30 as of after the execution environment sub control unit stop.

Next, at Step S5, the execution environment main management and synchronization unit 12 sets, at the execution environment management unit 30, setting information of the execution environment management unit 30 as of after the execution environment sub control unit stopping and at Step S6, notifies the execution environment scheduling unit 13 of the completion of the processing.

Next, the execution environment scheduling unit 13 updates the execution environment information 521 at Step S7 and notifies the AP 8/OS 3 of the completion of the request at Step S8.

Next, the execution environment main management and synchronization unit 12 notifies the OS main cooperation unit 11 of the completion of the setting of the execution environment management unit 30, so that the OS main cooperation unit 11 stops the CPU in question at Step S9.

Description will be made of a state transition of the multiple processor system caused by the execution environment sub control unit stopping processing (without the automatic switching function) on another CPU.

Figure 45:
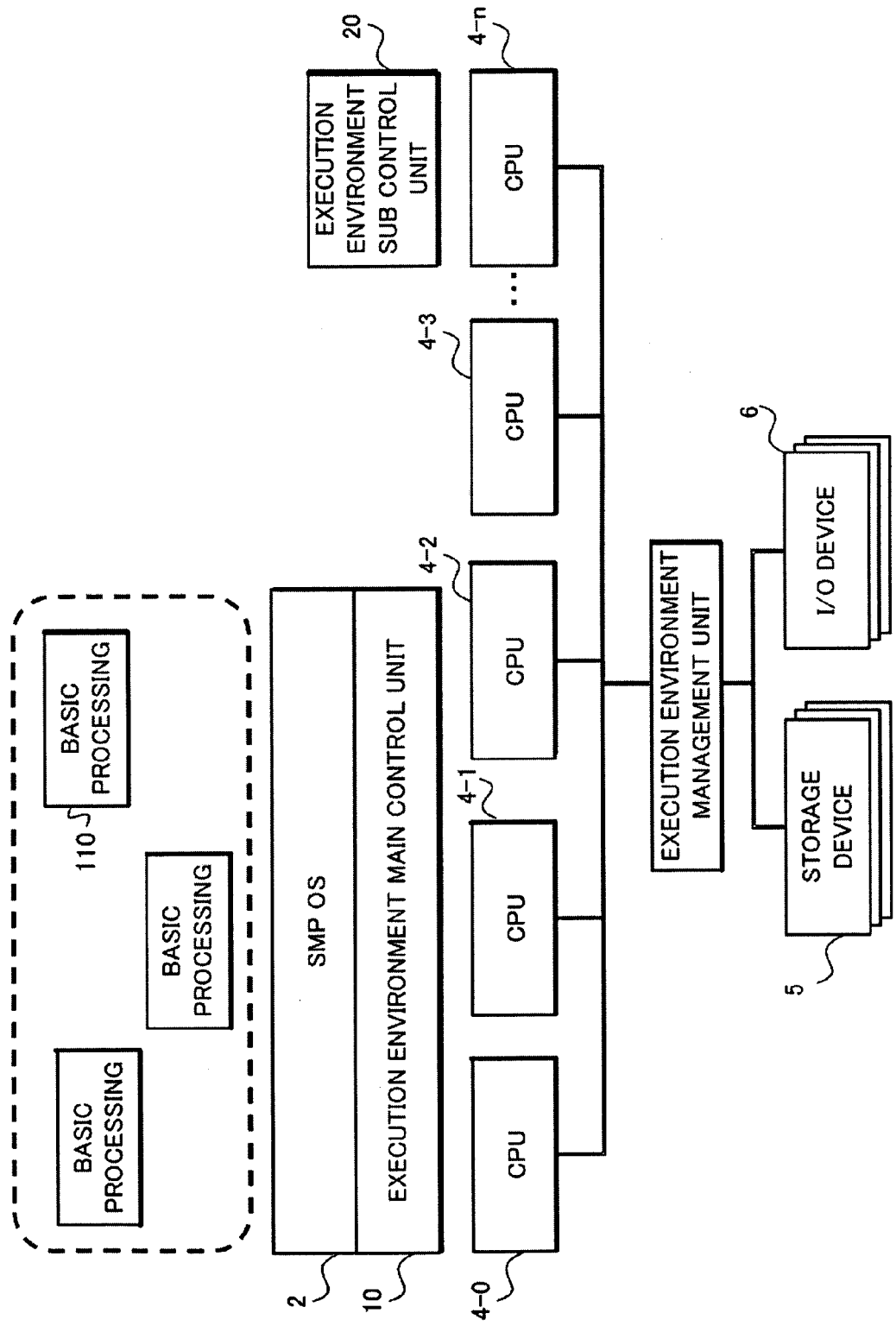
FIG. 45 is a diagram for use in explaining a state transition of the multiple processor system according to the first mode of implementation.

FIG. 41 illustrates a state where under one execution environment formed by a plurality of CPUs, the SMP OS causes execution of the basic processing 110 and under each execution environment formed by each of the remaining CPUs, the execution environment sub control unit is set which is a state as of before the execution environment sub control unit stopping processing and FIG. 45 illustrates a state where under one execution environment formed by a plurality of CPUs, the SMP OS causes execution of the basic processing 110 and under one execution environment formed of one CPU out of the remaining CPUs, the set execution environment sub control unit stops which is a state as of after the execution environment sub control unit stopping processing. In other words, the state shown in FIG. 41 makes a transition by the execution environment sub control unit stopping processing to the state shown in FIG. 45 where the execution environment sub control unit 20 on another CPU is stopped.

Figure 46:
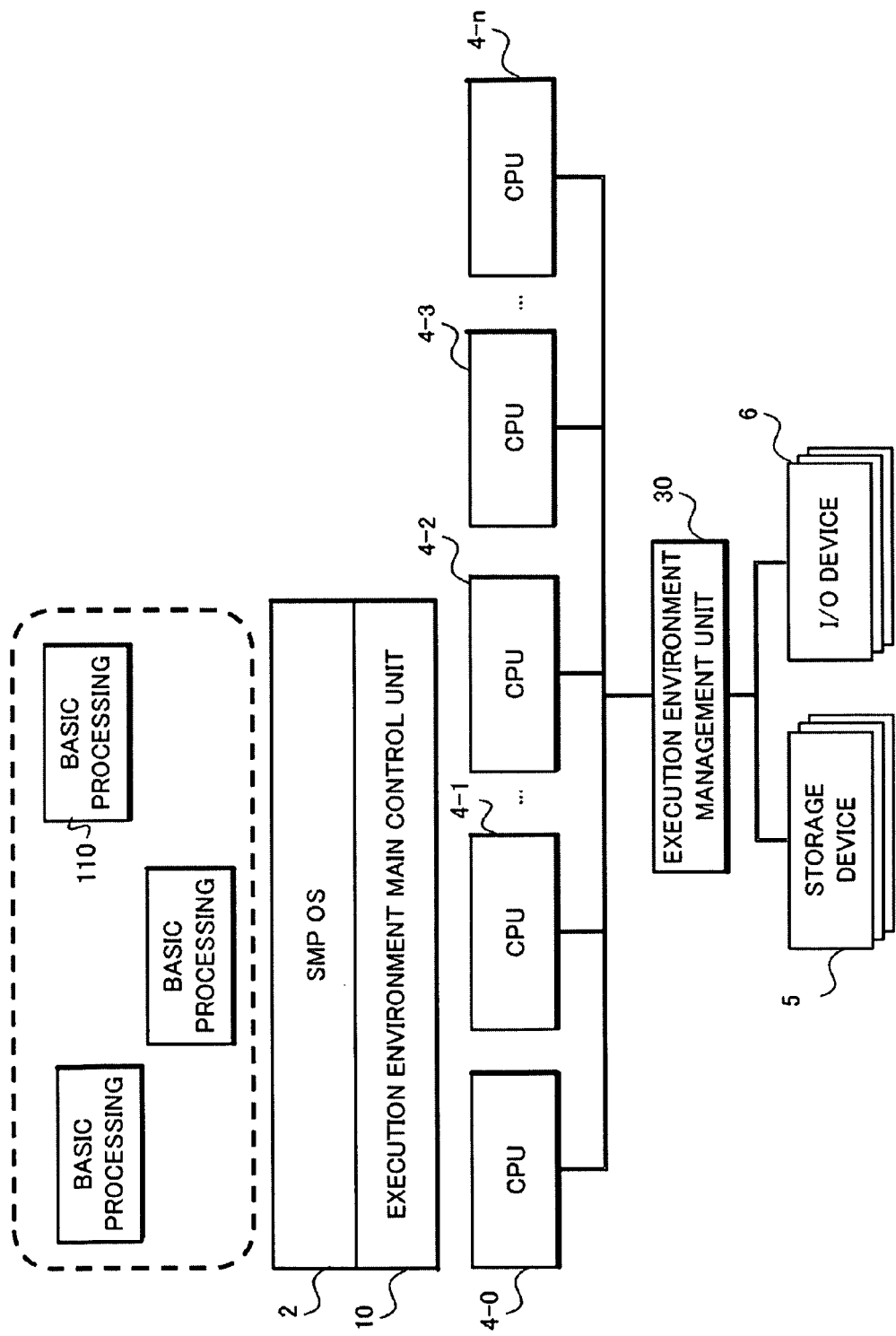
FIG. 46 is a diagram for use in explaining a state transition of the multiple processor system according to the first mode of implementation.

Moreover, in the same manner, by the execution environment sub control unit stopping processing, the state shown in FIG. 45 makes a transition to the state shown in FIG. 46 where the SMP OS 2 causes execution of the basic processing 110 under one execution environment formed by a plurality of CPUs and the execution environment sub control unit 20 stops under all the execution environments each formed of each of the remaining CPUs.

((Execution Environment Sub Control Unit Starting Processing (without Automatic Switching Function) on Another CPU)

Figure 59:
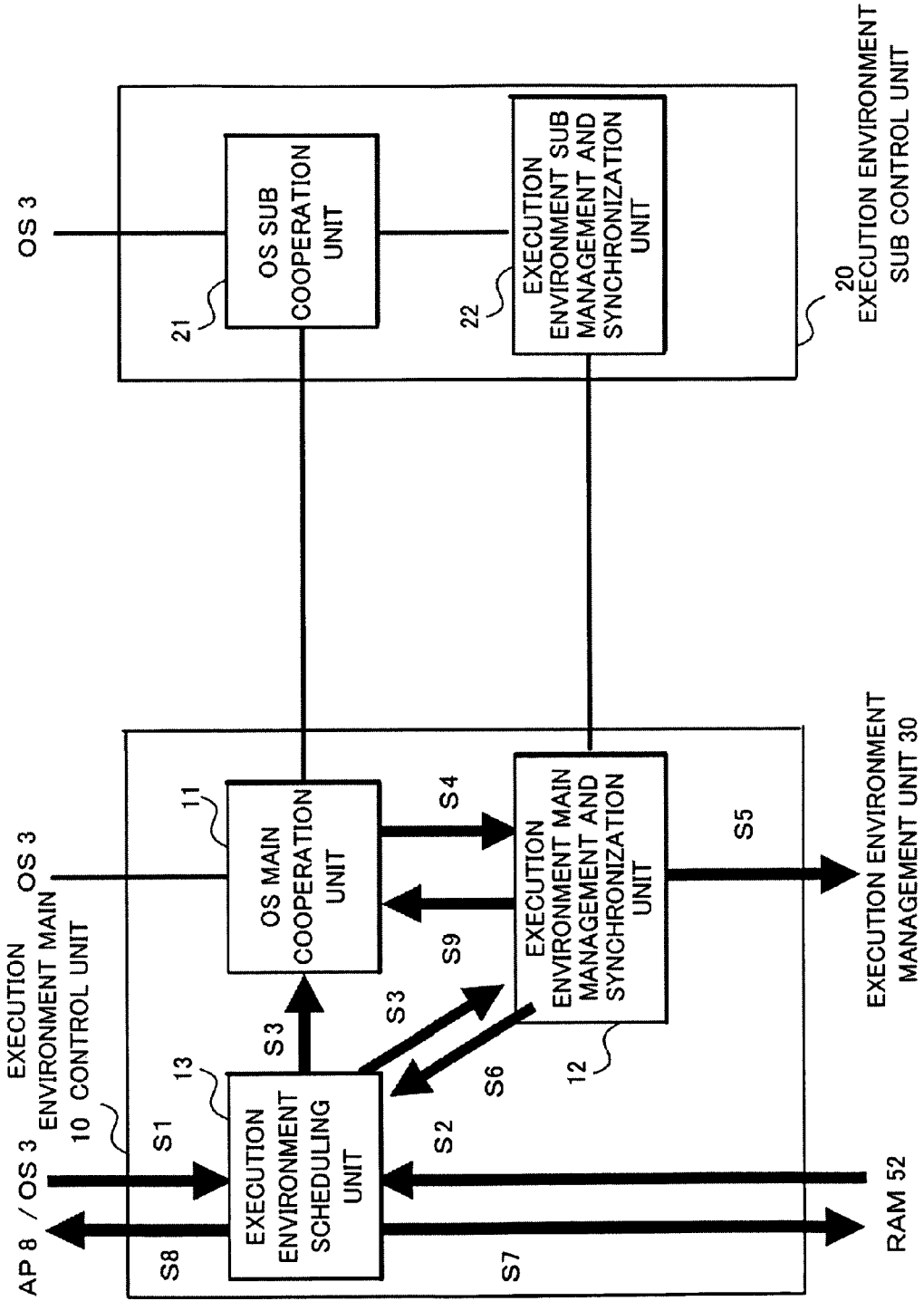
FIG. 59 is a diagram for use in explaining processing of starting the execution environment sub control unit (without the automatic switching function) on another CPU which is executed by the execution environment main control unit according to the first mode of implementation.

FIG. 59 is a diagram for use in explaining execution environment sub control unit starting processing (without the automatic switching function) on another CPU which is executed by the execution environment main control unit 10 according to the present mode of implementation.

With reference to FIG. 59, in the execution environment sub control unit starting processing (without the automatic switching function) on another CPU which is executed by the execution environment main control unit 10 according to the present mode of implementation, the execution environment scheduling unit 13 receives a request in question from the AP 8/OS 3 at Step S1, reads the execution environment information 521 on the RAM 52 at Step S2, and at Step S3, notifies the OS main cooperation unit 11 of a request for starting the execution environment sub control unit in the execution environment on another CPU and notifies the execution environment main management and synchronization unit 12 of setting information of the execution environment management unit 30 as of after the execution environment sub control unit start.

Next, at Step S4, the OS main cooperation unit 11 requests the execution environment main management and synchronization unit 12 for setting of the execution environment management unit 30 as of after the execution environment sub control unit starts.

Next, at Step S5, the execution environment main management and synchronization unit 12 sets, at the execution environment management unit 30, setting information of the execution environment management unit 30 as of after the execution environment sub control unit start and notifies the execution environment scheduling unit 13 of the completion of the processing at Step S6.

Next, the execution environment scheduling unit 13 updates the execution environment information 521 at Step S7 and notifies the AP 8/OS 3 of the completion of the request at Step S8.

Next, at Step S9, the execution environment main management and synchronization unit 12 notifies the OS main cooperation unit 11 of the completion of the setting of the execution environment management unit 30, so that the OS main cooperation unit 11 releases the stopped state of the CPU in question.

Description will be made of a state transition of the multiple processor system caused by the execution environment sub control unit starting processing (without the automatic switching function) on another CPU.

FIG. 45 illustrates a state where under one execution environment formed by a plurality of CPUs, the SMP OS causes execution of the basic processing 110 and under each execution environment formed by each of the remaining CPUs than the one CPU, the execution environment sub control unit is set which is a state as of before the execution environment sub control unit starting processing and FIG. 41 illustrates a state where under one execution environment formed by a plurality of CPUs, the SMP OS causes execution of the basic processing 110 and under each execution environment formed of each of the remaining CPUs, the execution environment sub control unit is set which is a state as of after the execution environment sub control unit starting processing. In other words, the state shown in FIG. 45 makes a transition by the execution environment sub control unit starting processing to the state shown in FIG. 41 where the execution environment sub control unit 20 on another CPU is started.

(Effects of the First Mode of Implementation)

According to the present mode of implementation, the execution environment 100 whose stability or security level is changed with each processing executed on the multiple processor system can be set up.

In a case, for example, where fundamental processing (basic processing 110) of the application 8 and incidental processing (additional processing 120) which is to be executed along with the basic processing 110 and is arbitrarily added or deleted are executed, a multiple processor system can be set up while taking stability or a security level of the execution environment 100-0 for executing the basic processing 110 and the execution environment 100-$n$ for executing the additional processing 120 (with the stability and a security level of the execution environment 100-0 for the basic processing 110 increased) into consideration.

The reason is that at least one execution environment 100 which is mounted with a plurality of CPUs 4 and a plurality of OSs 3 to be executed on the CPUs 4 and which is a combination of the CPUs 4 and the OSs 3 is formed according to processing to be executed on the multiple processor system.

In addition, the present mode of implementation enables speed-up of the processing.

The reason is that because the execution environment main control unit 10, the execution environment sub control unit 20 and the execution environment management unit 30 operate in cooperation with each other, the need of a virtual machine is eliminated to enable the application 8 to operate directly on the CPU 4.

Also according to the present mode of implementation, CPU processing loads can be mitigated.

The reason is that an execution environment combining the CPUs 4 and the OSs 3 can be formed in variation according to processing to be executed on the multiple processor system.

Furthermore, since the present mode of implementation enables generation of an execution environment for additional processing even under an SMP OS environment, stability or a security level of the basic processing is improved to cause the execution environment 100 for the additional processing 120 to directly operate on the CPU 4, so that the basic processing 110 and the additional processing 120 can be processed at an extremely high speed.

(Second Mode of Implementation)
(Structure of Second Mode of Implementation)

Structure of the execution environment management unit 30 according to a second mode of implementation of the present invention will be described in detail on (a) a CPU basis and (b) an execution environment basis. The execution environment management unit 30 according to the present mode of implementation differs from the first mode of implementation in having an automatic switching function of automatically switching the CPU 4 or the execution environment 100. Accordingly, description will be made mainly with respect to the difference from the first mode of implementation.

((A) CPU Base)

FIG. 60 through FIG. 64 are diagrams for use in explaining the structure of the execution environment management unit 30 according to the present mode of implementation on a CPU basis.

Figure 60:
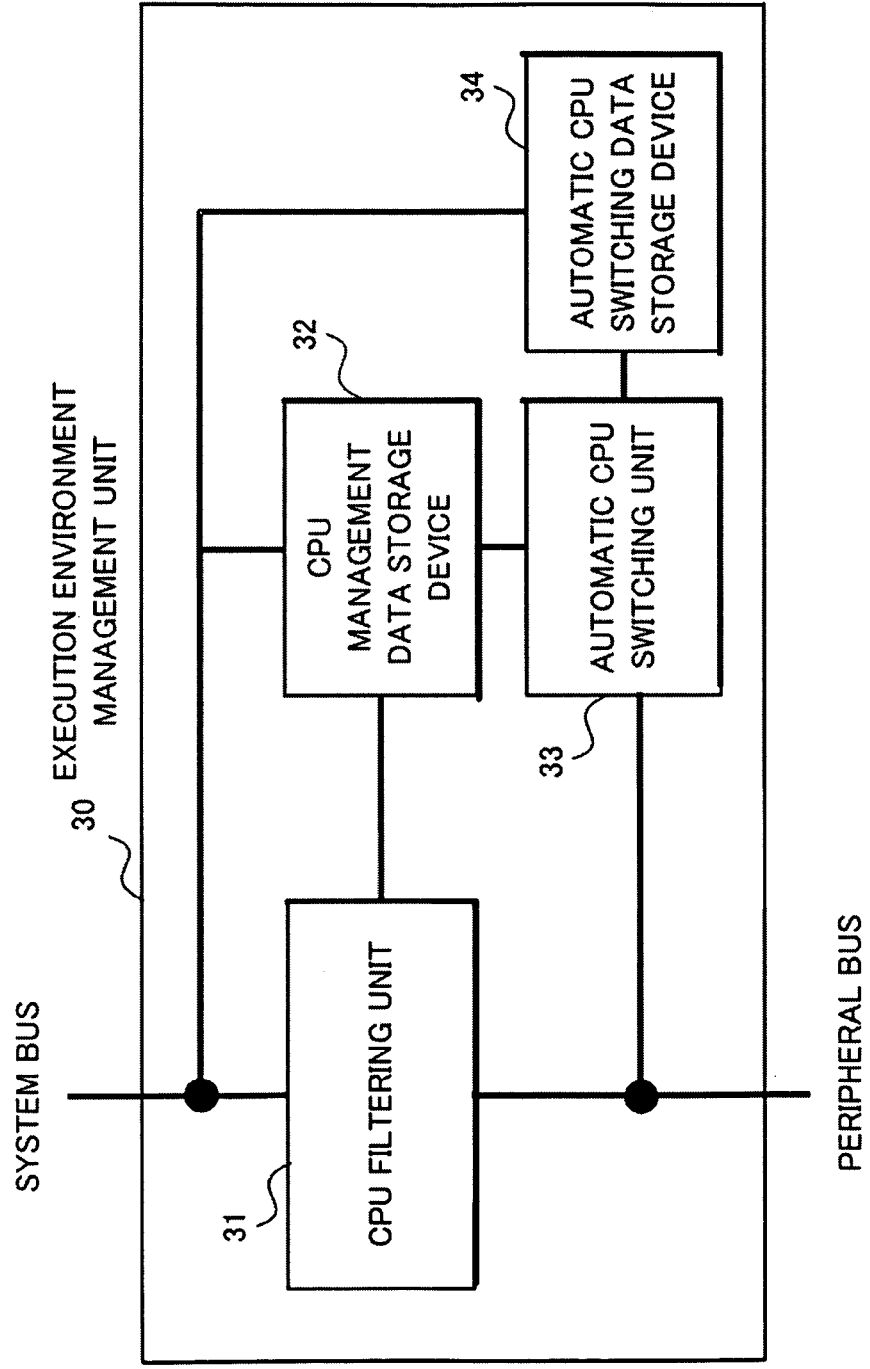
FIG. 60 is a block diagram for use in explaining a structure of an execution environment management unit according to a second mode of implementation of the present invention on a CPU basis.

FIG. 60 is a block diagram for use in explaining the structure of the execution environment management unit 30 according to the present mode of implementation on a CPU basis. With reference to FIG. 60, the execution environment management unit 30 according to the present mode of implementation differs from the structure of the execution environment management unit 30 according to the first mode of implementation in further comprising an automatic CPU switching unit 33 connected to a peripheral bus and the CPU management data storage device 32, and an automatic CPU switching data storage device 34 connected to a system bus, the CPU management data storage device 32 and the automatic CPU switching unit 33. Description will be accordingly made mainly of the difference from the first mode of implementation.

The automatic CPU switching unit 33 has a function of, when the CPU filtering unit 31 receives an access request from a certain CPU 4 through the system bus, determining whether the access request is a switching trigger as a condition for requesting switching control or not based on automatic CPU switching data 341 (which will be described later) read from the automatic CPU switching data storage device 34, a function of updating an entry corresponding to a trigger condition of the automatic CPU switching data 341 and the like.

The automatic CPU switching data storage device 34 has a function of storing the automatic CPU switching data 341 to execute an update request of the automatic CPU switching data 341.

FIG. 61 is a diagram for use in explaining a structure of the automatic CPU switching data according to the present mode of implementation. With reference to FIG. 61, the automatic CPU switching data 341 is formed, for each of the CPUs 4-0~4-4, entries of a trigger condition, a start point and an end point of a memory region to be assigned after switching, and an allowance bit indicative of processing to be allowed after the switching, either read processing (R) or write processing (R).

Next, description will be made of a function of the execution environment management unit 30 according to the present mode of implementation on a CPU basis.

(Data Updating Function)

Figure 62:
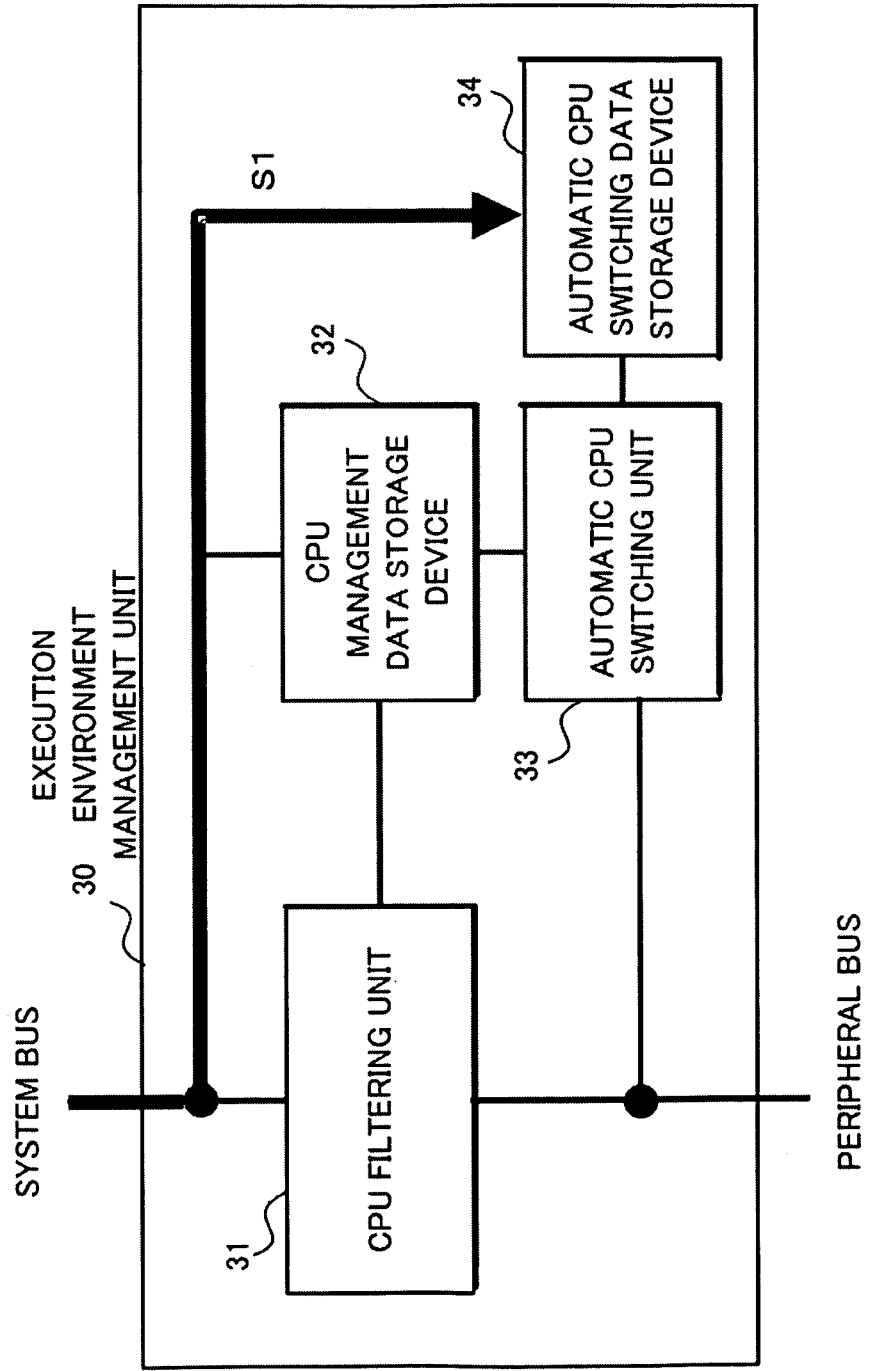
FIG. 62 is a diagram for use in explaining a data updating function of the execution environment management unit according to the second mode of implementation.

FIG. 62 is a diagram for use in explaining a data updating function of the execution environment management unit 30 according to the present mode of implementation. With reference to FIG. 62, the data updating function of the execution environment management unit 30 updates the CPU management data 321 at Step S1. Basically, only a CPU executing the basic processing is allowed to access the CPU management data 321. As to a predetermined entry, a CPU executing the additional processing is allowed to access the CPU management data 321.

(Automatic Switching Function in Read (R) Access)

Figure 63:
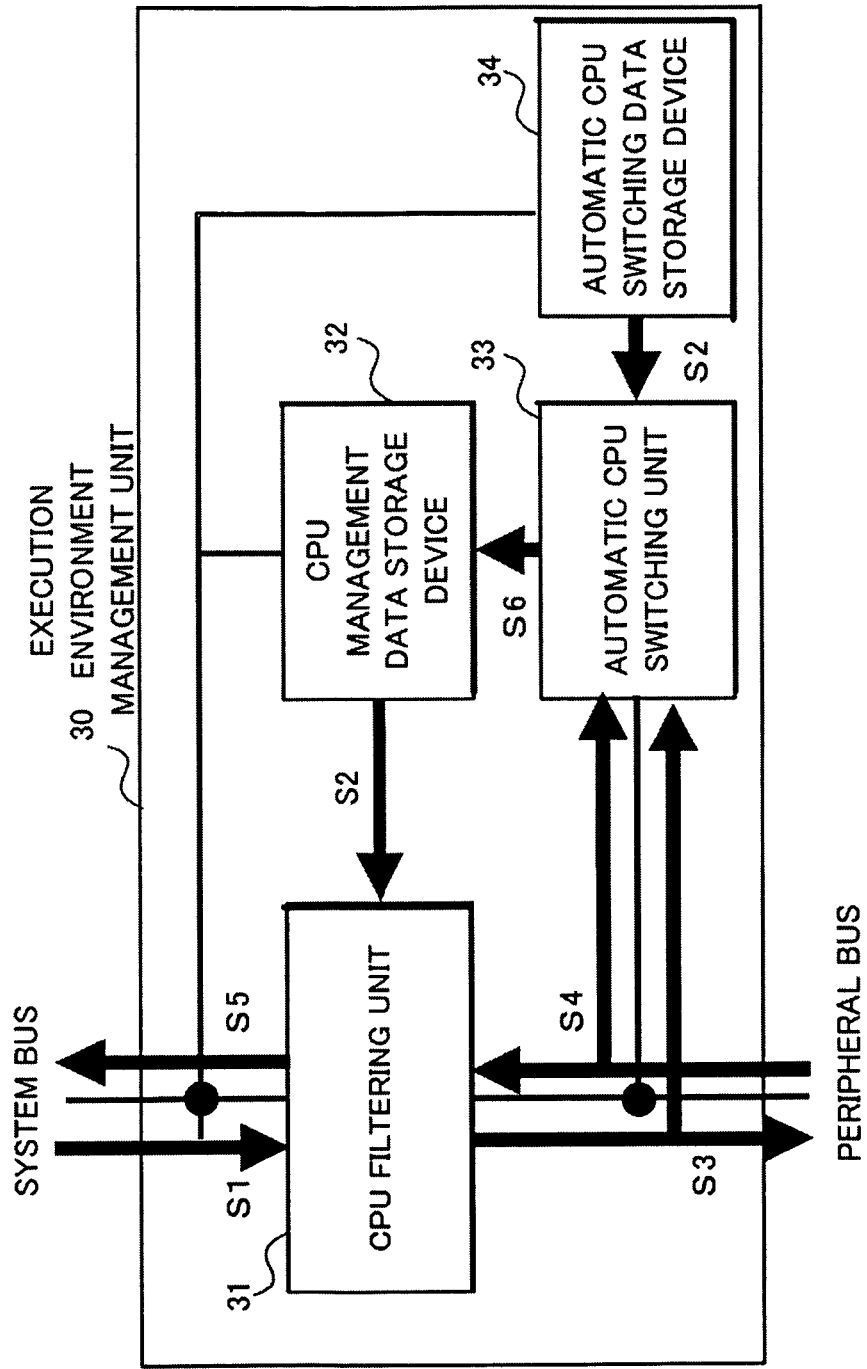
FIG. 63 is a diagram for use in explaining an automatic switching function of the execution environment management unit in read (R) access according to the second mode of implementation.

FIG. 63 is a diagram for use in explaining an automatic switching function of the execution environment management unit 30 in a read (R) access according to the present mode of implementation.

With reference to FIG. 63, in the automatic switching function of the execution environment management unit 30 in a read (R) access according to the present mode of implementation, the CPU filtering unit 31 accepts a read access from an arbitrary CPU at Step S1 and reads the CPU management data 312 at Step S2. Also at Step S2, the automatic CPU switching unit 33 reads the automatic CPU switching data 341.

Subsequently at Step S3, the CPU filtering unit 31 determines whether to allow the accepted read access or not and allows the accepted read access based on the read CPU management data 321, and the automatic CPU switching unit 33 recognizes that the accepted read access is a switching trigger.

Subsequently at Step S4, the CPU filtering unit 31 accepts a response to the read access and the automatic CPU switching unit 33 recognizes the completion of the read access.

Next, at Step S5, the CPU filtering unit 31 returns the response to the read access to the CPU and at Step S6, the automatic CPU switching unit 33 updates an entry of the CPU management data 321 corresponding to a trigger condition.

(Automatic Switching Function in Write (W) Access)

Figure 64:
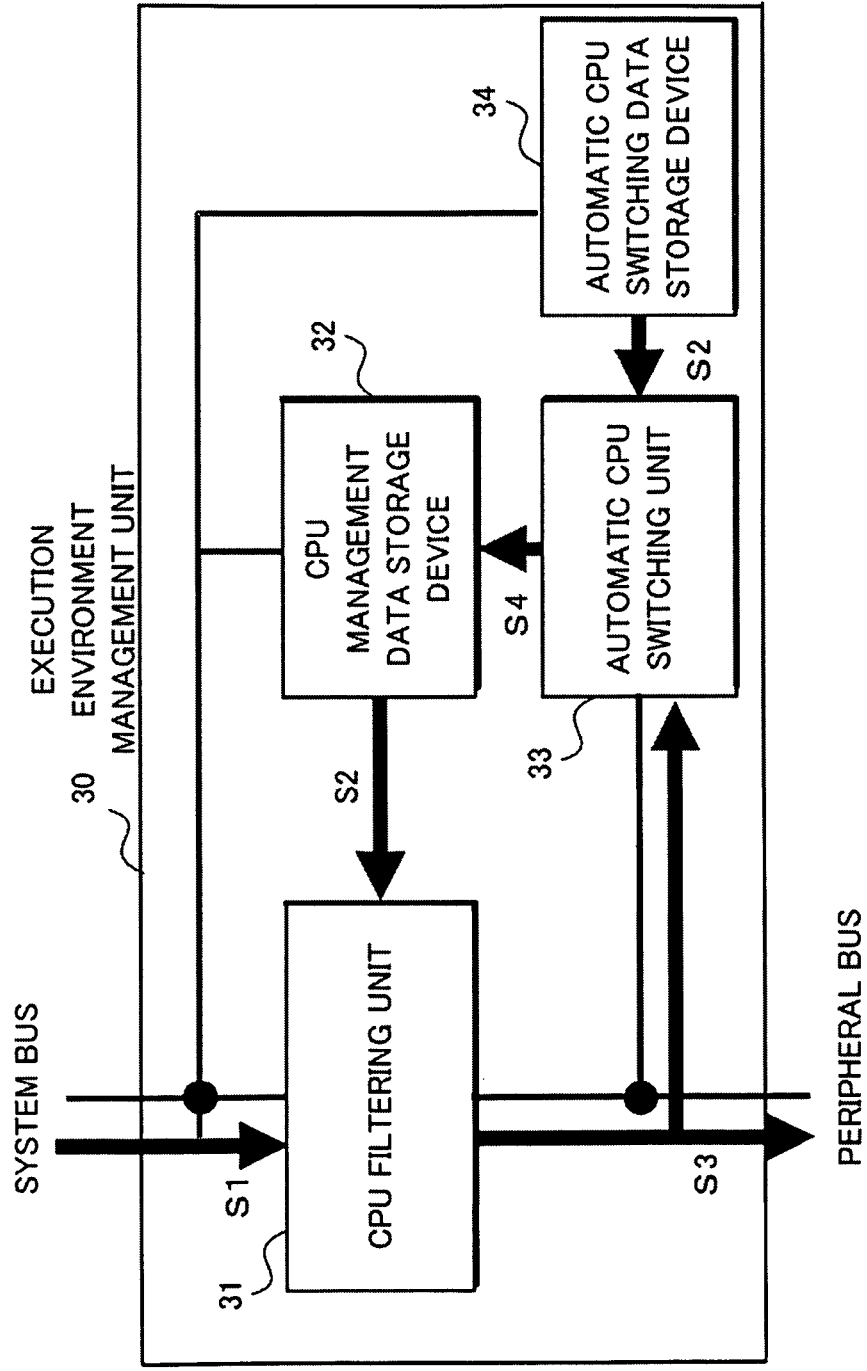
FIG. 64 is a diagram for use in explaining an automatic switching function of the execution environment management unit in write (W) access according to the second mode of implementation.

FIG. 64 is a diagram for use in explaining an automatic switching function of the execution environment management unit 30 in a write (W) access according to the present mode of implementation.

With reference to FIG. 64, in the automatic switching function of the execution environment management unit 30 in a write (W) access according to the present mode of implementation, the CPU filtering unit 31 accepts a write access from an arbitrary CPU at Step S1 and reads the CPU management data 321 at Step S2. Also at Step S2, the automatic CPU switching unit 33 reads the automatic CPU switching data 341.

Subsequently at Step S3, the CPU filtering unit 31 determines whether to allow the accepted write access and allows the accepted write access based on the read CPU management data storage device 32, and the automatic CPU switching unit 33 recognizes that the accepted write access is a switching trigger.

Subsequently at Step S4, the automatic CPU switching unit 33 updates an entry of the CPU management data 321 corresponding to a trigger condition.

Structure of the CPU management data storage device 32 as of after switching according to the present mode of implementation is shown in FIG. 65.

((B) Execution Environment Base)

FIG. 66 through FIG. 71 are diagrams for use in explaining the structure of the execution environment management unit 30 according to the present mode of implementation on an execution environment basis.

Figure 66:
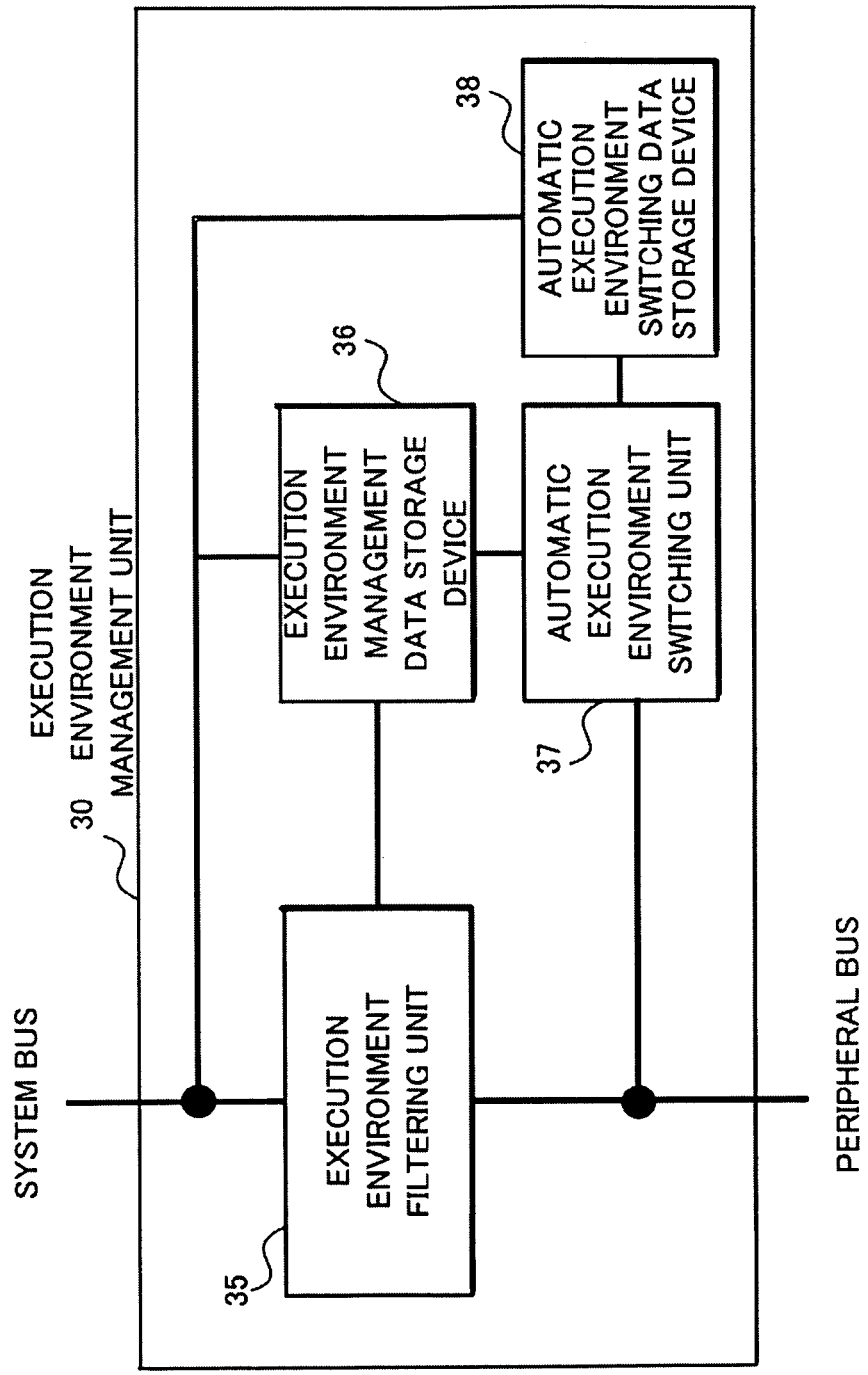
FIG. 66 is a block diagram for use in explaining a structure of the execution environment management unit according to the second mode of implementation on an execution environment basis.

FIG. 66 is a block diagram for use in explaining the structure of the execution environment management unit 30 according to the present mode of implementation on an execution environment basis. With reference to FIG. 66, the execution environment management unit 30 according to the present mode of implementation differs from the structure of the execution environment management unit 30 according to the first mode of implementation in further comprising an automatic execution environment switching unit 37 connected to a peripheral bus and the execution environment management data storage device 36, and an automatic execution environment switching data storage device 38 connected to a system bus, the execution environment management data storage device 36 and the automatic execution environment switching unit 37. Description will be accordingly made mainly of the difference from the first mode of implementation.

The automatic execution environment switching unit 37 has a function of, when the execution environment filtering unit 35 receives an access request from a certain CPU 4 through the system bus, determining whether the access request is a switching trigger as a condition for requesting switching control or not based on automatic execution environment switching data 381 (which will be described later) read from the automatic execution environment switching data storage device 38, a function of updating an entry of the automatic execution environment switching data 381 corresponding to a trigger condition, and the like.

The automatic execution environment switching data storage device 38 has a function of storing the automatic execution environment switching data 381 to execute a request for updating the automatic execution environment switching data 381.

FIG. 67 is a diagram for use in explaining a structure of the automatic execution environment switching data 381 according to the present mode of implementation. With reference to FIG. 67, the automatic execution environment switching data 381 according to the present mode of implementation is formed, for each of the CPUs 4-0~4-4, entries of a trigger condition and an execution environment indicated by an execution environment number which are correlated with each other. In more detail, to the CPUs 4-0~4-2, the execution environment 100-0 is correlated, to the CPU 4-3, no execution environment is correlated and to the CPU 4-4, the execution environment 100-2 is correlated.

Next, description will be made of a function of the execution environment management unit 30 according to the present mode of implementation on an execution environment basis.

(Data Updating Function)

Figure 68:
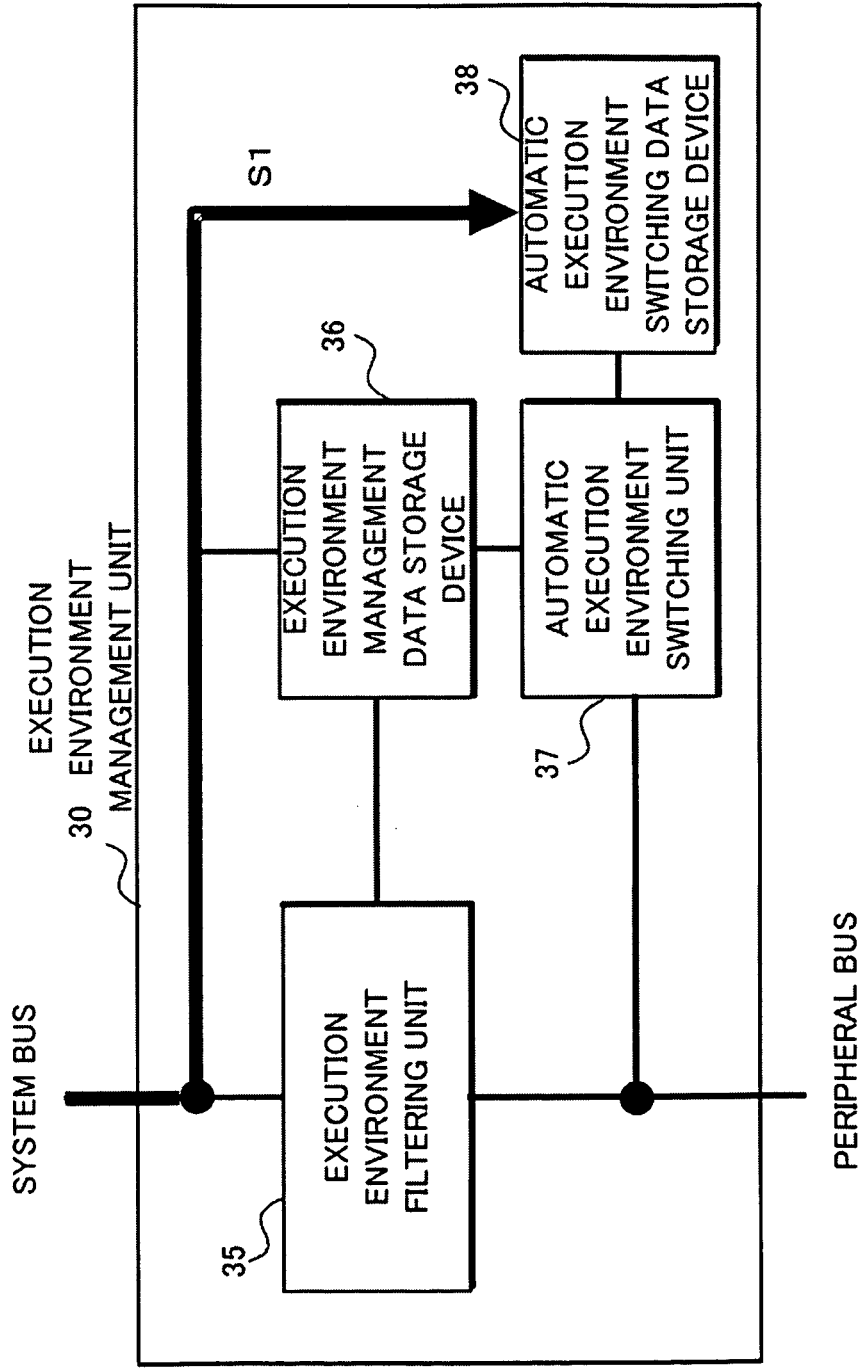
FIG. 68 is a diagram for use in explaining a data updating function of the execution environment management unit according to the second mode of implementation.

FIG. 68 is a diagram for use in explaining a data updating function of the execution environment management unit 30 according to the present mode of implementation.

With reference to FIG. 68, the data updating function of the execution environment management unit 30 according to the present mode of implementation updates the automatic execution environment switching data 381 at Step S1. Basically, only a CPU executing the basic processing is allowed to access the automatic execution environment switching data 381. As to a predetermined entry, a CPU executing the additional processing is allowed to access the automatic execution environment switching data 381.

(Automatic Switching Function in Read (R) Access)

Figure 69:
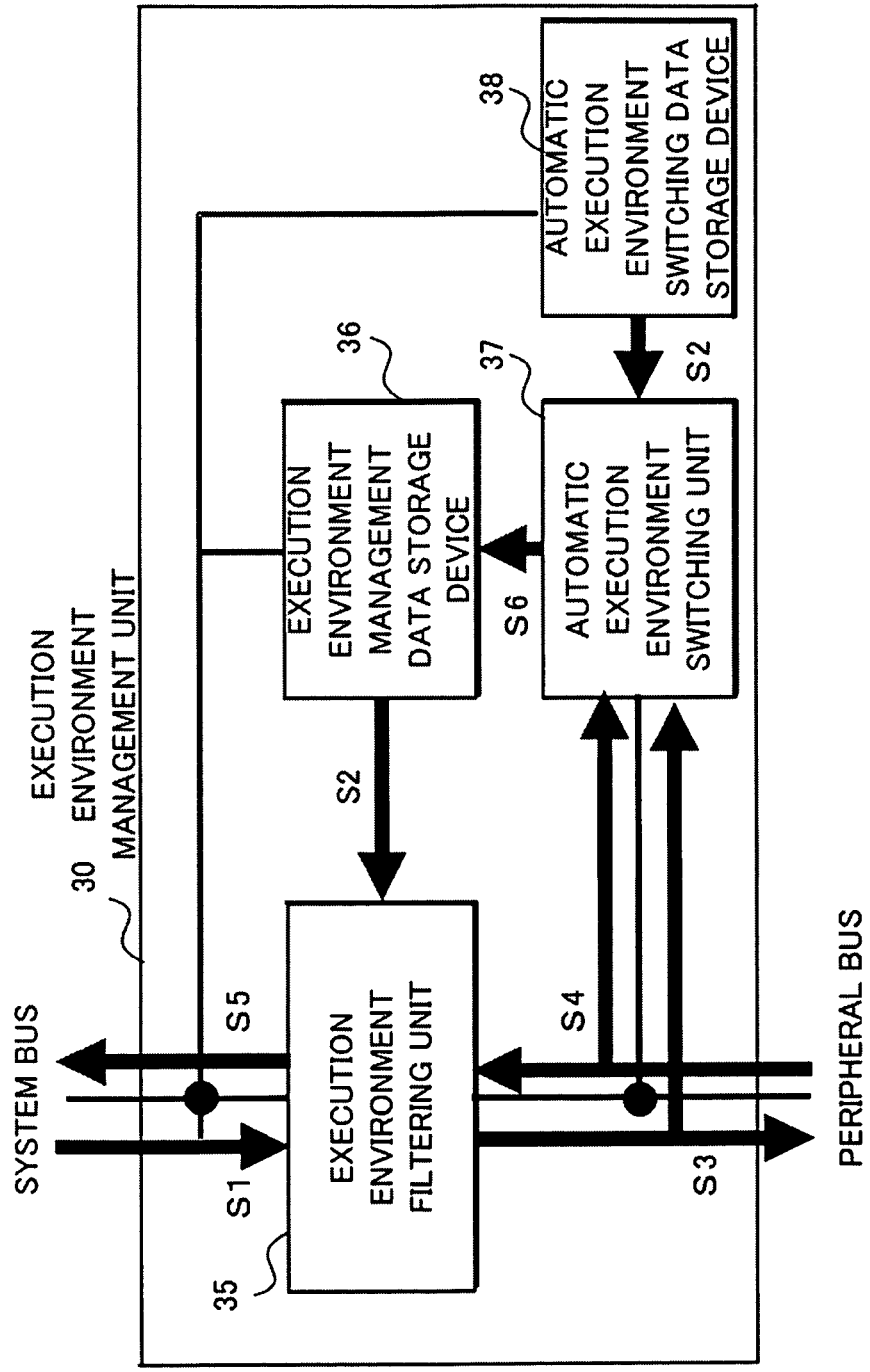
FIG. 69 is a diagram for use in explaining the automatic switching function of the execution environment management unit in read (R) access according to the second mode of implementation.

FIG. 69 is a diagram for use in explaining an automatic switching function of the execution environment management unit 30 in a read (R) access according to the present mode of implementation.

With reference to FIG. 69, in the automatic switching function of the execution environment management unit 30 in a read access according to the present mode of implementation, the execution environment filtering unit 35 accepts a read access from an arbitrary CPU at Step S1 and reads the execution environment management data 361 at Step S2. Also at Step S2, the automatic execution environment switching unit 37 reads the automatic execution environment switching data 381.

Subsequently at Step S3, the execution environment filtering unit 35 determines whether to allow the accepted read access or not and allows the accepted read access based on the read execution environment management data 361, and the automatic execution environment switching unit 37 recognizes that the accepted read access is a switching trigger.

Subsequently at Step S4, the execution environment filtering unit 35 accepts a response to the read access and the automatic execution environment switching unit 37 recognizes completion of the read access.

Next, at Step S5, the execution environment filtering unit 35 returns the response to the read access to the CPU and at Step S6, the automatic execution environment switching unit 37 updates an entry of the execution environment management data 361 corresponding to a trigger condition.

(Automatic Switching Function in Write (W) Access)

Figure 70:
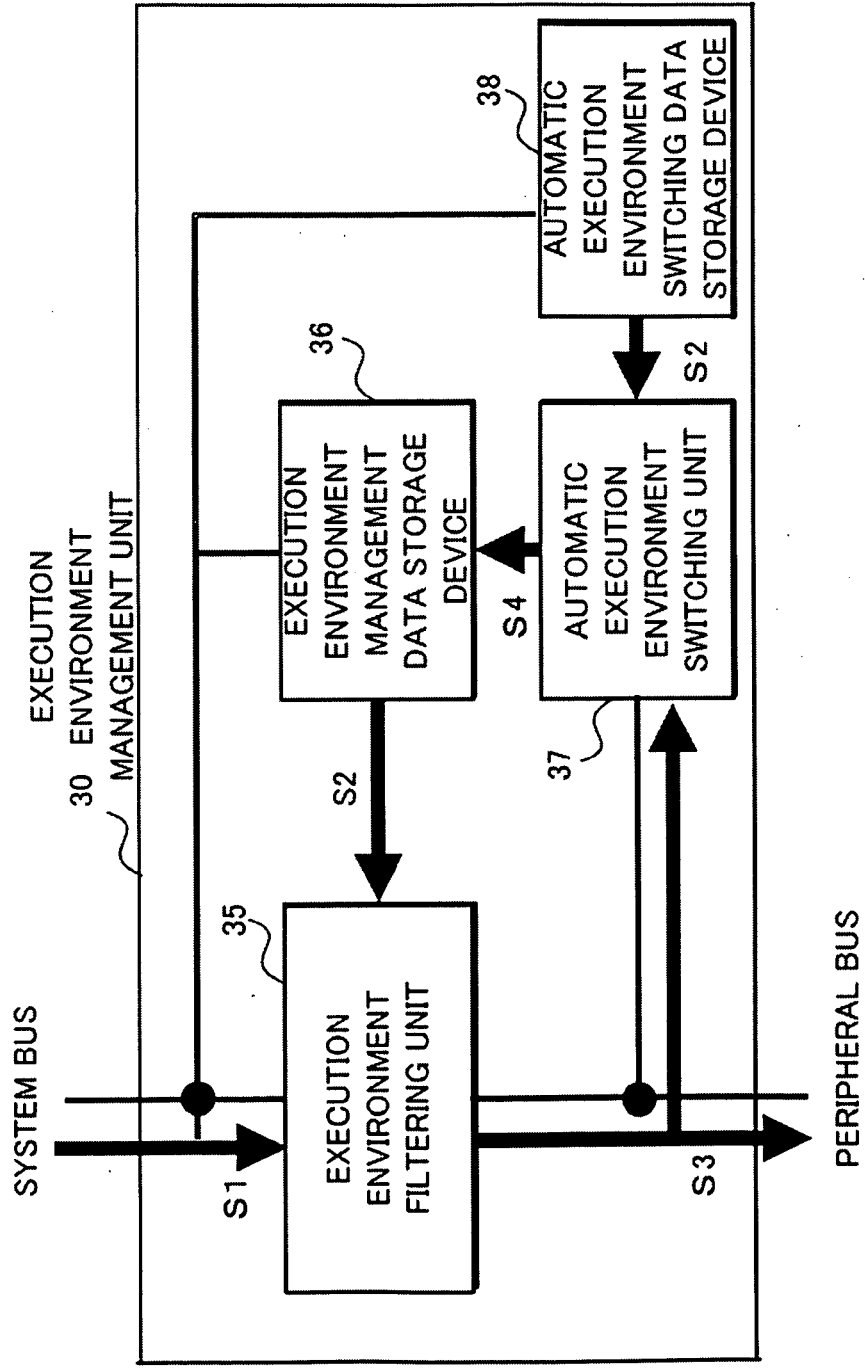
FIG. 70 is a diagram for use in explaining the automatic switching function of the execution environment management unit in write (W) access according to the second mode of implementation.

FIG. 70 is a diagram for use in explaining an automatic switching function of the execution environment management unit 30 in a write (W) access according to the present mode of implementation.

With reference to FIG. 70, in the automatic switching function of the execution environment management unit 30 in a write access according to the present mode of implementation, the execution environment filtering unit 35 accepts a write access from an arbitrary CPU at Step S1 and reads the execution environment management data 361 at Step S2. Also at Step S2, the automatic execution environment switching unit 37 reads the automatic execution environment switching data 381.

Subsequently at Step S3, the execution environment filtering unit 35 determines whether to allow the accepted write access and allows the accepted write access based on the read execution environment management data 361, and the automatic execution environment switching unit 37 recognizes that the accepted write access is a switching trigger.

Subsequently at Step S4, the automatic execution environment switching unit 37 updates an entry of the execution environment management data 361 corresponding to a trigger condition.

Figure 71:
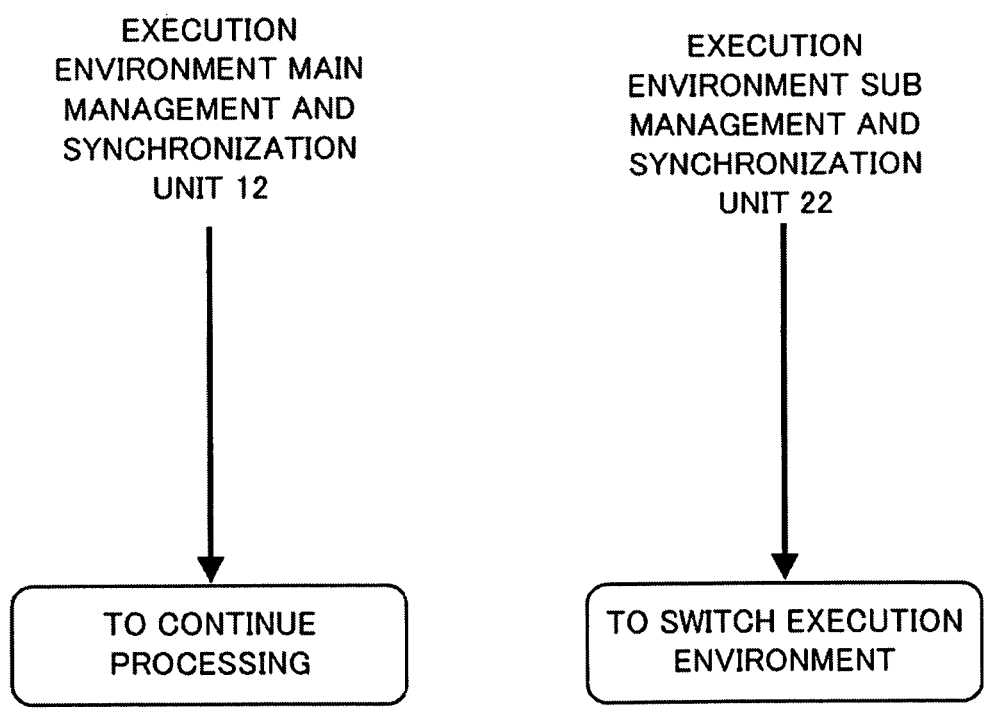
FIG. 71 is a diagram for use in explaining an execution environment switching function (with an automatic switching function) according to the second mode of implementation.

FIG. 71 is a diagram for use in explaining an execution environment switching function (with the automatic switching function) according to the present mode of implementation.

With reference to FIG. 71, in the present mode of implementation where the execution environment management unit 30 has an automatic switching function, without taking synchronization between the execution environment main control unit 10 and the execution environment sub control unit 20, the execution environment main control unit 10 causes processing to continue and the execution environment sub control unit 20 switches an execution environment.

(Operation of the Second Mode of Implementation)

Detailed description will be made of operation of the execution environment main control unit 10 in cooperation with the execution environment sub control unit 20 according to the present mode of implementation.

(Execution Environment Switching Processing (with Automatic Switching Function) on Another CPU)

Figure 72:
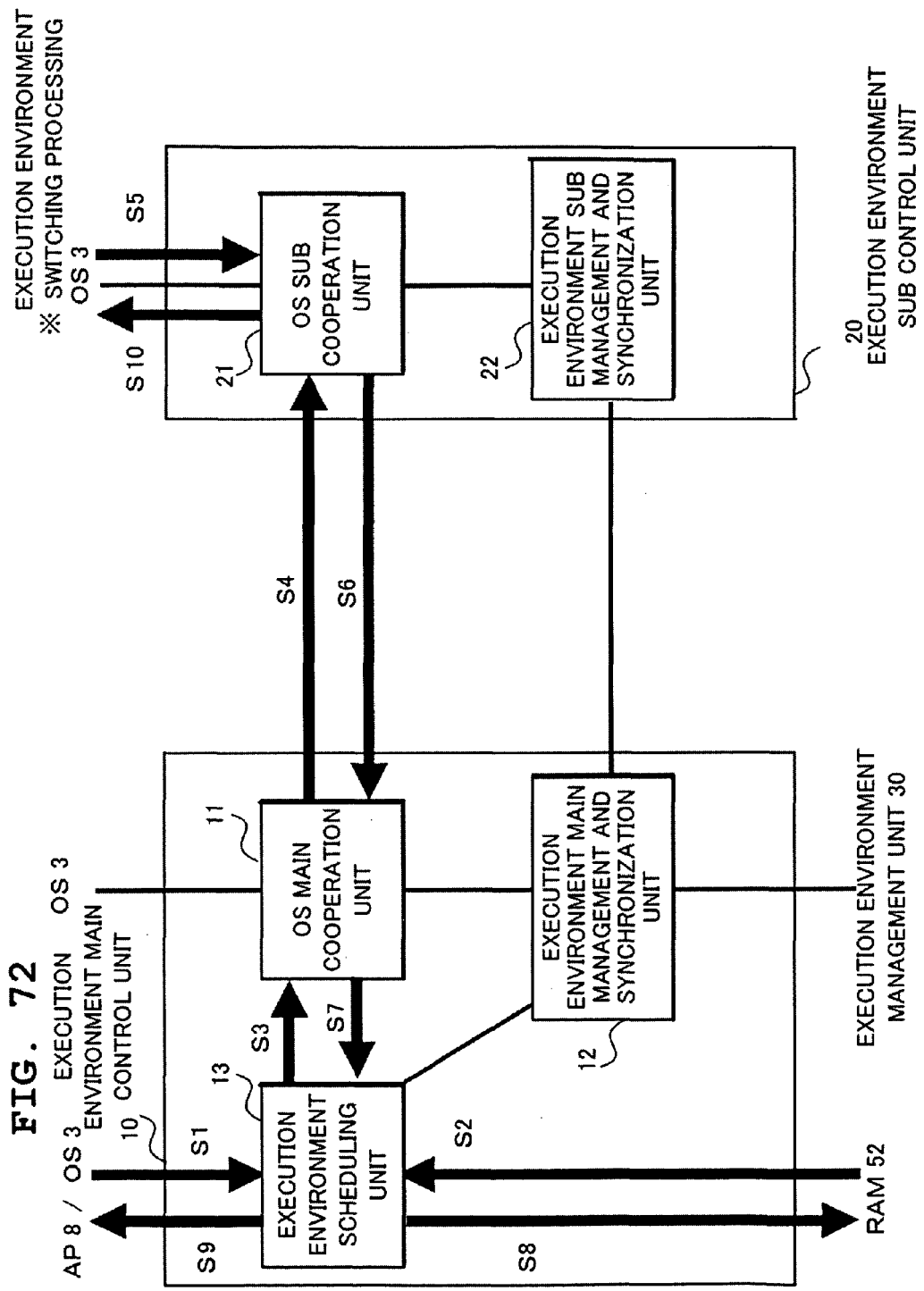
FIG. 72 is a diagram for use in explaining execution environment switching processing (with the automatic switching function) on another CPU which is executed by an execution environment main control unit and an execution environment sub control unit according to the second mode of implementation.

FIG. 72 is a diagram for use in explaining execution environment switching processing (with the automatic switching function) on another CPU which is executed by the execution environment main control unit 10 and the execution environment sub control unit 20 according to the present mode of implementation.

With reference to FIG. 72, in the execution environment switching processing (with the automatic switching function) on another CPU which is executed by the execution environment main control unit 10 and the execution environment sub control unit 20 according to the present mode of implementation, the execution environment scheduling unit 13 receives a request in question from the AP 8/OS 3 at Step S1, reads the execution environment information 521 on the RAM 52 at Step S2, and at Step S3, notifies the OS main cooperation unit 11 of a request for switching an execution environment and the context 90 of a switching destination in the execution environment on another CPU and notifies the execution environment main management and synchronization unit 12 of setting information of the execution environment management unit 30 as of after the CPU stop.

Next, the OS main cooperation unit 11 notifies the OS sub cooperation unit 21 on another CPU of the execution environment switching request and the context 90 of the switching destination at Step S4.

Next, the OS sub cooperation unit 21 having received the notification receives the context 90 of the OS 3 in operation from the OS 3 at Step S5 and sends the context 90 of the OS 3 to the OS main cooperation unit 11 at Step S6.

Next, the OS main cooperation unit 11 transfers the context 90 of the OS 3 to the execution environment scheduling unit 13 at Step S7.

Next, the execution environment scheduling unit 13 updates the execution environment information 521 at Step S8 and notifies the AP 8/OS 3 of the completion of the request at Step S9.

Next, the OS sub cooperation unit 21 sets the previously received context 90 of the switching destination at Step S10.

Figure 73:
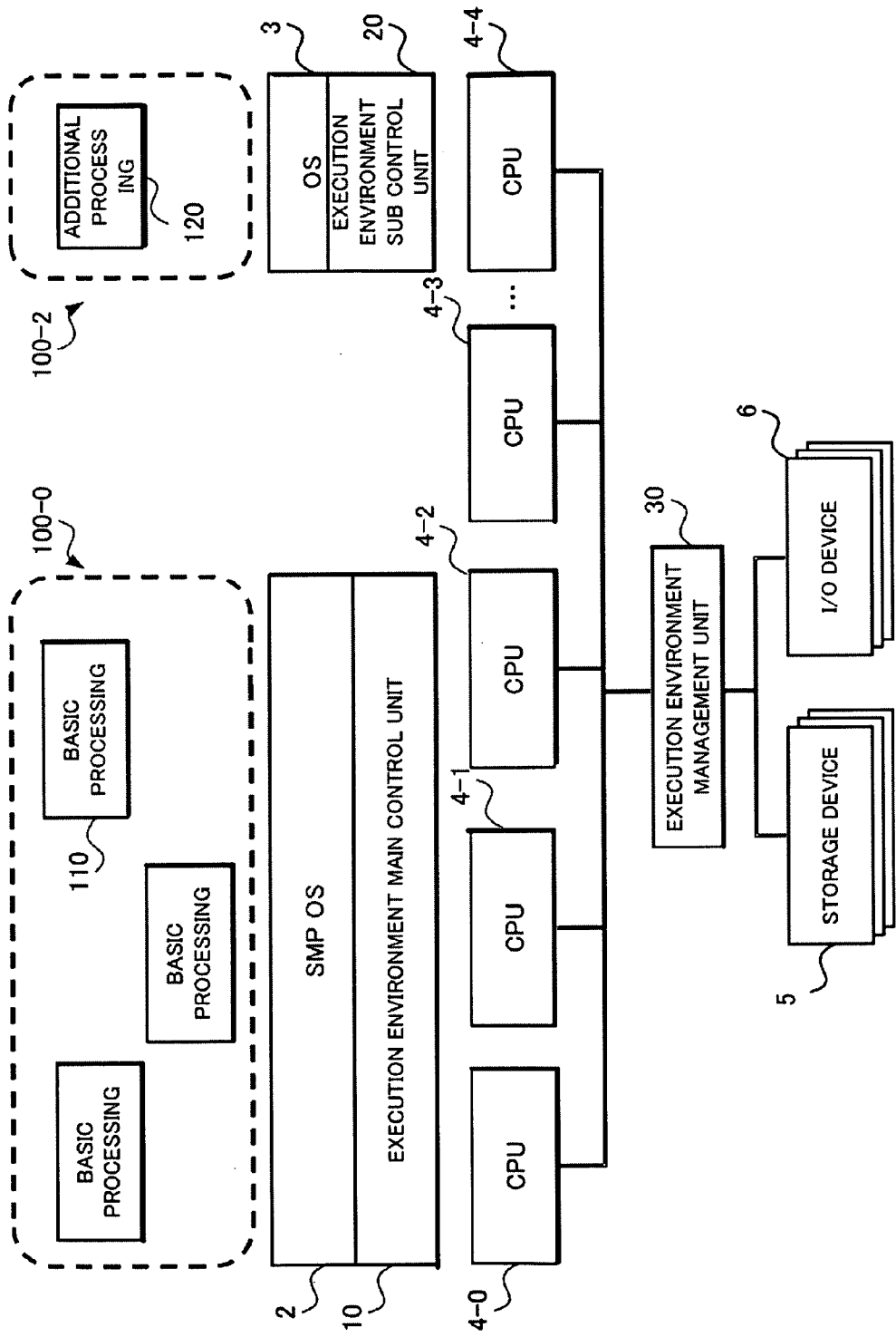
FIG. 73 is a block diagram showing a structure of a multiple processor system as of after switching according to the second mode of implementation.

Structure of the multiple processor system as of after switching according to the present mode of implementation is shown in FIG. 73.

Although switching trigger in the present mode of implementation is determined based on whether an access request from a certain CPU 4 which is received through the system bus satisfies a trigger condition or not, the determination may be made based on whether, not limited to an access request, a lapse of a predetermined time or a CPU load not less than a threshold value or the like satisfies a trigger condition or not, thereby automatically requesting corresponding predetermined switching control.

(Effects of the Second Mode of Implementation)

According to the present mode of implementation, since the execution environment management unit 30 comprises the automatic CPU switching unit 33 which, when the CPU filtering unit 31 receives an access request from a certain CPU 4 through the system bus, determines whether the access request is a switching trigger as a condition for requesting switching control based on the automatic CPU switching data 341 (which will be described later) read from the automatic CPU switching data storage device 34 and when the request is a switching trigger, automatically requests switching control, processing loads of the execution environment main control unit 10 can be mitigated.

Also according to the present mode of implementation, since when a lapse of a predetermined time, a CPU load not less than a predetermined threshold value or the like, not limited to an access request, satisfies a trigger condition, corresponding predetermined switching control is automatically requested, more diverse switching control is enabled.

(Third Mode of Implementation)

(Structure of the Third Mode of Implementation)

Figure 74:
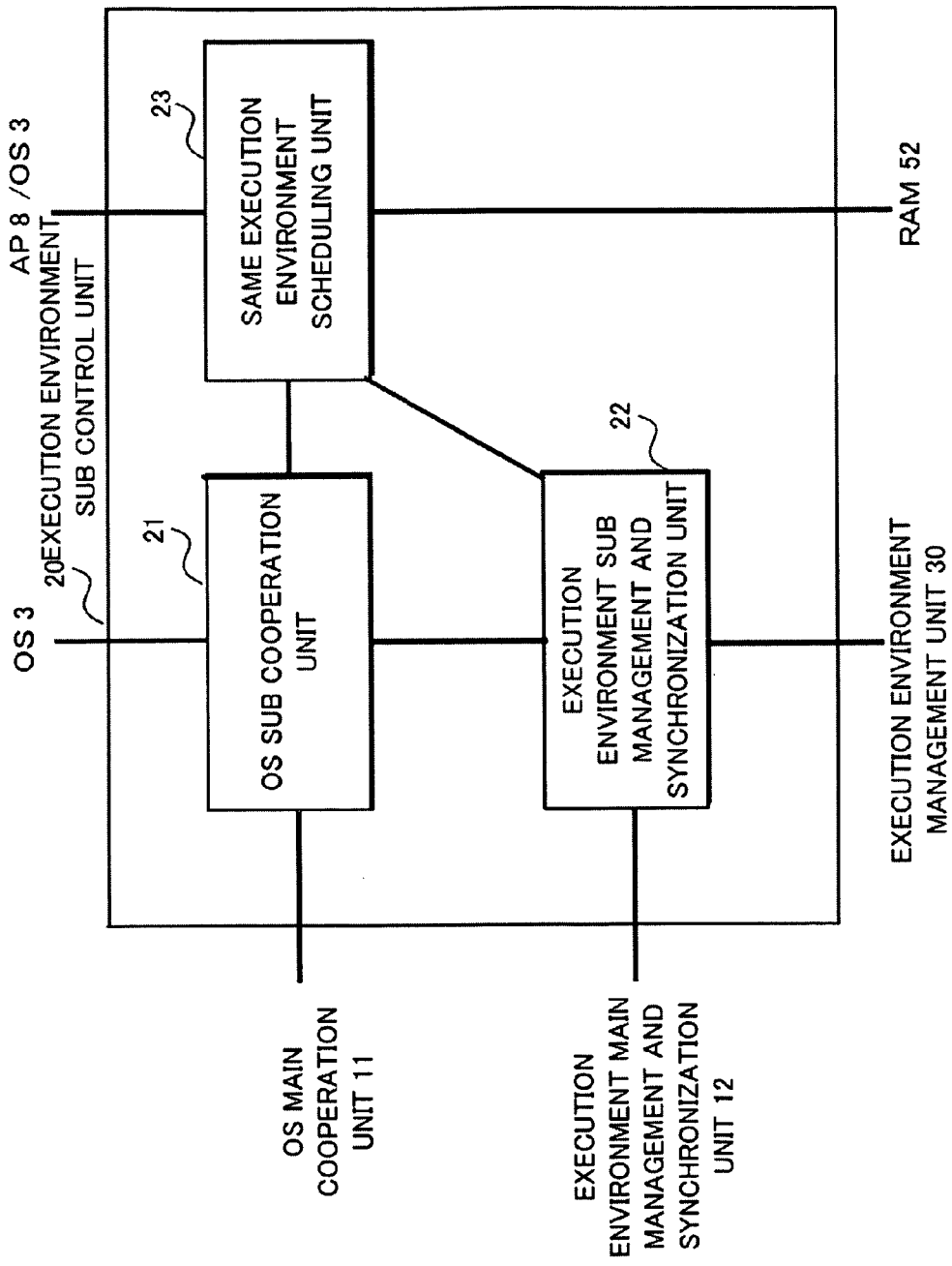
FIG. 74 is a block diagram showing a structure of an execution environment sub control unit according to a third mode of implementation of the present invention.

FIG. 74 is a block diagram showing a structure of the execution environment sub control unit 20 according to a third mode of implementation of the present invention. With reference to FIG. 74, the execution environment sub control unit 20 according to the present mode of implementation differs from the structure of the execution environment sub control unit 20 according to the first mode of implementation in further comprising a same execution environment scheduling unit 23 which has the same function (scheduling function) as that of the execution environment scheduling unit 13 and is connected to the AP 8/OS 3, RAM, the OS sub cooperation unit 21 and the execution environment sub management and synchronization unit 22. Description will be accordingly made mainly of the difference from the first mode of implementation.

(Operation of the Third Mode of Implementation)

(Same Reliability (Security Level) Execution Environment Switching Processing (Without Automatic Switching Function))

Figure 75:
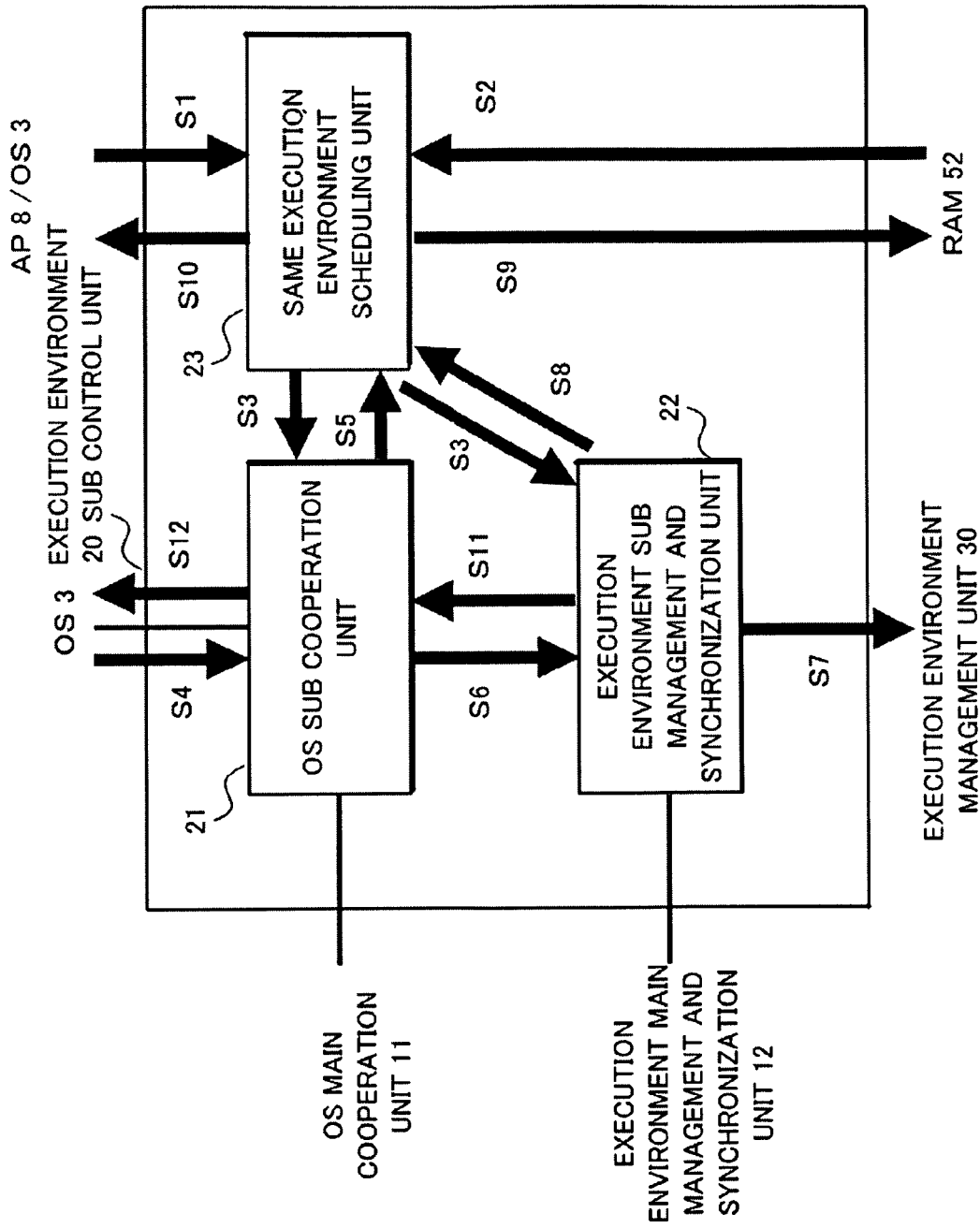
FIG. 75 is a diagram for use in explaining same reliability execution environment switching processing (without the automatic switching function) executed by the execution environment sub control unit according to the third mode of implementation.

FIG. 75 is a diagram for use in explaining same reliability execution environment switching processing (without the automatic switching function) by the execution environment sub control unit 20 according to the present mode of implementation.

With reference to FIG. 75, in the same reliability execution environment switching processing (without the automatic switching function) by the execution environment sub control unit 20 according to the present mode of implementation, the same execution environment scheduling unit 23 receives a request in question from the AP 8/OS 3 at Step S1, reads the execution environment information 521 on the RAM 52 at Step S2, and notifies the OS sub cooperation unit 21 of a request for switching an execution environment and the context 90 of a switching destination in the execution environment in question and notifies the execution environment sub management and synchronization unit 22 of setting information of the execution environment management unit 30 as of after switching at Step S3.

Next, the OS sub cooperation unit 21 receives the context 90 of the OS 3 in operation from the OS 3 at Step S4, sends the context 90 of the OS 3 to the same execution environment scheduling unit 23 at Step S5 and notifies the execution environment sub management and synchronization unit 22 of the completion of the preservation of the contents 90 at Step S6.

Next, the execution environment sub management and synchronization unit 22 sets, at the execution environment management unit 30, setting information of the execution environment management unit 30 as of after switching at Step S7 and notifies the same execution environment scheduling unit 23 of the completion of the processing at Step S8.

Next, the same execution environment scheduling unit 23 updates the execution environment information 521 at Step S9 and notifies the AP 8/OS 3 of the completion of the request at Step S10.

Next, the execution environment sub management and synchronization unit 22 notifies the OS sub cooperation unit 21 of the completion of the processing at Step S11 and the OS sub cooperation unit 21 sets the previously received context 90 of a switching destination at Step S12.

Figure 76:
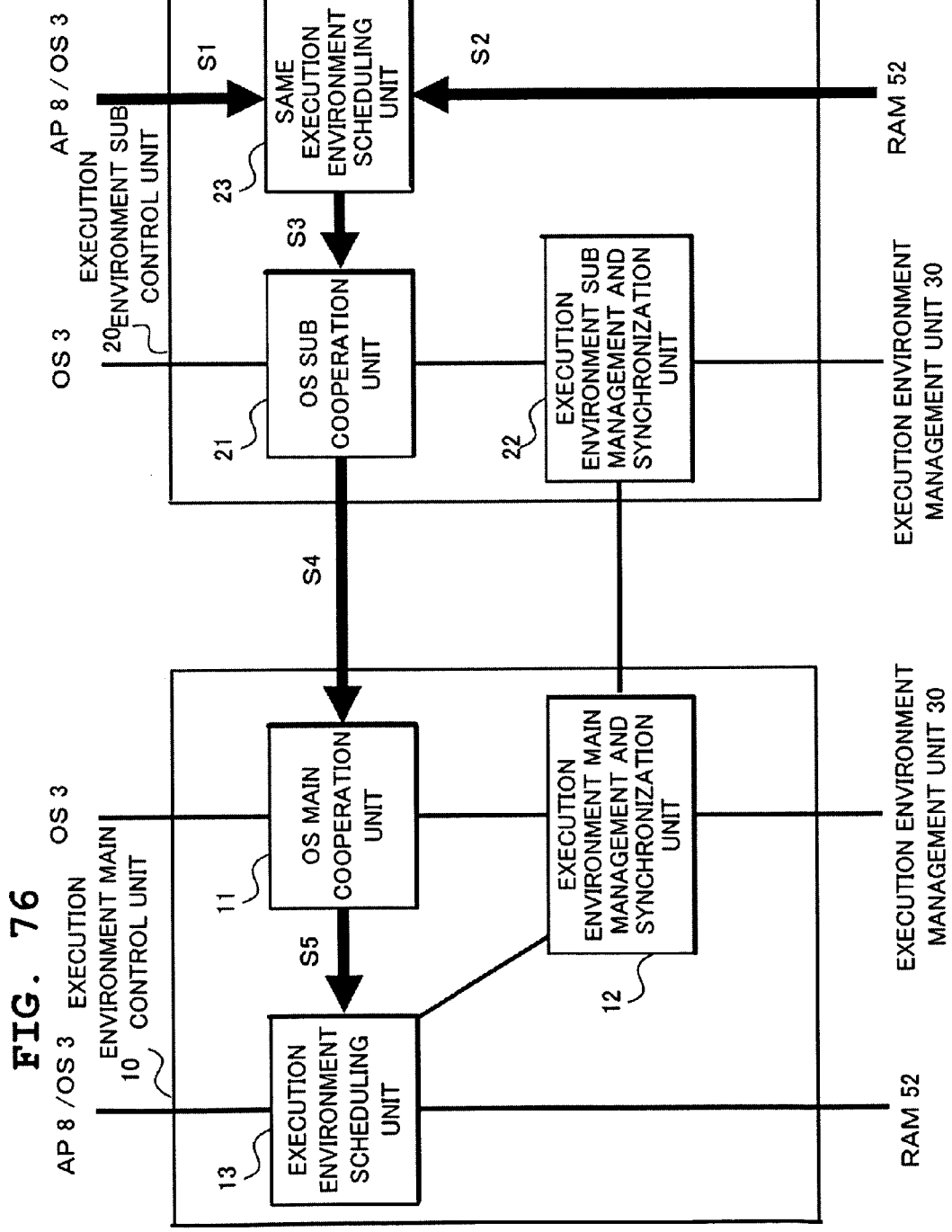
FIG. 76 is a diagram for use in explaining processing of switching from a same execution environment scheduling unit (without the automatic switching function) which is executed by the execution environment main control unit and the execution environment sub control unit according to the third mode of implementation.

FIG. 76 is a diagram for use in explaining processing of switching from the same execution environment scheduling unit (without the automatic switching function) executed by the execution environment main control unit 10 and the execution environment sub control unit 20 according to the present mode of implementation.

With reference to FIG. 76, in the processing of switching from the same execution environment scheduling unit 23 (without the automatic switching function) executed by the execution environment main control unit 10 and the execution environment sub control unit 20 according to the present mode of implementation, the same execution environment scheduling unit 23 receives a request in question from the AP 8/OS 3 at Step S1, reads the execution environment information 521 on the RAM 52 at Step S2, and determines that no scheduling is enabled by itself to notify the OS sub cooperation unit 21 of the request at Step S3.

Next, at Step S4, the OS sub cooperation unit 21 notifies the OS main cooperation unit 11 of the request in question and at Step 5, the OS main cooperation unit 11 notifies the execution environment scheduling unit 13 of the request.

Next, the execution environment sub management and synchronization unit 22 sets, at the execution environment management unit 30, setting information of the execution environment management unit 30 as of after switching at Step S7 and notifies the same execution environment scheduling unit 23 of the completion of the processing at Step S8.

Next, the same execution environment scheduling unit 23 updates the execution environment information 521 at Step S9 and notifies the AP 8/OS 3 of the completion of the request at Step S10.

Next, the execution environment sub management and synchronization unit 22 notifies the OS sub cooperation unit 21 of the completion of the processing at Step S11 and the OS sub cooperation unit 21 sets the previously received context 90 of the switching destination at Step S12.

(Effects of the Third Mode of Implementation)

According to the present mode of implementation, since the execution environment sub control unit 20 comprises the same execution environment scheduling unit 23 having the same function (scheduling function) as that of the execution environment scheduling unit 13, not only the execution environment main control unit 10 comprising the execution environment scheduling unit 13 but also the execution environment sub control unit 20 is allowed to solely generate an execution environment switching control instruction to other execution environment sub control unit 20.

In addition, according to the present mode of implementation, since the execution environment sub control unit 20 is also allowed to solely generate an execution environment switching control instruction to other execution environment sub control unit 20, a processing load on the execution environment main control unit 10 can be mitigated to speed up the processing and furthermore, improve stability and a security level of the execution environment main control unit 10.

(Fourth Mode of Implementation)

Figure 77:
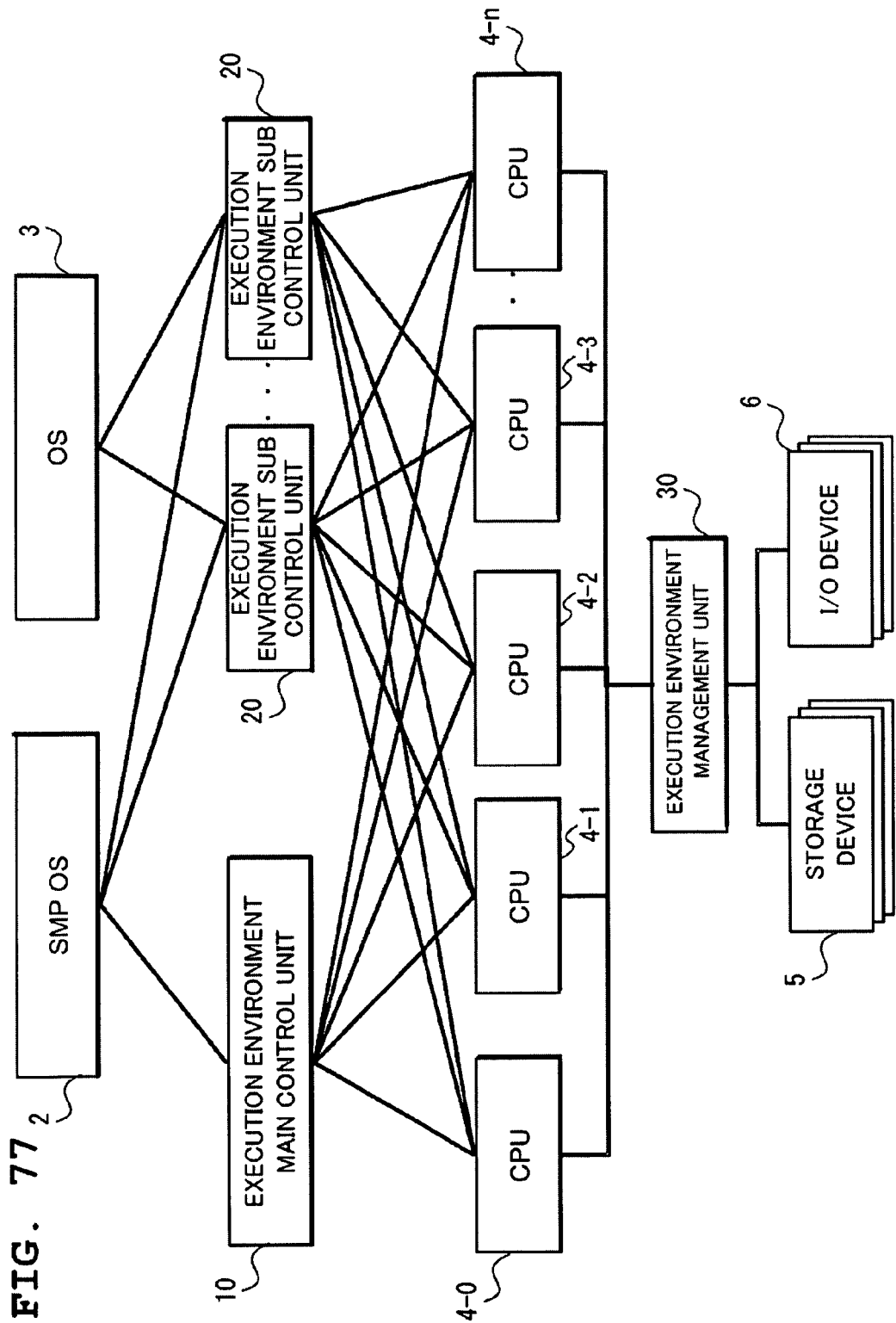
FIG. 77 is a block diagram showing a structure of a multiple processor system according to a fourth mode of implementation of the present invention.

FIG. 77 is a block diagram showing a structure of a multiple processor system according to a fourth mode of implementation of the present invention.

With reference to FIG. 77, a structure of the multiple processor system according to the present mode of implementation differs from the structure of the multiple processor system according to the first mode of implementation shown in FIG. 2 in having the execution environment sub control unit 20 connected not only to the CPUs 4-1~4-n but also to the CPU 4-0. Accordingly, the multiple processor system according to the present mode of implementation differs from the first mode of implementation in that the CPU 4 on which the execution environment main control unit 10 operates is not fixed and the CPU is allowed to move to any CPU 4 added by the execution environment main control unit 10.

(Fifth Mode of Implementation)

Figure 78:
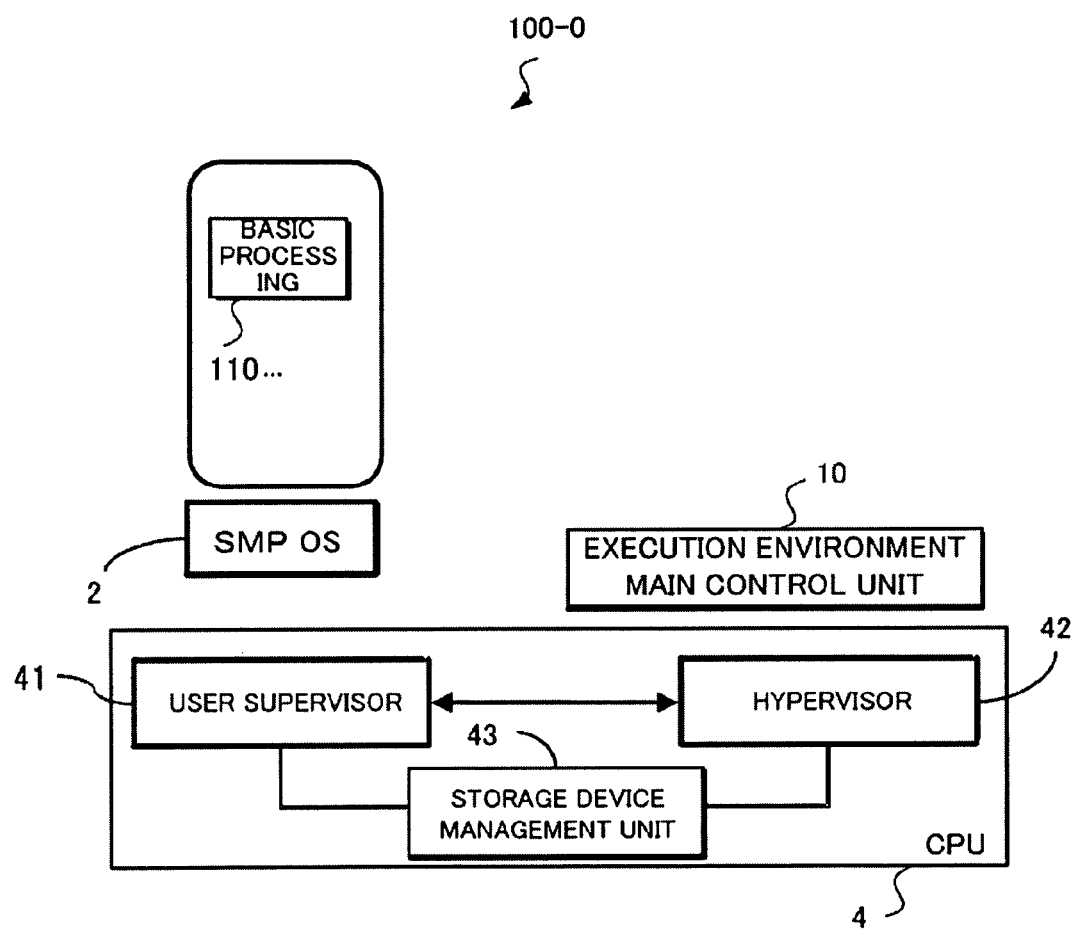
FIG. 78 is a block diagram showing a part of a structure of a multiple processor system according to a fifth mode of implementation of the present invention.
Figure 79:
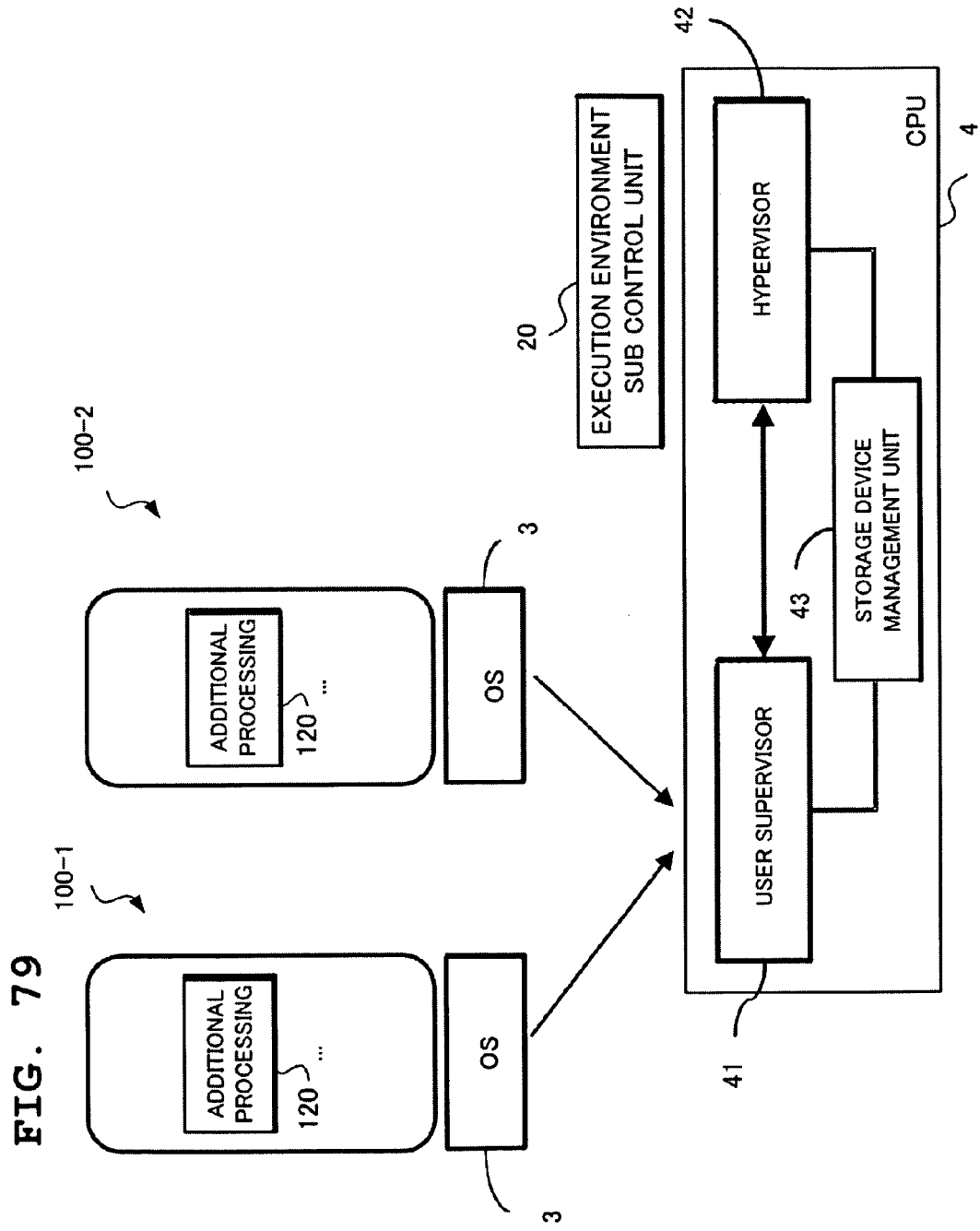
FIG. 79 is a block diagram showing a part of the structure of a multiple processor system according to the fifth mode of implementation of the present invention.

FIG. 78 and FIG. 79 are block diagrams showing a part of a structure of a multiple processor system according to a fifth mode of implementation of the present invention.

With reference to FIG. 78 and FIG. 79, the multiple processor system according to the present mode of implementation differs from the first to fourth modes of implementation in that the CPU 4 comprises a user supervisor 41 mode, a hypervisor 42 mode whose priority is higher than that of the user supervisor, and a storage device management unit 43.

The present mode of implementation enables such a state as shown in FIG. 78 where the SMP OS 2 is controlled by the execution environment main control unit 10 on the CPU 4 to execute the basic processing 110 to make a transition to such a state as shown in FIG. 79 where the OS 3 is controlled by the execution environment sub control unit 20 on the CPU 4 to execute the additional processing 120.

(Sixth Mode of Implementation)

Figure 80:
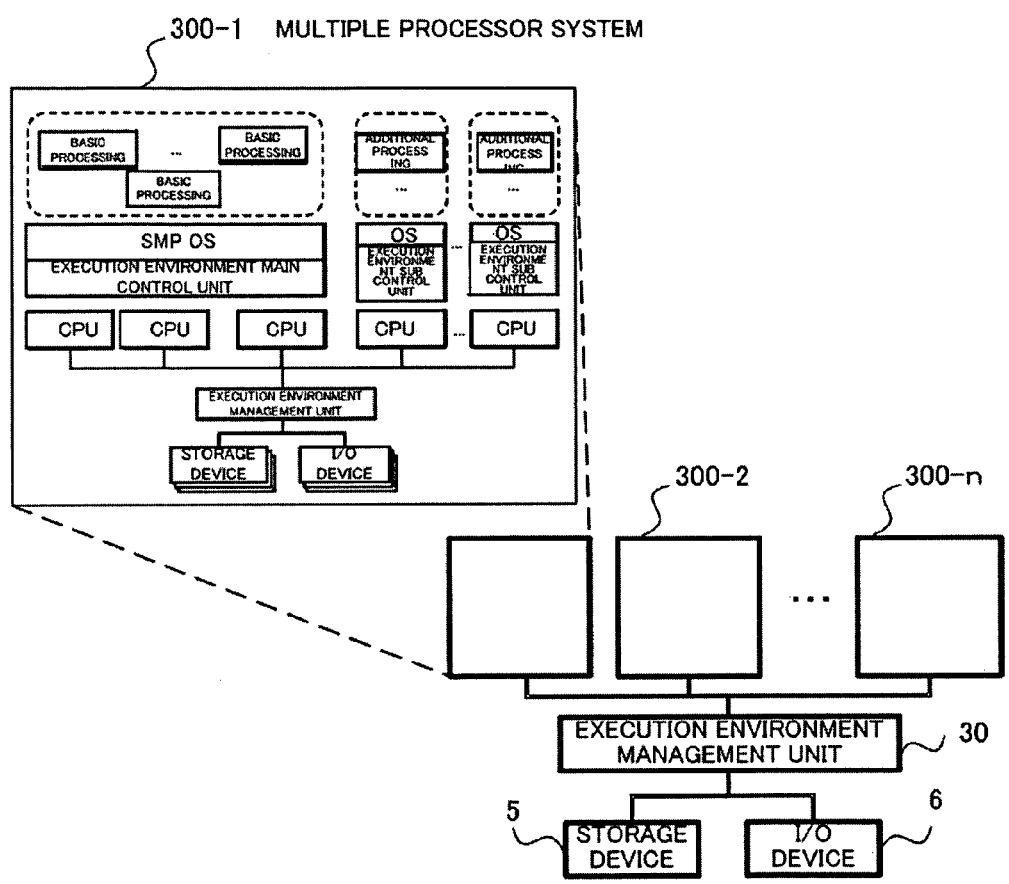
FIG. 80 is a block diagram showing a structure of a multiple processor system according to a sixth mode of implementation of the present invention.

FIG. 80 is a block diagram showing a structure of a multiple processor system according to a sixth mode of implementation.

With reference to FIG. 80, the multiple processor system according to the present mode of implementation differs from the first to fifth modes of implementation in that a plurality of multiple processor systems 300-1~300-n according to any of the above-described first to fifth modes of implementation are arranged in parallel to have a layered structure formed of the execution environment management unit 30, the storage device 5 and the I/O device 6.

Since the present mode of implementation comprises, in addition to a structure comprising a plurality of the multiple processor systems according to any of the first to fifth modes of implementation which are arranged in parallel, a structure formed of the execution environment management unit 30, the storage device 5 and the I/O device 6 in layers, more diverse separation, switching, expansion and degeneration and the like of execution environments are allowed to enable an execution environment to be controlled more minutely according to a security level of the basic processing 110 or the additional processing 120, a CPU load, a kind of OS 3 and the like.

First Exemplary Embodiment

Figure 81:
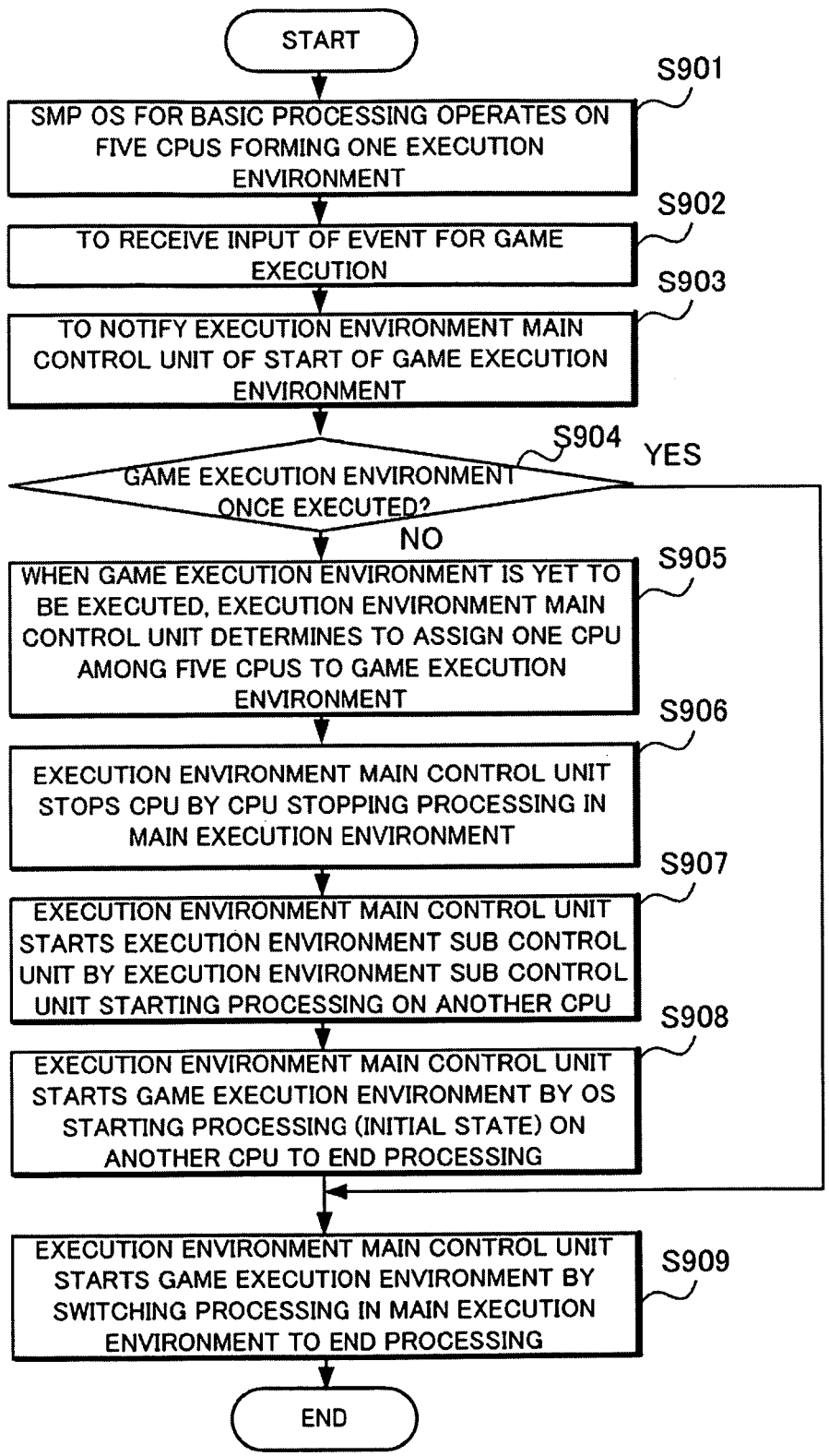
FIG. 81 is a flow chart showing a specific example of operation of the multiple processor system according to an exemplary embodiment 1 of the present invention.

The exemplary embodiment 1 of the present invention is an example of specific operation of the multiple processor system according to the first mode of implementation. The present exemplary embodiment will be described with reference to the above-described FIG. 34, FIG. 37 and FIG. 81. FIG. 81 is a flow chart showing an example of specific operation of the multiple processor system according to the present exemplary embodiment.

At Step S901, the SMP OS 2 for basic processing operates on five CPUs forming one execution environment.

At Step S902, a user inputs an event for executing game.

At Step S903, notify the execution environment main control unit 10 of start of a game execution environment corresponding to the event.

At Step S904, the execution environment main control unit 10 determines whether the game execution environment is once executed or not. When the game execution environment is once executed, go to Step S9.

At Step S905, when the game execution environment is yet to be executed, the execution environment main control unit 10 determines to assign one CPU among the five CPUs to the game execution environment.

At Step S906, the execution environment main control unit 10 stops the CPU by the processing of stopping a CPU in the main execution environment.

At Step S907, the execution environment main control unit 10 starts the execution environment sub control unit 20 by the execution environment sub control unit starting processing on another CPU.

At Step S908, the execution environment main control unit 10 starts the game execution environment by the OS starting processing (initial state) on another CPU to end the processing.

At Step S909, the execution environment main control unit 10 starts the game execution environment by the switching processing in the main execution environment to end the processing.

Figure 82:
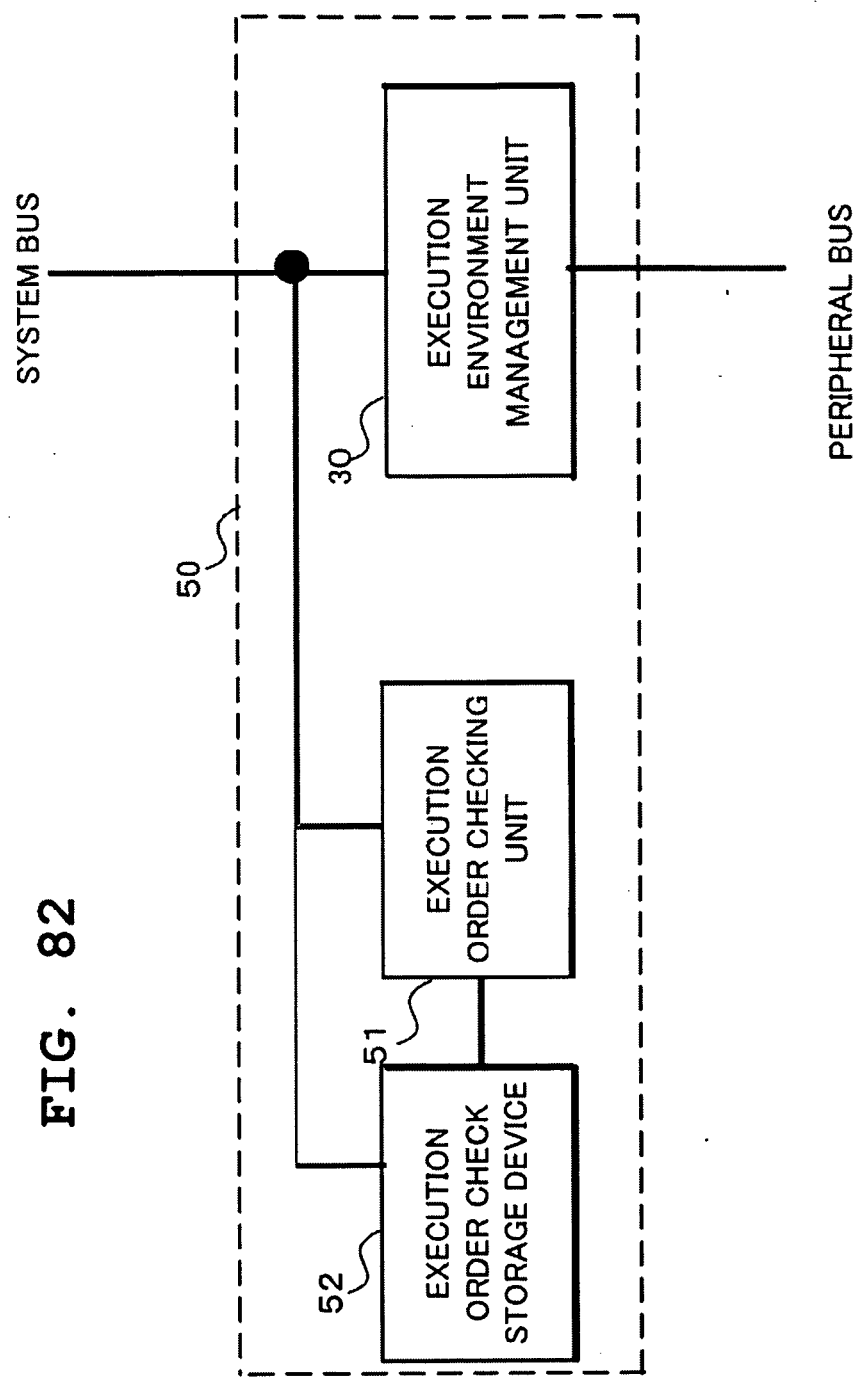
FIG. 82 is a diagram showing a structure of an execution environment management unit with execution order check according to the exemplary embodiment 1 of the present invention.

FIG. 82 is a diagram showing a structure of an execution environment management unit 50 with execution order check according to the exemplary embodiment 1 of the present invention. With reference to FIG. 82, provided in parallel with the execution environment management unit 30 are an execution order checking unit 51 and an execution order check storage unit 52. More specifically, the execution environment management unit 50 with execution order check can be replaced by the execution environment management unit 30 shown in FIG. 3 and the like, which further enables use of an execution order checking function which will be described in the following, so that higher safety can be realized.

The execution order checking unit 51 has a function of checking whether a CPU to be observed fetches an instruction in a right order, that is, whether a right execution order is maintained based on information of the execution order check storage unit 52. This enables operation of a CPU executing the execution environment sub control unit to be monitored from a CPU executing the execution environment main control unit. The execution order checking unit 51 also holds the state whether a CPU to be observed is fetching an instruction within a designated range or not. This state can be read from the CPU which executes the execution environment main control unit or can be reset.

FIG. 83 is a diagram showing a structure of the execution order check storage device 52 according to the exemplary embodiment 1 of the present invention. With reference to FIG. 83, described in the execution order check storage device 52 are which CPU is to be observed and its observation range. "Start" here represents a physical address from which a first instruction fetch is allowed to a CPU to be observed and "End" represents a physical address from which a first instruction fetch within a range from Start to End is not allowed. More specifically, illustrated in the figure is that within a range of physical addresses between 0x0e000000 and 0x0e001000, the CPU #3 to be observed is allowed to fetch an instruction only from 0x0e000000. In instruction fetch related to the other addresses, the CPU is not affected. The execution order check storage device 52 can be rewritten only by a CPU executing the execution environment control unit.

Figure 84:
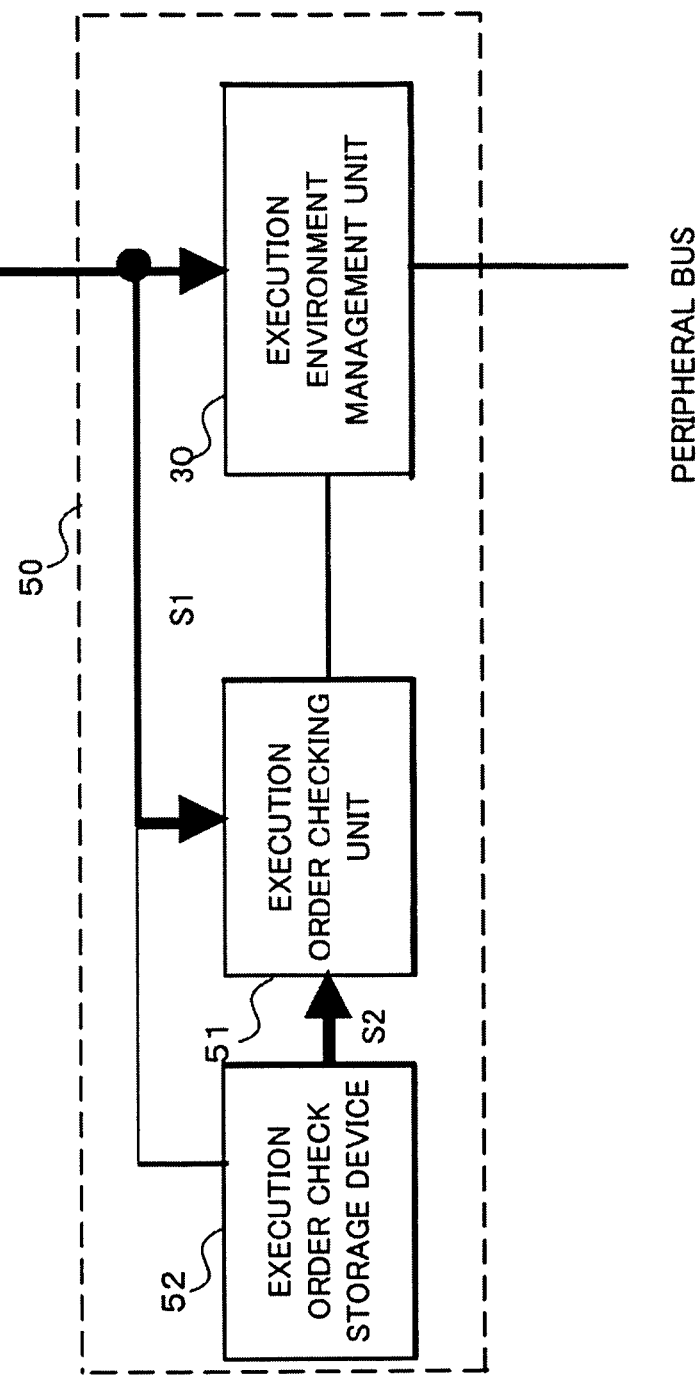
FIG. 84 is a diagram for use in explaining operation of the execution environment management unit with execution order check according to the exemplary embodiment 1 of the present invention.

FIG. 84 is a diagram for use in explaining one example of operation of the execution environment management unit 50 with execution order check shown in FIG. 82. In FIG. 84, a code formed of S and a numeral beside an arrow represents a step number. In this example, description will be made of a case where a CPU to be observed first of all fetches an instruction of a top of physical addresses (hereinafter referred to as a physical address A) allowed by the execution order check storage device 52.

Step S1: A CPU to be observed issues a request for fetching an instruction of the physical address A and the execution order checking unit 51 and the execution environment management unit 50 receive the request.

Step S2: The execution order checking unit 51 reads information of the execution order check storage device 52, and determines that instruction fetch of the physical address A is also allowed to interrupt the operation as a result.

Figure 85:
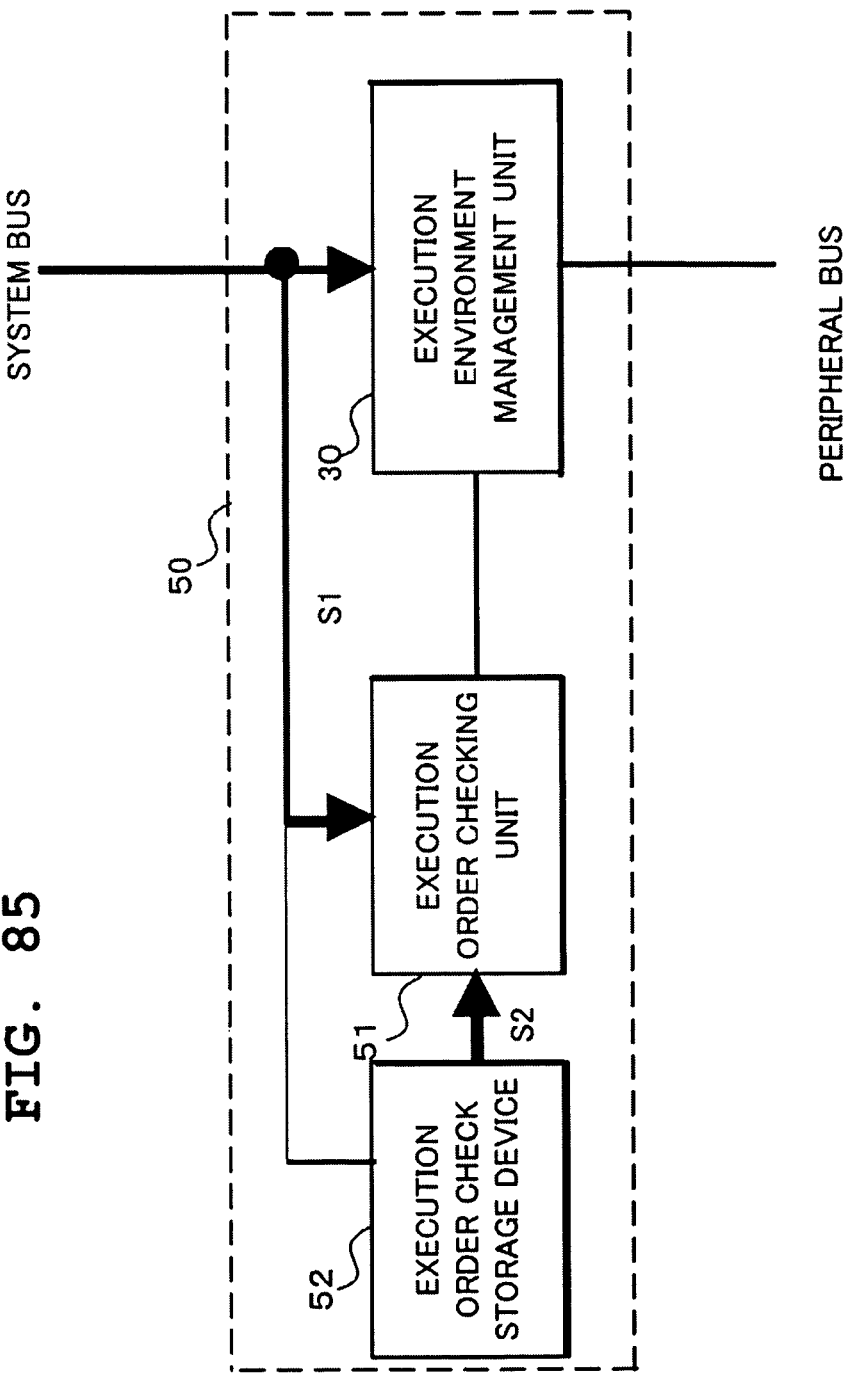
FIG. 85 is a diagram for use in explaining operation of the execution environment management unit with execution order check according to the exemplary embodiment 1 of the present invention.

FIG. 85 is a diagram for use in explaining one example of operation of the execution environment management unit 50 with execution order check shown in FIG. 82. In FIG. 85, a code formed of S and a numeral beside an arrow represents a step number. In this example, description will be made of a case where the CPU to be observed, after instruction fetch in FIG. 84, subsequently fetches an instruction of a physical address within the range described by the execution order check storage device 52 (hereinafter referred to as a physical address B).

Step S1: The CPU to be observed issues a request for fetching an instruction of the physical address B, and the execution order checking unit 51 and the execution environment management unit 50 receive the request.

Step S2: The execution order checking unit 51 reads information of the execution order check storage device 52, determines that instruction fetch of the physical address B is also allowed because the instruction fetch of the physical address A is already allowed and interrupts the operation as a result.

Figure 86:
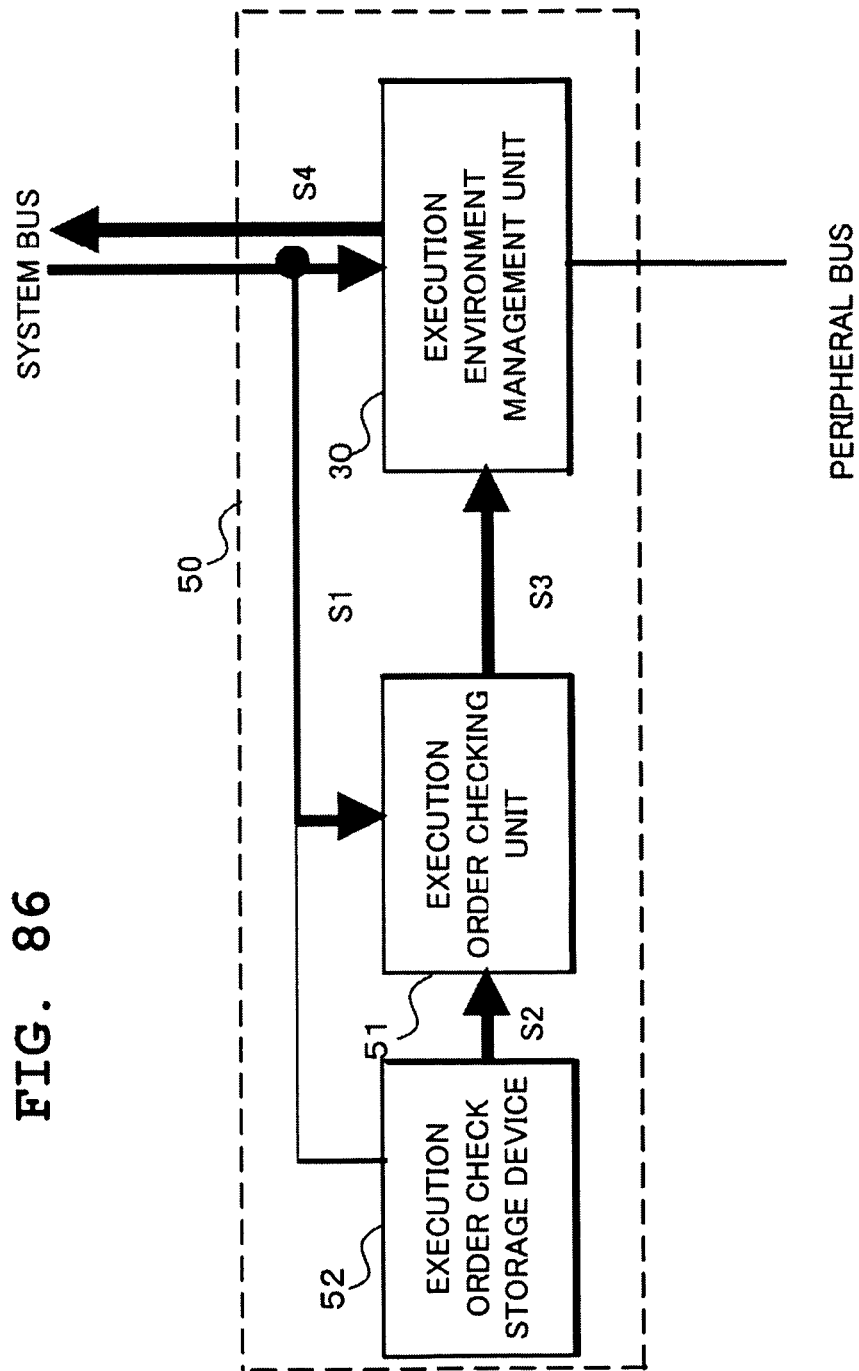
FIG. 86 is a diagram for use in explaining operation of the execution environment management unit with execution order check according to the exemplary embodiment 1 of the present invention.

FIG. 86 is a diagram for use in explaining one example of operation of the execution environment management unit 50 with execution order check shown in FIG. 82. In FIG. 86, a code formed of S and a numeral beside an arrow represents a step number. In this example, description will be made of a case where the CPU to be observed at first fetches an instruction of a physical address within the range described by the execution order check storage device 52 (hereinafter referred to as a physical address B).

Step S1: The CPU to be observed issues a request for fetching an instruction of the physical address B, and the execution order checking unit 51 and the execution environment management unit 50 receive the request.

Step S2: The execution order checking unit 51 reads information of the execution order check storage device 52 and refrains from allowing instruction fetch of the physical address B because the instruction fetch of the physical address A is yet to be executed.

Step S3: The execution order checking unit 51 notifies the execution environment management unit 30 that no instruction fetch is allowed.

Step S4: The execution environment management unit 30 interrupts access processing to return an error to the CPU in question.

Figure 87:
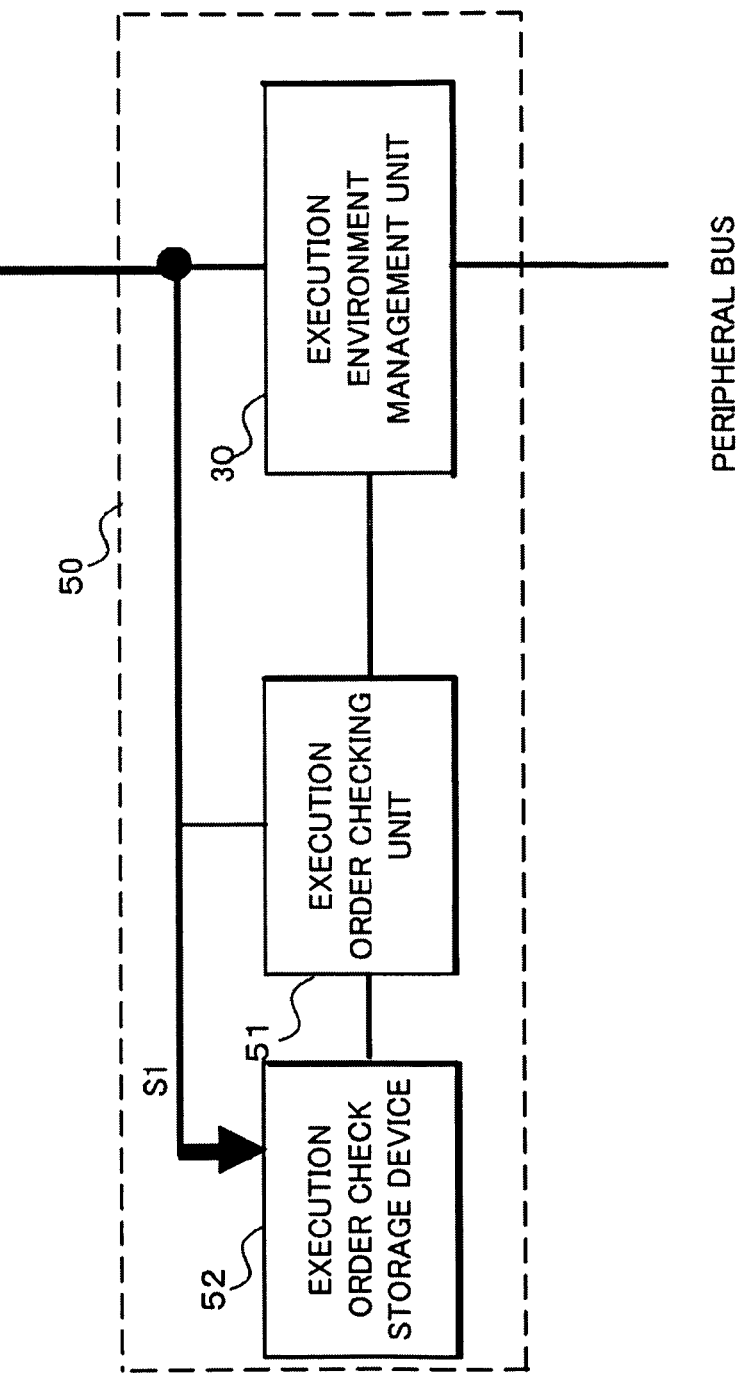
FIG. 87 is a diagram for use in explaining operation of the execution environment management unit with execution order check according to the exemplary embodiment 1 of the present invention.

FIG. 87 is a diagram for use in explaining one example of operation of the execution environment management unit 50 with execution order check shown in FIG. 82. In FIG. 87, a code formed of S and a numeral beside an arrow represents a step number. In this example, description will be made of a case of rewriting the execution order check storage device 52 by a CPU executing the execution environment main control unit.

At Step S1: The CPU which executes the execution environment main control unit updates the execution order check storage device 52.

Figure 88:
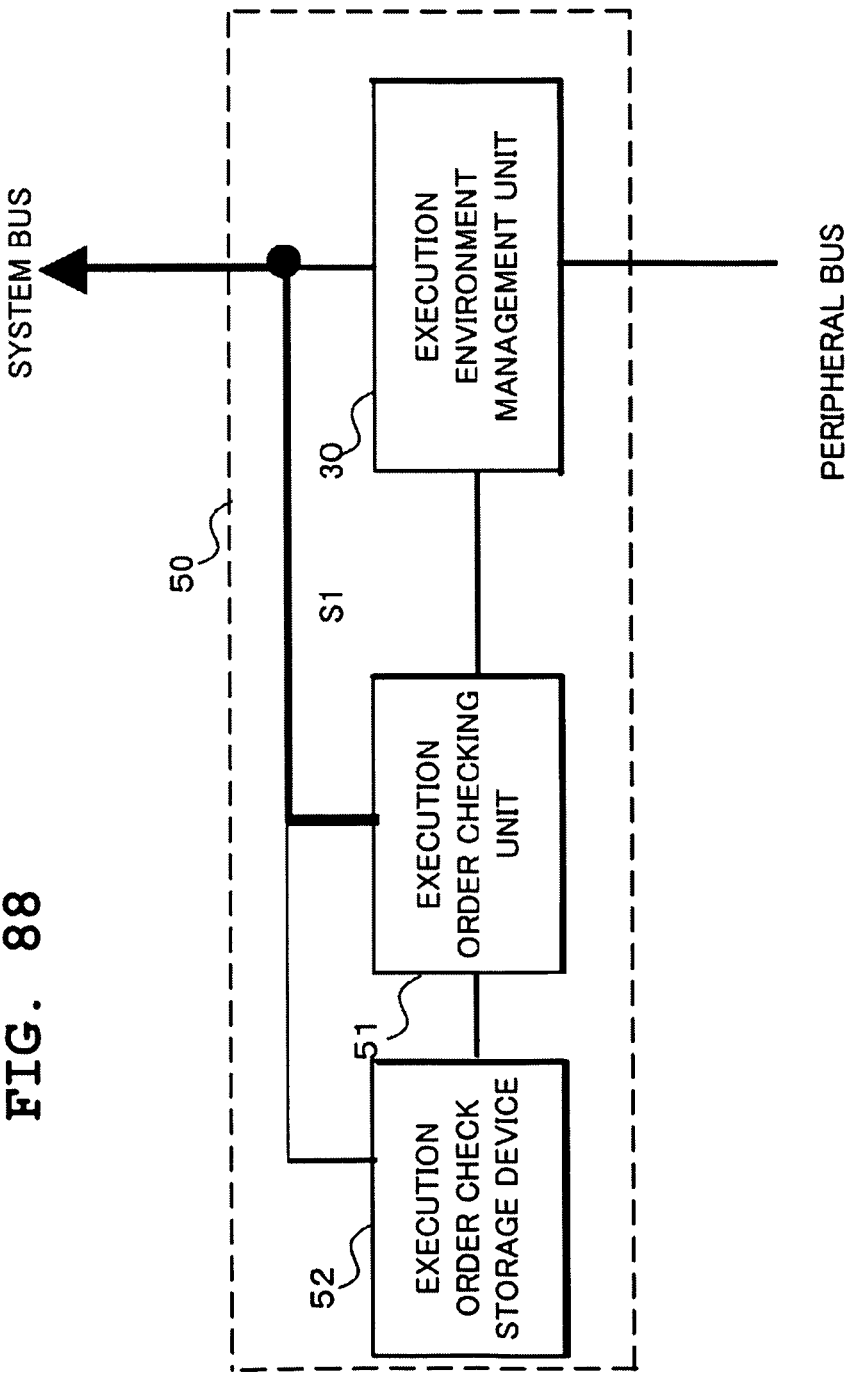
FIG. 88 is a diagram for use in explaining operation of the execution environment management unit with execution order check according to the exemplary embodiment 1 of the present invention.

FIG. 88 is a diagram for use in explaining one example of operation of the execution environment management unit 50 with execution order check shown in FIG. 82. In FIG. 88, a code formed of S and a numeral beside an arrow represents a step number. In this example, description will be made of a case of reading a state of the execution order checking unit 51 from a CPU executing the execution environment main control unit.

Step S1: The CPU which executes the execution environment main control unit reads a state of the execution order checking unit 51. When a CPU in a relevant entry fetches an instruction within a designated range, return a notification that it is in the checking state and when not fetching, return a notification that it is not in the checking state.

This enables the CPU executing the execution environment main control unit to comprehend which range of instruction the CPU to be observed is executing, thereby preventing invasion of viruses at the time of changing such a system state as synchronization between the execution environment main control unit and the execution environment sub control unit, so that exclusion of unreliable codes can be realized.

Figure 89:
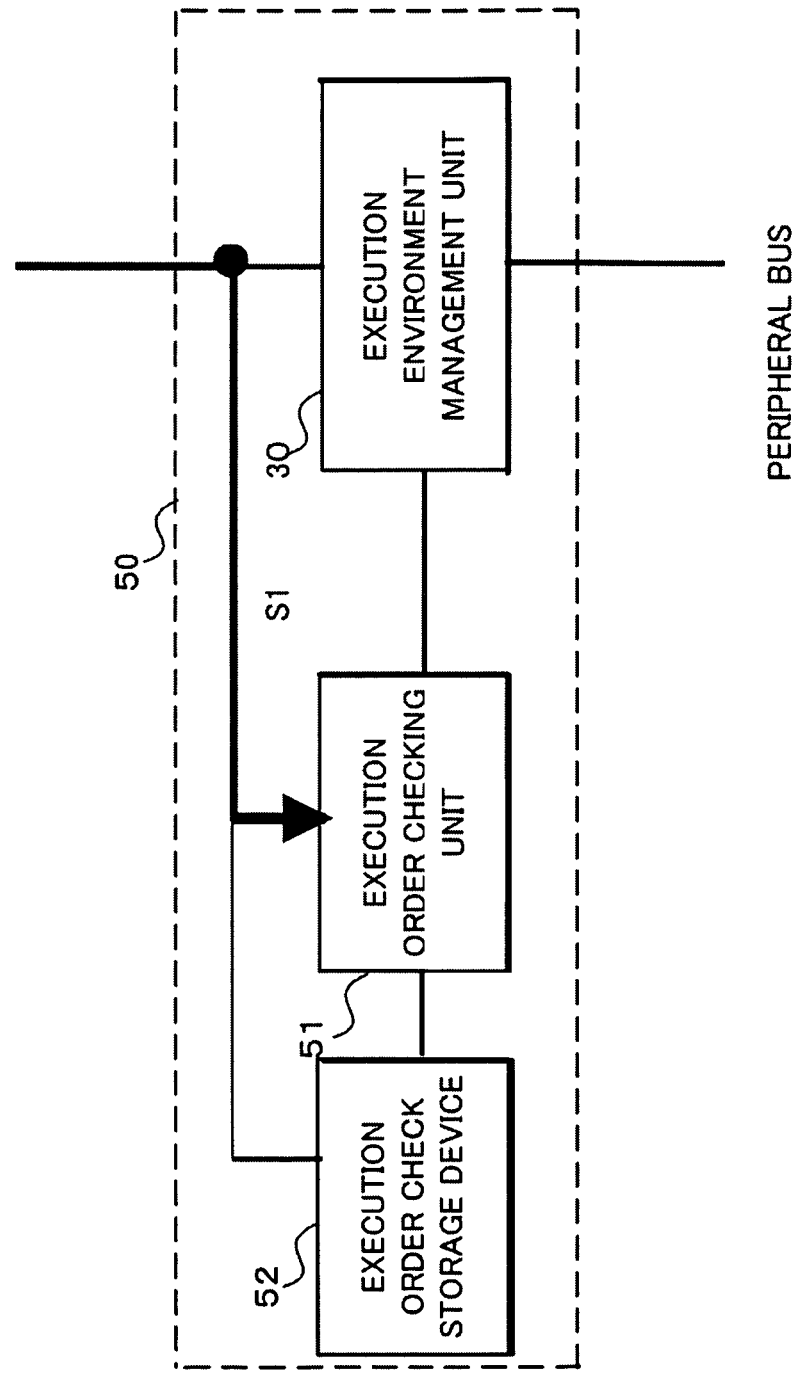
FIG. 89 is a diagram for use in explaining operation of the execution environment management unit with execution order check according to the exemplary embodiment 1 of the present invention.
Figure 89:
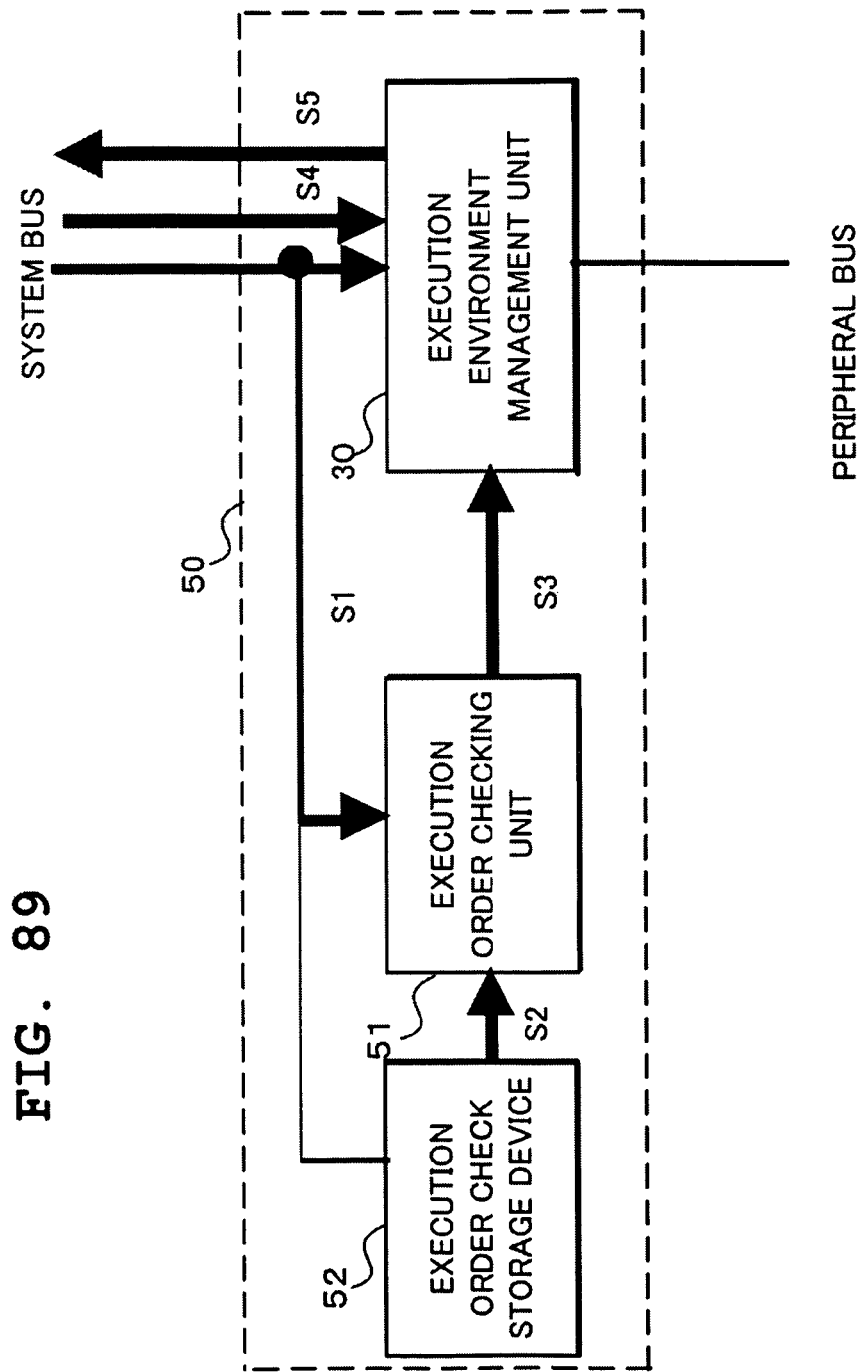

FIG. 89 is a diagram for use in explaining one example of operation of the execution environment management unit 50 with execution order check shown in FIG. 82. In FIG. 89, a code formed of S and a numeral beside an arrow represents a step number. In this example, description will be made of a case of clearing a state of the execution order checking unit 51 by a CPU executing the execution environment main control unit.

Step S1: The CPU executing the execution environment main control unit clears the state of the execution order checking unit 51. Hereafter, the CPU to be observed will be allowed to make another access only to an address starting at the top of designated physical addresses.

This enables the CPU executing the execution environment main control unit to again observe the operation of the CPU to be observed at an arbitrary time point.

Figure 90:
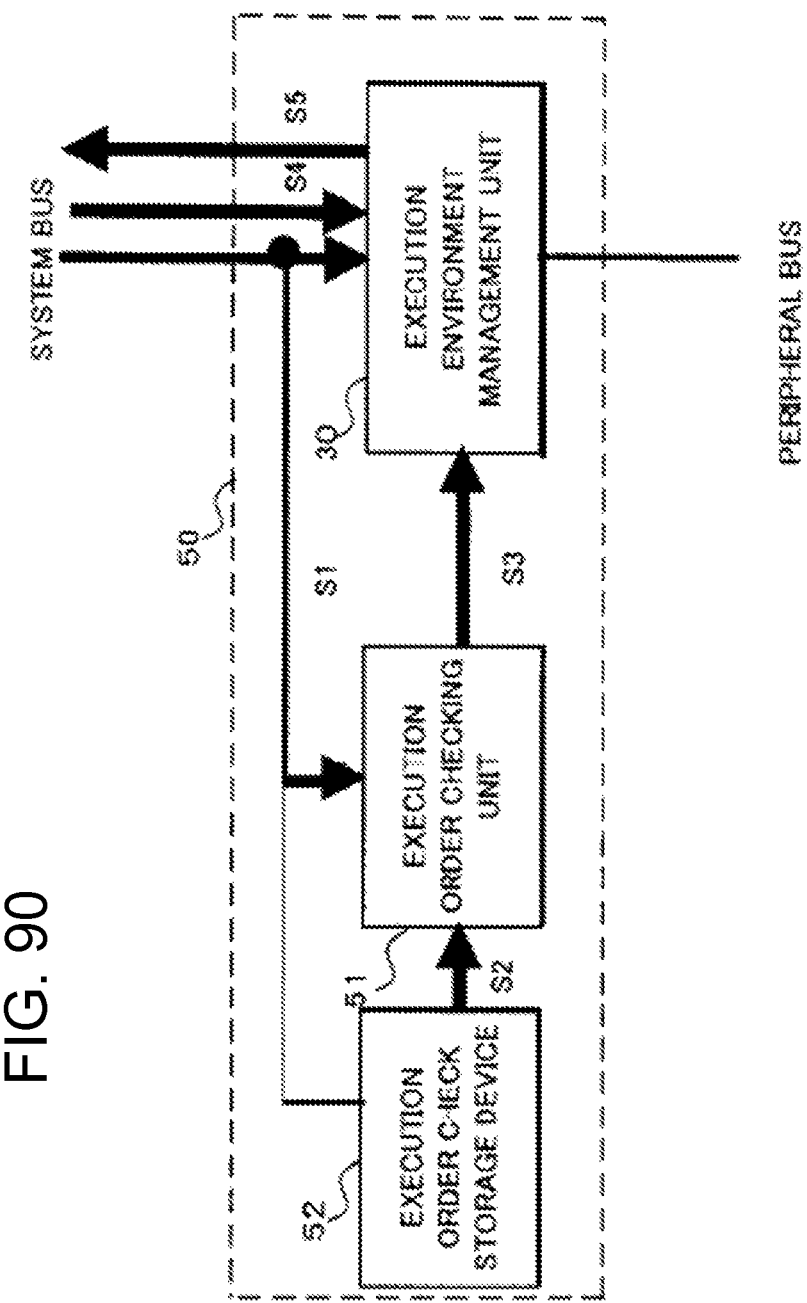
FIG. 90 is a diagram for use in explaining operation of the execution environment management unit with execution order check according to the exemplary embodiment 1 of the present invention.

FIG. 90 is a diagram for use in explaining one example of operation of the execution environment management unit 50 with execution order check shown in FIG. 82. In FIG. 90, a code formed of S and a numeral beside an arrow represents a step number. In this example, description will be made of a case where the execution order checking unit 51 and the execution environment management unit 30 operate in cooperation.

Step S1: The CPU to be observed issues a request for fetching an instruction of a certain physical address and the execution order checking unit 51 and the execution environment management unit 50 receive the request.

Step S2: The execution order checking unit 51 reads the information of the execution order check storage device 52 to allow fetch of an instruction of the physical address.

Step S3: The execution environment management unit 30 receives a data access to a certain physical address.

The execution order checking unit 51 notifies the execution environment management unit 30 that an instruction fetch is not allowed.

Step S4: The execution environment management unit 30 determines that the access in question is an access whose allowance/non-allowance is determined according to a checking state of the CPU in question and as a result, obtains information about a checking state of the CPU currently issuing the access in question from the execution order checking unit 51.

Step S5: The execution environment management unit 30 determines that the access is related to a region whose access is not allowed by the CPU in the checking state and as a result, returns an error to the CPU in question.

Here, recovery such as resetting of a CPU having an error may be executed by notifying an error not only to the CPU in question but also to a CPU executing the execution environment main control unit.

As a result of the foregoing cooperation between the execution order checking unit 51 and the execution environment management unit 30, as to safety depending only on a data access, the data access can be flexibly limited according to a program execution situation of a CPU to be observed, thereby attaining further improved safety.

Although the present invention has been described with respect to the preferred modes of implementation and exemplary embodiment in the foregoing, the present invention is not limited to the above-described modes of implementation and exemplary embodiment and can be implemented in various forms within a range of its technical idea.

What is claimed is:

1. A multiple processor system comprising:
  a plurality of processors including a primary processor and a plurality of secondary processors;
  a primary execution environment running at all times to perform primary processing and including:
    a group of the processors always including the primary processor, where each secondary processor is able to exit and rejoin the group;
    a primary operating system executable on the group of the processors;
  a plurality of secondary execution environments that are initially stopped, each secondary execution environment to perform secondary processing according to contents of the processing to be executed and including:
    a different one of the secondary processors;

a different secondary operating system executable on the different one of the secondary processors, wherein when a selected secondary execution environment is to be started when the selected secondary execution environment is currently stopped:

the secondary processor of the selected secondary execution environment exits the group such that the secondary processor no longer is part of the primary execution environment performing the primary processing, and the selected secondary execution environment starts running to perform the secondary processing thereof via the secondary processor thereof;

wherein in response to a request for the selected secondary execution environment to be stopped when the selected secondary execution environment is currently running:

the secondary processor of the selected secondary execution environment rejoins the group such that secondary processing of the selected secondary execution environment is no longer performed such that the secondary processor is again part of the primary execution environment performing the primary processing, wherein:

the primary execution environment includes a primary execution control unit;

each secondary execution environment includes a secondary execution control unit;

execution environment switching is performed by:

the primary execution control unit determining whether an interruption request has been received from the secondary execution control unit of the selected secondary execution environment;

in response to determining that the interruption request has not been received within a predetermined threshold period, the primary execution control unit forcibly resetting the secondary execution environment;

in response to receiving the interruption request within the predetermined threshold period, the primary execution control unit transmits a switch request to the secondary execution control unit of the selected secondary execution environment to request the secondary execution control unit to switch to the primary execution environment.

2. The multiple processor system of claim 1, wherein, upon the secondary processing of the secondary execution environment having finished:

the secondary processor of the selected secondary execution environment rejoins the group such that the secondary processor is again part of the primary execution environment performing the primary processing.

3. A method comprising:

running, at all times, a primary execution environment to perform primary processing, the primary execution environment including a group of a plurality of processors including a primary processor and a plurality of secondary processor, the group always including the primary processor, where each secondary processor is able to exit and rejoin the group, the primary execution environment further including a primary operating system executable on the group of the processors;

when a selected secondary execution environment of a plurality of secondary execution environments that are initially stopped is to be started, where each secondary execution environment is to perform secondary processing according to contents of the processing to be executed and including a different one of the secondary processors and a different secondary operating system executable on the different one of the secondary processors:

exiting, by the secondary processor of the selected secondary execution environment, the group such that the secondary processor no longer is part of the primary execution environment performing the primary processing, and running the selected secondary execution environment to perform the secondary processing thereof via the secondary processor thereof;

in response to a request for the selected secondary execution environment to be stopped when the selected secondary execution environment is currently running:

rejoining, by the secondary processor of the selected secondary execution environment, the group such that secondary processing of the selected secondary execution environment is no longer performed and such that the secondary processor is again part of the primary execution environment performing the primary processing, wherein:

the primary execution environment includes a primary execution control unit;

each secondary execution environment includes a secondary execution control unit;

execution environment switching is performed by:

the primary execution control unit determining whether an interruption request has been received from the secondary execution control unit of the selected secondary execution environment;

in response to determining that the interruption request has not been received within a predetermined threshold period, the primary execution control unit forcibly resetting the secondary execution environment;

in response to receiving the interruption request within the predetermined threshold period, the primary execution control unit transmits a switch request to the secondary execution control unit of the selected secondary execution environment to request the secondary execution control unit to switch to the primary execution environment.

4. The method of claim 3, wherein, upon the secondary processing of the secondary execution environment having finished:

the secondary processor of the selected secondary execution environment rejoins the group such that the secondary processor is again part of the primary execution environment performing the primary processing.

* * * * *